United States Patent
Edge et al.

(10) Patent No.: US 10,952,178 B2
(45) Date of Patent: *Mar. 16, 2021

(54) LOW POWER PERIODIC AND TRIGGERED LOCATION OF A MOBILE DEVICE USING CONTROL PLANE OPTIMIZATION

(71) Applicant: QUALCOMM Incorporated, San Diego, CA (US)

(72) Inventors: Stephen William Edge, Escondido, CA (US); Haris Zisimopoulos, London (GB); Sebastian Speicher, Wallisellen (CH); Miguel Griot, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/653,968

(22) Filed: Oct. 15, 2019

(65) Prior Publication Data

US 2020/0053686 A1 Feb. 13, 2020

Related U.S. Application Data

(63) Continuation-in-part of application No. 16/368,204, filed on Mar. 28, 2019, now Pat. No. 10,506,543.

(Continued)

(51) Int. Cl.
*H04W 60/04* (2009.01)
*H04W 48/16* (2009.01)
(Continued)

(52) U.S. Cl.
CPC .......... *H04W 60/04* (2013.01); *H04W 4/025* (2013.01); *H04W 8/08* (2013.01); *H04W 48/16* (2013.01);
(Continued)

(58) Field of Classification Search
CPC ................. H04W 4/029; H04W 8/06
(Continued)

(56) References Cited

U.S. PATENT DOCUMENTS

| | | |
|---|---|---|
| 9,998,856 B2 | 6/2018 | Edge |
| 10,506,543 B1 | 12/2019 | Edge et al. |

(Continued)

FOREIGN PATENT DOCUMENTS

| | | |
|---|---|---|
| WO | 2017196510 A1 | 11/2017 |
| WO | 2018085017 A1 | 5/2018 |

(Continued)

OTHER PUBLICATIONS

"3rd Generation Partnership Project; Technical Specification Group Services and System Aspects; Functional stage 2 description of Location Services (LCS) (Release 15)", 3GPP Standard; Technical Specification; 3GPP TS 23.271, 3rd Generation Partnership Project (3GPP), Mobile Competence Centre ; 650, Route Des Lucioles ; F-06921 Sophia-Antipolis Cedex ; France, vol. SA WG2, No. V15.0.0, Jun. 19, 2018 (Jun. 19, 2018) , pp. 1-184, XP051472853, [retrieved on Jun. 19, 2018], paragraph [9.1.12.1] — paragraph [9.1.12. 4].

(Continued)

Primary Examiner — Kiet M Doan
(74) Attorney, Agent, or Firm — Thien T. Nguyen

(57) ABSTRACT

Techniques are discussed herein for supporting periodic or triggered location of a user equipment (UE) using control plane (CP) optimization with optional use of Early Data Transmission (EDT). A location server (LS), such as a 5G LMF, sends a request to a UE for periodic or triggered location and includes a request and/or criteria for using CP optimization. After confirming the request, the UE monitors for periodic or triggering events and, for each detected event, sends an event report to the LS which may include (Continued)

location information. In embodiments, the UE establishes a signaling association with a RAN node to send the event report using CP optimization and optionally using EDT. The RAN node may then release the signaling association after the LS returns a single response to the UE.

34 Claims, 19 Drawing Sheets

Related U.S. Application Data

(60) Provisional application No. 62/689,820, filed on Jun. 25, 2018, provisional application No. 62/732,558, filed on Sep. 17, 2018, provisional application No. 62/862,661, filed on Jun. 17, 2019.

(51) Int. Cl.
*H04W 8/08* (2009.01)
*H04W 76/30* (2018.01)
*H04W 76/25* (2018.01)
*H04W 76/27* (2018.01)
*H04W 4/02* (2018.01)

(52) U.S. Cl.
CPC ........... *H04W 76/25* (2018.02); *H04W 76/27* (2018.02); *H04W 76/30* (2018.02)

(58) Field of Classification Search
USPC ........ 455/433, 422.1, 435.1, 456.2; 370/329, 370/331
See application file for complete search history.

(56) References Cited

U.S. PATENT DOCUMENTS

| | | | |
|---|---|---|---|
| 2006/0099961 A1* | 5/2006 | Duan ...................... | H04W 8/08 455/456.2 |
| 2006/0293066 A1 | 12/2006 | Edge et al. | |
| 2008/0200182 A1* | 8/2008 | Shim ....................... | H04W 4/02 455/456.1 |
| 2014/0192737 A1* | 7/2014 | Belghoul .............. | H04W 4/021 370/329 |
| 2018/0054795 A1 | 2/2018 | Edge | |
| 2019/0116483 A1* | 4/2019 | Ryu ........................ | H04W 76/11 |
| 2019/0357129 A1* | 11/2019 | Park ....................... | H04W 60/00 |
| 2020/0045666 A1 | 2/2020 | Edge et al. | |
| 2020/0053638 A1 | 2/2020 | Edge et al. | |
| 2020/0092776 A1 | 3/2020 | Edge | |
| 2020/0236644 A1 | 7/2020 | Gunnarsson et al. | |

FOREIGN PATENT DOCUMENTS

| | | | |
|---|---|---|---|
| WO | WO-2018085017 A1 | 5/2018 | |
| WO | 2018129337 A1 | 7/2018 | |
| WO | WO-2018129337 A1 | 7/2018 | |

OTHER PUBLICATIONS

Huawei et al., "Introduction of early data transmission ", 3GPP Draft; 36413_CR1578R4_(REL-15)_R3-183469, 3rd Generation Partnership Project (3GPP), Mobile Competence Centre ; 650, Route Des Lucioles ; F-06921 Sophia-Antipolis Cedex ; France, vol. RAN WG3, No. Busan, Korea; May 21, 2018-May 25, 2018, Jun. 7, 2018 (Jun. 7, 2018), XP051511815, 16 Pages, Retrieved from the Internet: URL:http://www.3gpp.org/ftp/tsg%5Fran/TSG%5FRAN/TSGR%5F80/Docs/RP%2D181242%2Ezip [retrieved on Jun. 7, 2018], p. 1-p. 4.
International Search Report and Written Opinion—PCT/US2019/035225—ISA/EPO—dated Sep. 13, 2019.
International Search Report and Written Opinion—PCT/US2020/037034—ISA/EPO—dated Aug. 28, 2020.
Qualcomm Incorporated: "Location Reporting Using Control Plane CIOT EPS Optimisation", 3GPP Draft, 23271 CR0424R2 CIOT EXT (REL-14), S2-170513 (CR 23.271—Location Reporting Using CP)-R6, 3rd Generation Partnership Project (3GPP), Mobile Competence Centre, 650, Route Des Lu, F-0, vol. RAN SA WG2, No. Spokane, WA, USA, Jan. 16, 2017-Jan. 20, 2017, Mar. 4, 2017 (Mar. 4, 2017), XP051234963, 15 pages, Retrieved from the Internet: URL: http://www.3gpp.org/ftp/Meetings_3GPP_SYNC/SA/Docs/. [retrieved on Mar. 4, 2017] pp. 7-14 figures 9.1.19.1-1.
Qualcomm Incorporated: "Low Power Periodic and Triggered Location for the LMF Based Solution", 3GPP Draft, S2-183966, WAS 3623 (P-CR for TR 23.731 for Low Power Triggered Location for the LMF Based Solution), 3rd Generation Partnership Project (3GPP), Mobile Competence Centre, 650, Route Des Lu, SA, F-0, vol. RAN WG2, No. Sanya, China, Apr. 16, 2018-Apr. 20, 2018, Apr. 18, 2018 (Apr. 18, 2018), XP051432437, 12 pages, Retrieved from the Internet: URL: http://www.3gpp.org/ftp/Meetings%5F3GPP%5FSYNC/SA2/%5FUpdate02/. [retrieved on Apr. 18, 2018] figures 1,6.2.3.5-1 pp. 1-5.
3GPP TR 23.731: "3rd Generation Partnership Project; Technical Specification Group Services and System Aspects; Study on Enhancement to the 5GC Location Services (Release 16)", 3GPP Standard; Technical Report; 3GPP TR 23.731, 3rd Generation Partnership Project (3GPP), Mobile Competence Centre; 650, Route Des Lucioles; F-06921 Sophia-Antipolis Cedex, France, vol. SA WG2, No. V0.6. 0, Sep. 3, 2018 (Sep. 3, 2018), pp. 1-145, XP051475178 [retrieved on Sep. 3, 2018] p. 27, line 12—p. 39, last line; figures 6.2.3.3-1 p. 53, line 12—p. 59, line 34 p. 95, line 5—p. 102, line 15.
Qualcomm Incorporated: "Enhancements to Solution 2," 3GPP Draft; S2-187097 WAS 7012 WAS 6649 (9-CR for TR 23.731 for Enhancements to Solution 2)-R1, 3RD Generation Partnership Project (3GPP), Mobile Competence Centre; 650, Route Des Lucioles; F-06921, vol. Sa WG2, No. Vilnius, Lithuania; Jul. 2-6, 2018, Jul. 6, 2018, XP051538540, 16 pages, Retrieved from the Internet: URL: http://www.3gpp.org/ftp/tsg%5Fsa/WG2%/05FArch/TSGS2%05F128%05FVilnius/Docs/S2%2D187097%2Ezip [retrieved on Jul. 6, 2018] p. 3, line 10—p. 15, line 44.
Qualcomm Incorporated, et al., "Deferred 5GC-MT-LR Procedure for Solution 14", SA WG2 Meeting #129, 3GPP Draft; S2-1810463 P-CR for TR 23.731 for AMF and LMF Deferred Location Solution-R7, 3rd Generation Partnership Project (3GPP), Mobile Competence Centre; 650, Route Des Lucioles; F-06921 Sophia, vol. SA WG2, No. Dongguan, P. R. China; Oct. 15-19, 2018, Oct. 9, 2018 (Oct. 9, 2018), 10 pages, XP051539440, Retrieved from the Internet: URL: http://www.3gpp.org/ftp/tsg%5Fsa/WG2%05FArch/TSGS2%05F129%05FDongguan/Docs/S2%2D1810463%2Ezip [retrieved on Oct. 9, 2018] p. 2—page 10. 0.
Qualcomm Incorporated: "Solution for Key Issue 13: UE Location Information Exposure," 3GPP Draft; S2-188064_ENA_UE Location Information Exposure, 3RD Generation Partnership Project (3GPP), Mobile Competence Centre; 650, Route Des Lucioles; F-06921 Sophia-Antipolis Cedex; France, vol. SA WG2, No. Sophia-Antipolis, France; Aug. 20-24, 2018, Aug. 14, 2018, XP051537005, 4 pages, Retrieved from the Internet: URL: http://www.3gpp.org/ftp/tsg%5Fsa/WG2%05FArch/TSGS2%05F12BIS%05FSophia%5FAntipolis/Docs/S2%2D188064%2Ezip [retrieved on Aug. 14, 2018] the whole document.
Qualcomm Incorporated: "Unified Solution for Location Service Exposure," 3GPP Draft; S2-188083 (P-CR for TR 23.731 for Unified Solution for Location Service Exposure)-R2, 3RD Generation Partnership Project (3GPP), Mobile Competence Centre; 650, Route Des Lucioles; F-06921, vol. SA WG2, No. Sophia- Antipolis, France; Aug. 20-24, 2018, Aug. 14, 2018, XP051502926, 8 page, Retrieved from the Internet: URL: http://www.3gpp.org/ftp/tsg%5Fsa/WG2%5FArch/TSGS2%5F12BIS%5FSophia%5FAntipolis/Docs/S2%2D188083%2Ezip [retrieved on Aug. 14, 2018] the whole document.
Qualcomm Incorporated: "Support for Key Issue on Coexistence with the Location Solution in Release 15", SA WG2 Meeting #128,

(56) References Cited

OTHER PUBLICATIONS

3GPP Draft; S2-186651 (P-CR for TR 23.731 for Support for Key Issue on Coexistence With Rel-15 Location Solution), 3rd Generation Partnership Project (3GPP), Mobile Competence Centre; 650, Route Des, vol. SA WG2, No. Vilnius, Lithuania; Jul. 2-6, 2018, Jul. 1, 2018 (Jul. 1, 2018), 14 pages, XP051469798, Retrieved from the Internet: URL: http://www.3gpp.org/ftp/Meetings%5F3GPP%5FSYNC/SA2/Docs [retrieved on Jan. 17, 2018] p. 2, line 19—p. 1.

* cited by examiner

LOW POWER PERIODIC AND TRIGGERED LOCATION OF A MOBILE DEVICE USING CONTROL PLANE OPTIMIZATION

CROSS-REFERENCE TO RELATED APPLICATIONS

This application is a Continuation-In-Part of U.S. application Ser. No. 16/368,204, entitled "LOW POWER PERIODIC AND TRIGGERED LOCATION OF A MOBILE DEVICE USING EARLY DATA TRANSMISSION," filed Mar. 28, 2019, which claims the benefit of U.S. Provisional Application Nos. 62/689,820, entitled "LOW POWER PERIODIC AND TRIGGERED LOCATION USING EARLY DATA TRANSMISSION," filed Jun. 25, 2018, and 62/732,558, entitled "LOW POWER PERIODIC AND TRIGGERED LOCATION USING EARLY DATA TRANSMISSION," filed Sep. 17, 2018, and claims the benefit of U.S. Provisional Application Nos. 62/862,661, entitled "LOW POWER PERIODIC AND TRIGGERED LOCATION USING EARLY DATA TRANSMISSION," filed Jun. 17, 2019, all of which are assigned to the assignee thereof and which are expressly incorporated herein by reference in their entireties.

BACKGROUND

Background Field

The present disclosure relates generally to communication, and more specifically to techniques for supporting periodic and triggered location services for user equipments (UEs) with low power usage.

Relevant Background

The Third Generation Partnership Project (3GPP) has defined location solutions, known as Control Plane (CP) location solutions, for a number of Radio Access Network (RAN) types, including a GSM EDGE RAN (GERAN), a Universal Terrestrial RAN (UTRAN), an Evolved Universal Terrestrial RAN (E-UTRAN) and a Next Generation RAN (NG-RAN). These location solutions are typically resource intensive for both a wireless network and a User Equipment (UE). For example, for each location of a UE, the following is typically required: (a) the UE is assigned a signaling connection to both a RAN and a Core Network (CN) and enters a connected state (e.g. via paging by the RAN or via a service request from the UE); (b) the UE may be authenticated and ciphering may commence; (c) internal network signaling occurs to assign a location server (LS), e.g., an Enhanced Serving Mobile Location Center (E-SMLC) or a Location Management Function (LMF); (d) signaling, e.g., using a Long Term Evolution (LTE) Positioning Protocol (LPP), is exchanged between the UE and the LS to coordinate and obtain location measurements; (e) the UE obtains location measurements, may compute a location using the location measurements and sends the location measurements and/or the location to the LS; (f) the LS computes a location of the UE from the received location measurements or verifies the received location; (g) the LS transfers the location of the UE either to an external client via other network elements, e.g., a Gateway Mobile Location Center (GMLC), or to the UE; and (h) the signaling connections and LS assignment are released.

For a UE, such as an Internet of Things (IoT) UE, that is regularly tracked, e.g., at five minute or one hour intervals, the above-described process is typically battery intensive. Moreover, for a network supporting millions (or even billions) of UEs and/or IoT UEs, the above-described process would drain resources from the network. It may therefore be desirable to develop location solutions which reduce the usage of network resources and UE battery consumption.

SUMMARY

Periodic or triggered location of a user equipment (UE) is supported using control plane (CP) optimization. A location server (LS), such as a 5G LMF, sends a request to a UE for periodic or triggered location and includes a request and/or criteria for using CP optimization. After confirming the request, the UE monitors for periodic or triggering events and, for each detected event, sends an event report to the LS which may include location information. In embodiments, the UE establishes a signaling connection with a RAN node but not initially with a core network to send the event report using CP optimization. The RAN node may then release the signaling connection, either immediately or after the LS returns a single response to the UE.

In one implementation, a method for supporting periodic and triggered location of a user equipment (UE) in a wireless network performed by the UE, the method includes receiving a request for a periodic or triggered location from a location server in the wireless network; sending a response to the location server, the response confirming the periodic or triggered location; detecting a periodic or triggering event; determining whether to report a trigger event using Control Plane (CP) Optimization; obtaining event information, the event information comprising at least one of location measurements, a location estimate, a type of detected triggering event, or a combination thereof; obtaining a signaling association with a Radio Access Network (RAN) node in the wireless network, wherein the signaling association does not include a signaling connection to a core network (CN) node; transmitting a first message to the RAN node, wherein the first message is a Radio Resource Control (RRC) message and includes an initial Non-Access Stratum (NAS) message, wherein the initial NAS message contains a routing identifier identifying the location server and an event report message containing the event information, wherein the RAN node forwards the initial NAS message to the CN node, wherein the CN node forwards the event report message to the location server; and receiving a second message from the RAN node, wherein the second message includes a NAS response message, wherein the NAS response message contains an event report acknowledgment message.

In one implementation, a user equipment (UE) in a wireless network capable of supporting periodic and triggered location, including at least one wireless transceiver configured to wirelessly communicate with entities in the wireless network; at least one memory; and at least one processor coupled to the at least one wireless transceiver and the at least one memory and configured to: receive via the at least one wireless transceiver a request for a periodic or triggered location from a location server in the wireless network; send via the at least one wireless transceiver a response to the location server, the response confirming the periodic or triggered location; detect a periodic or triggering event; determine whether to report a trigger event using Control Plane (CP) Optimization; obtain event information, the event information comprising at least one of location measurements, a location estimate, a type of detected triggering event, or a combination thereof; obtain a signaling association with a Radio Access Network (RAN) node in the wireless network, wherein the signaling association does not include a signaling connection to a core network (CN) node; transmit via the at least one wireless transceiver a first message to the RAN node, wherein the first message is a Radio Resource Control (RRC) message and includes an initial Non-Access Stratum (NAS) message, wherein the initial NAS message contains a routing identifier identifying the location server and an event report message containing the event information, wherein the RAN node forwards the NAS message to the CN node, wherein the CN node forwards the event report message to the location server; and receive via the at least one wireless transceiver a second message from the RAN node, wherein the second message includes a NAS response message, wherein the NAS response message contains an event report acknowledgment message.

In one implementation, a user equipment (UE) in a wireless network capable of supporting periodic and triggered location, includes means for receiving a request for a periodic or triggered location from a location server in the wireless network; means for sending a response to the location server, the response confirming the periodic or triggered location; means for detecting a periodic or triggering event; means for determining whether to report a trigger event using Control Plane (CP) Optimization; means for obtaining event information, the event information comprising at least one of location measurements, a location estimate, a type of detected triggering event, or a combination thereof; means for obtaining a signaling association with a Radio Access Network (RAN) node in the wireless network, wherein the signaling association does not include a signaling connection to a core network (CN) node; means for transmitting a first message to the RAN node, wherein the first message is a Radio Resource Control (RRC) message and includes an initial Non-Access Stratum (NAS) message, wherein the initial NAS message contains a routing identifier identifying the location server and an event report message containing the event information, wherein the RAN node forwards the initial NAS message to the CN node, wherein the CN node forwards the event report message to the location server; and means for receiving a second message from the RAN node, wherein the second message includes a NAS response message, wherein the NAS response message contains an event report acknowledgment message.

In one implementation, a non-transitory storage medium including program code stored thereon, the program code is operable to configure at least one processor in a user equipment (UE) in a wireless network capable of supporting periodic and triggered location, includes program code to receive a request for a periodic or triggered location from a location server in the wireless network; program code to send a response to the location server, the response confirming the periodic or triggered location; program code to detect a periodic or triggering event; program code to determine whether to report a trigger event using Control Plane (CP) Optimization; program code to obtain event information, the event information comprising at least one of location measurements, a location estimate, a type of detected triggering event, or a combination thereof; program code to obtain a signaling association with a Radio Access Network (RAN) node in the wireless network, wherein the signaling association does not include a signaling connection to a core network (CN) node; program code to transmit a first message to the RAN node, wherein the first message is a Radio Resource Control (RRC) message and includes an initial Non-Access Stratum (NAS) message, wherein the initial NAS message contains a routing identifier identifying the location server and an event report message containing the event information, wherein the RAN node forwards the initial NAS message to the CN node, wherein the CN node forwards the event report message to the location server; and program code to receive a second message from the RAN node, wherein the second message includes a NAS response message, wherein the NAS response message contains an event report acknowledgment message.

In one implementation, a method for supporting periodic and triggered location of a user equipment (UE) performed by a location server, includes sending a first request for a periodic or triggered location to the UE, the first request including a first indication that the UE may report detected periodic or triggering events using Control Plane (CP) optimization; receiving a response from the UE, the response confirming the periodic or triggered location; receiving from a first core network (CN) node an event report message and an indication of CP optimization, wherein the event report message is sent by the UE to the CN node using CP optimization, wherein the event report message contains event information obtained by the UE after the UE detected a periodic or triggering event, wherein the event information comprises at least one of location measurements, a location estimate, a type of detected triggering event, or a combination thereof; determining location information for the UE based on the event information; and transmitting the location information for the UE to another entity.

In one implementation, a location server for supporting periodic and triggered location of a user equipment (UE) includes an external interface configured to communicate with a wireless network; and at least one processor coupled to the external interface and configured to send via the external interface a first request for a periodic or triggered location to the UE, the first request including a first indication that the UE may report detected periodic or triggering events using Control Plane (CP) optimization; receive via the external interface a response from the UE, the response confirming the periodic or triggered location; receiving from a first core network (CN) node an event report message and an indication of CP optimization, wherein the event report message is sent by the UE to the CN node using CP optimization, wherein the event report message contains event information obtained by the UE after the UE detected a periodic or triggering event, wherein the event information comprises at least one of location measurements, a location estimate, a type of detected triggering event, or a combination thereof; determine location information for the UE based on the event information; and transmit via the external interface the location information for the UE to another entity.

In one implementation, a method for supporting periodic and triggered location of a user equipment (UE) performed by a core network (CN) node, includes receiving a first request for a periodic or triggered location from a location server and sending the first request for the periodic or triggered location to the UE, the first request including an indication that the UE may report detected periodic or triggering events using Control Plane (CP) optimization; receiving a response from the UE and sending the response to the location server, the response confirming the periodic or triggered location; receiving from a Radio Access Network (RAN) node a first Non-Access Stratum (NAS) message, wherein the first NAS message comprises a routing identifier identifying the location server, an event report message containing event information obtained by the UE after the UE detected a periodic or triggering event, and a Release Assistance Indication (RAI), wherein the RAI comprises an indication that one response message is expected by the UE, wherein the event information comprises at least one of location measurements, a location estimate, a type of detected triggering event, or a combination thereof; and sending the event report message and an indication of CP optimization to the location server.

In one implementation, a core network (CN) node for supporting periodic and triggered location of a user equipment (UE) performed includes an external interface configured to communicate with a wireless network; and at least one processor coupled to the external interface and configured to receive via the external interface a first request for a periodic or triggered location from a location server and sending the first request for the periodic or triggered location to the UE, the first request including an indication that the UE may report detected periodic or triggering events using Control Plane (CP) optimization; receive via the external interface a response from the UE and sending the response to the location server, the response confirming the periodic or triggered location; receive via the external interface from a Radio Access Network (RAN) node a first Non-Access Stratum (NAS) message, wherein the first NAS message comprises a routing identifier identifying the location server, an event report message containing event information obtained by the UE after the UE detected a periodic or triggering event, and a Release Assistance Indication (RAI), wherein the RAI comprises an indication that one response message is expected by the UE, wherein the event information comprises at least one of location measurements, a location estimate, a type of detected triggering event, or a combination thereof; and send via the external interface the event report message and an indication of CP optimization to the location server.

In one implementation, a method for supporting periodic and triggered location of a user equipment (UE) performed by a Radio Access Network (RAN) node, includes receiving a request for a periodic or triggered location from a core network (CN) node and sending the request for the periodic or triggered location to the UE, the request including an indication that the UE may report detected periodic or triggering events using Control Plane (CP) optimization; receiving a response from the UE and sending the response to the CN node, the response confirming the periodic or triggered location; receiving a request for a signaling association from the UE, wherein the signaling association does not comprise a signaling connection to the CN node; providing the signaling association to the UE; receiving a first message from the UE, wherein the first message contains an initial Non-Access Stratum (NAS) message containing a routing identifier identifying a location server and an event report message containing event information obtained by the UE after detecting a periodic or triggering event, the event information comprising at least one of location measurements, a location estimate, a type of detected triggering event, or a combination thereof; sending the initial NAS message to the CN node, wherein the CN node forwards the event report message to the location server; and sending a second message to the UE, wherein the second message releases the signaling association to the UE.

In one implementation, a Radio Access Network (RAN) node for supporting periodic and triggered location of a user equipment (UE) includes an external interface configured to communicate with a wireless network; and at least one processor coupled to the external interface and configured to receive via the external interface a request for a periodic or triggered location from a core network (CN) node and sending the request for the periodic or triggered location to the UE, the request including an indication that the UE may report detected periodic or triggering events using Control Plane (CP) optimization; receive via the external interface a response from the UE and sending the response to the CN node, the response confirming the periodic or triggered location; receive via the external interface a request for a signaling association from the UE, wherein the signaling association does not comprise a signaling connection to the CN node; provide via the external interface the signaling association to the UE; receive via the external interface a first message from the UE, wherein the first message contains an initial Non-Access Stratum (NAS) message containing a routing identifier identifying a location server and an event report message containing event information obtained by the UE after detecting a periodic or triggering event, the event information comprising at least one of location measurements, a location estimate, a type of detected triggering event, or a combination thereof; send via the external interface the initial NAS message to the CN node, wherein the CN node forwards the event report message to the location server; and sending a second message to the UE, wherein the second message releases the signaling association to the UE.

BRIEF DESCRIPTION OF THE DRAWINGS

An understanding of the nature and advantages of various embodiments may be realized by reference to the following figures.

Figure 1:
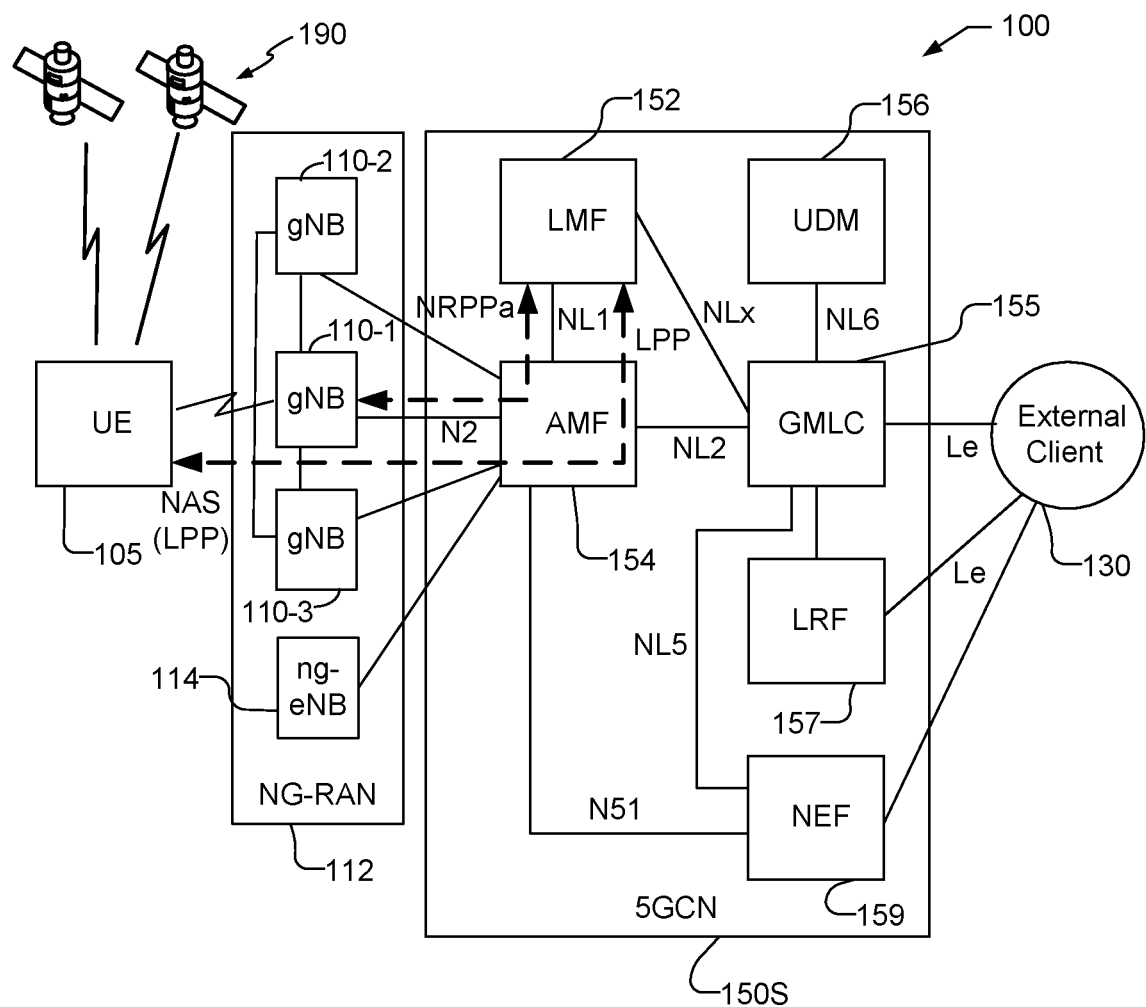
FIG. 1 is a block diagram illustrating a non-roaming reference architecture for a control plane (CP) location solution in a 5G wireless network.

Like reference numbers and symbols in the various figures indicate like elements, in accordance with certain example implementations. In addition, multiple instances of an element may be indicated by following a first number for the element with a letter or with a hyphen and a second number. For example, multiple instances of an element 110 may be indicated as 110-1, 110-2, 110-3 etc. Similarly, multiple instances of an element 150 may be indicated as 150S, 150V, 150H etc. When referring to such an element using only the first number, any instance of the element is to be understood (e.g. element 110 in the previous example would refer to any of elements 110-1, 110-2 and 110-3, and element 150 in the previous example would refer to any of elements 150S, 150V and 150H).

DETAILED DESCRIPTION

Several solutions have been defined and evaluated by the Third Generation Partnership Project (3GPP) for supporting location of a user equipment (UE) that is accessing a Fifth Generation (5G) wireless network. One solution, referred to here as an AMF based location solution (also referred to as an AMF solution or an AMF based solution), is closely aligned with the location solution for Fourth Generation (4G) Long Term Evolution (LTE) wireless access defined in 3GPP Technical Specification (TS) 23.271, and requires all location requests to pass through, and to be managed and coordinated by, a serving Access and Mobility Management Function (AMF) for a target UE. Another solution, referred to here as an LMF based location solution (also referred to as an LMF solution or an LMF based solution), requires all location requests to pass through, and to be managed and coordinated by a Location Management Function (LMF) in a serving 5G Core Network (5GCN) for a target UE and has fewer location specific impacts to a serving AMF. A third location solution, referred to here as a combined AMF and LMF based location solution (also referred to as a combined AMF and LMF solution or a combined AMF and LMF based solution), combines aspects of both an AMF based and an LMF based location solution by managing and coordinating location of a target UE partly in a serving AMF and partly in an LMF.

Periodic and triggered location of a UE is a type of location service in which event reports for a target UE, each typically containing a location estimate for the UE, are sent to an external client at periodic intervals (e.g. fixed periodic intervals) and/or when certain trigger events occur. Trigger events can include a target UE moving into, moving out of, or remaining within a defined geographic area, or a target UE moving by more than some minimum threshold straight line distance from a previous location of the target UE. With periodic and triggered location (e.g. over an extended period of an hour, a day or a week), it is possible that hundreds or even thousands of event reports for a UE may be sent to an external client, with each event report typically containing a current location estimate for the UE.

Support of periodic and triggered location (e.g. as defined for LTE access in 3GPP TS 23.271) traditionally requires a UE to report a detected trigger event by establishing a signaling connection with a network and exchanging signaling with a network node (e.g. an MME or AMF) and/or a location server (LS) (e.g. an E-SMLC or LMF) to report the trigger event and enable location of the UE. For low power Internet of Things (IoT) devices, the use of a signaling connection for some short period (e.g. 30-60 seconds) and exchange of multiple signaling messages may significantly reduce battery life when a large number of events reports are sent (e.g. hundreds or thousands as mentioned above). In addition, when used by many (e g millions of) IOT devices, network signaling and processing load may become excessive.

To reduce UE power usage and network signaling and processing, a UE could report trigger events using connectionless messages which are transferred to an LS without any response from the LS. However, this may require new impacts to a UE, RAN and LS for support of message transport, message authentication and message ciphering which could add to the cost and complexity of implementation. Another solution would be to make use of Control Plane (CP) optimization, also referred to as "Control Plane CIoT 5GS Optimisation", which can enable Cellular IoT (CIoT) support for small data transfer and Short Message Service (SMS) transfer with Narrowband IoT (NB-IoT) and LTE access. With CP optimization, a UE may establish a signaling connection with a RAN node (e.g. an eNB or gNB) but not initially with a core network (e.g. 5GCN), and may send an initial Non-Access Stratum (NAS) message, such as a Control Plane Service Request or an uplink (UL) NAS Transport message, to the RAN node. The initial NAS message may contain an embedded SMS message or a data Protocol Data Unit (PDU) and a Release Assistance Indication (RAI) (also referred to as Release Assistance Information), which can indicate whether the UE expects no response or one response to the embedded SMS message or data PDU. The RAN node may then forward the initial NAS message and the RAI to a core network (CN) node (e.g. an MME or AMF). The CN node forwards the encapsulated data PDU or SMS message towards its destination (e.g. via either a Serving Gateway (SGW) and Packet Data Network Gateway (PDG) or a Session Management Function (SMF) in the case of a data PDU, or via an MSC/VLR and SMS gateway or an SMS Function (SMSF) in the case of SMS). If there is no pending downlink (DL) data or Mobile Terminated (MT) SMS known to the CN node and if the RAI does not indicate that the UE expects a response, the CN node may send a release message (e.g. a NAS Service Accept which includes an end indication) to the RAN node to release the signaling connection to the UE. Otherwise, the CN node may wait for a response to be returned to the UE and/or may send any pending DL data or MT SMS message to the UE before sending a release message to the RAN node.

Use of CP optimization may reduce signaling by avoiding the need for a UE to establish a signaling connection with both the RAN node and CN node before sending the initial NAS message containing the embedded SMS message or data PDU. Likewise, release of the signaling connection between the UE and RAN node may be more efficient—e.g. if the RAI indicates that no response is expected by the UE.

The procedure described above for CP optimization may optionally be used with Early Data Transmission (EDT).

When EDT is used, the UE may not need to first obtain a signaling connection to the RAN node and can instead start an EDT transaction by sending an RRC Early Data Request message to the RAN node (e.g. on a common control channel (CCCH)) containing the initial NAS message (e.g. a CP service request) and the RAI. The RAN node then forwards the initial NAS message to the CN node as for normal CP optimization. The RAN node can later return an RRC Early Data Complete message to the UE (e.g. on a CCCH) to end the EDT transaction. The RRC Early Data Complete message may include a response message (e.g. contained in a NAS service accept message) sent by the CN node to the RAN node if the RAI indicates the UE expects one response. Use of CP optimization with EDT can be more signaling efficient than use of CP optimization without EDT since it may not be necessary to establish and later release a signaling connection between the UE and RAN node.

CP optimization with EDT or without EDT, as just described, can be further enhanced to support event reporting for periodic and triggered location of a UE with the following enhancements, which are labelled E1-E4 for later reference.

Enhancement E1: the initial NAS message sent by the UE to the RAN node may include (i) an embedded UL positioning protocol (e.g. LPP) message and/or an embedded supplementary services message (e.g. where the supplementary services message may contain the UL positioning protocol message) containing measurements or a location estimate, and (ii) a routing ID indicating a destination LS (e.g. an LMF). The CN node (e.g. an AMF) then forwards the UL positioning protocol message and/or the supplementary service message to a destination LS after receiving the initial NAS message from the RAN node.

Enhancement E2: when CP optimization is used with EDT, the RRC Early Data Request message sent by the UE to the RAN node is allowed to include an immediate release indication, which causes the RAN node to release the EDT transaction with the UE immediately (e.g. by returning an RRC Early Data Complete message to the UE), thereby minimizing UE signaling and the duration of the EDT transaction. The RAN node also indicates the immediate release to the CN node (e.g. an AMF) when forwarding the initial NAS message to the CN node, which causes the CN node to refrain from sending any pending DL data or MT SMS to the UE and from returning a release message. In some embodiments, the immediate release indication may be indicated by (e.g. included within) an RAI, which may be included in the RRC Early Data Request message.

Enhancement E3: when an LS initiates periodic and triggered location event reporting in a UE by sending a message to the UE (e.g. an LPP message or a supplementary services message), the LS includes criteria in the message defining when the UE is allowed or required to use CP optimization to send event reports and/or when the UE is allowed or required to use CP optimization with EDT and immediate release (as in enhancement E2) to send event reports. For example, the criteria can instruct the UE to use CP optimization with EDT and immediate release when the UE is idle and no response from the LS is expected, to use CP optimization with or without EDT when a single response from the LS is expected, and to use a normal NAS signaling connection instead of CP optimization in other cases or following some threshold time period or threshold number of consecutive event reports for which CP optimization is used. In some embodiments, the criteria may further indicate particular values of an RAI which the UE is permitted to include in the initial NAS message or in the RRC Early Data Request message (e.g. an RAI value indicating immediate release, an RAI value indicating early release with no response expected by the UE from the LS, or an RAI value indicating early release with one response expected by the UE from the LS).

Enhancement E4: an LS can determine a UE capability to support CP optimization for periodic and triggered location event reports using capability information supported by a positioning protocol (e.g. LPP), where the LS requests and the UE returns the UE positioning capabilities including UE support or non-support of CP optimization and/or CP optimization with EDT.

As part of supporting an LMF based location solution or a combined AMF and LMF based location solution, use of CP optimization with EDT or without EDT may be employed to reduce the signaling load on both the UE and a serving wireless network (e.g. 5G network) for a UE, as described above. Techniques for supporting CP optimization with or without EDT for an LMF based location solution and a combined AMF and LMF based location solution are described herein further down.

FIG. 1 is a simplified block diagram illustrating a communication system 100 for non-roaming support of UE location using an AMF based location solution, an LMF based location solution or a combined AMF and LMF based location solution. The non-roaming communication system 100 comprises a UE 105 and components of a Fifth Generation (5G) network comprising a Next Generation Radio Access Network (NG-RAN) 112, which includes base stations (BSs) sometimes referred to as New Radio (NR) NodeBs or gNBs 110-1, 110-2 and 110-3 (collectively and generically referred to herein as gNBs 110), and a 5G Core Network (5GCN) 150S that is in communication with an external client 130 (also referred to as a Location Services (LCS) client). The 5GCN 150S combined with the NG-RAN 112 may be referred to as a 5G System (5GS). The 5GCN 150S is a serving 5GCN for the UE 105 and is typically also a home 5GCN for UE 105 (e.g. to support non-roaming of UE 105), though in some embodiments may not be a home 5GCN when external client 130 is able to obtain a location of UE 105 from a visited network for UE 105 when UE 105 is roaming (e.g. in the case that external client 130 corresponds to a government agency or public safety authority). A 5G network may also be referred to as a New Radio (NR) network; NG-RAN 112 may be referred to as an NR RAN or a 5G RAN; and 5GCN 150S may be referred to as an Next Generation (NG) Core network (NGC). The communication system 100 may further utilize information from satellite vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 100 are described below. The communication system 100 may include additional or alternative components.

It should be noted that FIG. 1 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the communication system 100. Similarly, the communication system 100 may include a larger or smaller number of SVs 190, gNBs 110, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), and IEEE 802.11 WiFi, etc. For example, where a Wireless Local Area Network (WLAN), e.g., IEEE 802.11 radio interface, is used, the UE 105 may communicate with an Access Network (AN), as opposed to an NG-RAN, and accordingly, component 112 is sometimes referred to herein as an AN or as a RAN, denoted by the term "(R)AN", "(R)AN 112" or "RAN 112". In the case of an AN (e.g. IEEE 802.11 AN), the AN may be connected to a Non-3GPP Interworking Function (N3IWF) (not shown in FIG. 1), with the N3IWF connected to AMF 154.

The UE 105, as used herein, may be any electronic device and may be referred to as a device, a mobile device, a wireless device, a mobile terminal, a terminal, a mobile station (MS), a Secure User Plane Location (SUPL) Enabled Terminal (SET), or by some other name. Moreover, UE 105 may correspond to a smart watch, digital glasses, fitness monitor, smart car, smart appliance, cellphone, smartphone, laptop, tablet, PDA, tracking device, control device or some other portable or moveable device. The UE 105 may include a single entity or may include multiple entities such as in a personal area network where a user may employ audio, video and/or data I/O devices and/or body sensors and a separate wireline or wireless modem. Typically, though not necessarily, the UE 105 may support wireless communication using one or more Radio Access Technologies (RATs) such as Global System for Mobile communications (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR) (e.g., using the NG-RAN 112 and 5GCN 150S), etc. The UE 105 may also support wireless communication using a Wireless Local Area Network (WLAN) which may connect to other networks (e.g. the Internet) using a Digital Subscriber Line (DSL) or packet cable for example. The use of one or more of these RATs may allow the UE 105 to communicate with an external client 130 (e.g. via elements of 5GCN 150S not shown in FIG. 1, or possibly via a Gateway Mobile Location Center (GMLC) 155) and/or allow the external client 130 to receive location information regarding the UE 105 (e.g., via the GMLC 155).

The UE 105 may enter a connected state with a wireless communication network that may include the NG-RAN 112. In one example, the UE 105 may communicate with a cellular communication network by transmitting wireless signals to, or receiving wireless signals from a cellular transceiver, in the NG-RAN 112, such as a gNB 110. A transceiver provides user and control plane protocol terminations toward the UE 105 and may be referred to as a base station, a base transceiver station, a radio base station, a radio transceiver, a radio network controller, a transceiver function, a base station subsystem (BSS), an extended service set (ESS), or by some other suitable terminology.

In particular implementations, the UE 105 may have circuitry and processing resources capable of obtaining location related measurements. Location related measurements obtained by UE 105 may include measurements of signals received from SVs 190 belonging to an SPS or Global Navigation Satellite System (GNSS) such as GPS, GLONASS, Galileo or Beidou and/or may include measurements of signals received from terrestrial transmitters fixed at known locations (e.g., such as gNBs 110). UE 105 or a separate location server (e.g. LMF 152), to which UE 105 may send the measurements, may then obtain a location estimate for the UE 105 based on these location related measurements using any one of several position methods such as, for example, GNSS, Assisted GNSS (A-GNSS), Advanced Forward Link Trilateration (AFLT), Observed Time Difference Of Arrival (OTDOA), WLAN (also referred to as WiFi) positioning, or Enhanced Cell ID (ECID) or combinations thereof. In some of these techniques (e.g. A-GNSS, AFLT and OTDOA), pseudoranges or timing differences may be measured at UE 105 relative to three or more terrestrial transmitters (e.g. gNBs 110) fixed at known locations or relative to four or more SVs 190 with accurately known orbital data, or combinations thereof, based at least in part, on pilots, positioning reference signals (PRS) or other positioning related signals transmitted by the transmitters or satellites and received at the UE 105.

A location server, such as the LMF 152, may be capable of providing positioning assistance data to UE 105 including, for example, information regarding signals to be measured (e.g., expected signal timing, signal coding, signal frequencies, signal Doppler), locations and identities of terrestrial transmitters (e.g. gNBs 110) and/or signal, timing and orbital information for GNSS SVs 190 to facilitate positioning techniques such as A-GNSS, AFLT, OTDOA and ECID. The facilitation may include improving signal acquisition and measurement accuracy by UE 105 and, in some cases, enabling UE 105 to compute its estimated location based on the location measurements. For example, a location server (e.g. LMF 152) may comprise an almanac which indicates locations and identities of cellular transceivers and/or local transceivers in a particular region or regions such as a particular venue, and may provide information to UE 105 descriptive of signals transmitted by a cellular base station or AP (e.g. a gNB 110) such as transmission power and signal timing. A UE 105 may obtain measurements of signal strengths (e.g. received signal strength indication (RSSI)) for signals received from cellular transceivers and/or local transceivers and/or may obtain a signal to noise ratio (S/N), a reference signal received power (RSRP), a reference signal received quality (RSRQ), a time of arrival (TOA), a Receive time-Transmit time difference (Rx-Tx), or a round trip signal propagation time (RTT) between UE 105 and a cellular transceiver (e.g. a gNB 110) or a local transceiver (e.g. a WiFi access point (AP)). A UE 105 may transfer these measurements to a location server, such as LMF 152, to determine a location for UE 105, or in some implementations, may use these measurements together with assistance data (e.g. terrestrial almanac data or GNSS satellite data such as GNSS Almanac and/or GNSS Ephemeris information) received from a location server (e.g. LMF 152) or broadcast by a base station (e.g. a gNB 110) in NG-RAN 112 to determine a location for UE 105.

In the case of OTDOA, UE 105 may measure a Reference Signal Time Difference (RSTD) between signals such as a position reference signal (PRS), Cell specific Reference Signal (CRS), or Tracking Reference Signal (TRS) transmitted by nearby pairs of transceivers and base stations (e.g. gNBs 110). An RSTD measurement may provide the time of arrival difference between signals (e.g. TRS, CRS or PRS) received at UE 105 from two different transceivers. The UE 105 may return the measured RSTDs to a location server (e.g. LMF 152) which may compute an estimated location for UE 105 based on known locations and known signal timing for the measured transceivers. In some implementations of OTDOA, the signals used for RSTD measurements (e.g. PRS or CRS signals) may be accurately synchronized by the transceivers to a common universal time such as GPS time or Coordinated Universal Time (UTC), e.g., using a GPS receiver at each transceiver to accurately obtain the common universal time.

An estimate of a location of the UE 105 may be referred to as a location, location estimate, location fix, fix, position, position estimate or position fix, and may be geodetic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location, or relative to some previous location of UE 105, which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

As shown in FIG. 1, pairs of gNBs 110 in NG-RAN 112 may be connected to one another, e.g., directly as shown in FIG. 1 or indirectly via other gNBs 110. Access to the 5G network is provided to UE 105 via wireless communication between the UE 105 and one or more of the gNBs 110, which may provide wireless communication access to the 5GCN 150S on behalf of the UE 105 using 5G NR. In FIG. 1, the serving gNB for UE 105 is assumed to be gNB 110-1, although other gNBs (e.g. gNB 110-2 and/or gNB 110-3) may act as a serving gNB if UE 105 moves to another location or may act as a secondary gNB to provide additional throughout and bandwidth to UE 105. Some gNBs 110 in FIG. 1 (e.g. gNB 110-2 or gNB 110-3) may be configured to function as positioning-only beacons which may transmit signals (e.g. directional PRS) to assist positioning of UE 105 but may not receive signals from UE 105 or from other UEs.

As noted, while FIG. 1 depicts nodes configured to communicate according to 5G communication protocols, nodes configured to communicate according to other communication protocols, such as, for example, the LTE protocol, may be used. Such nodes, configured to communicate using different protocols, may be controlled, at least in part, by the 5GCN 150S. Thus, the NG-RAN 112 may include any combination of gNBs, evolved Node Bs (eNBs), or other types of base stations or access points. As an example, NG-RAN 112 may include one or more next generation eNBs (ng-eNBs) 114 which provide LTE wireless access to UE 105 and may connect to entities in 5GCN 150S such as AMF 154.

The gNBs 110 and/or the ng-eNB 114 can communicate with the Access and Mobility Management Function (AMF) 154, which, for positioning functionality, communicates with a Location Management Function (LMF) 152. The AMF 154 may support network attachment of UE 105, mobility of UE 105, including cell change and handover, and may participate in supporting a signaling connection to the UE 105 and possibly helping establish and release Protocol Data Unit (PDU) sessions for UE 105. Other functions of AMF 154 may include: termination of a control plane (CP) interface from NG-RAN 112; termination of Non-Access Stratum (NAS) signaling connections from UEs such as UE 105, NAS ciphering and integrity protection; registration management; connection management; reachability management; mobility management; access authentication and authorization.

The LMF 152 may support positioning of the UE 105 when UE 105 accesses the NG-RAN 112 and may support position procedures/methods such as Assisted GNSS (A-GNSS), Observed Time Difference of Arrival (OTDOA), Real Time Kinematic (RTK), Precise Point Positioning (PPP), Differential GNSS (DGNSS), Enhanced Cell ID (ECID), angle of arrival (AOA), angle of departure (AOD), WLAN positioning, RTT, and/or other position methods. The LMF 152 may also process location services requests for the UE 105, e.g., received from the GMLC 155 or from the AMF 154. In some embodiments, a node/system that implements the LMF 152 may additionally or alternatively implement other types of location-support modules, such as an Enhanced Serving Mobile Location Center (E-SMLC) or a Secure User Plane Location (SUPL) Location Platform (SLP). It is noted that in some embodiments, at least part of the positioning functionality (including derivation of UE 105's location) may be performed at the UE 105 (e.g., using signal measurements for signals transmitted by wireless nodes, and assistance data provided to the UE 105).

The GMLC 155 may support a location request for the UE 105 received from an external client 130, and may forward such a location request to a serving AMF 154 for UE 105, in the case of an AMF based location solution or a combined AMF and LMF based location solution. The AMF 154 may then forward the location request to LMF 152, which may obtain one or more location estimates for UE 105 (e.g. according to the request from external client 130) and may return the location estimate(s) to AMF 154, which may return the location estimate(s) to external client 130 via GMLC 155. In an alternative LMF based location solution, the GMLC 155 may forward a location request received from external client 130 directly to the LMF 152, thereby bypassing and not impacting the serving AMF 154. The LMF 152 may then obtain one or more location estimates for UE 105 similarly to the AMF based location solution, and may return the location estimate(s) directly to the GMLC 155, which may return the location estimate(s) (as for the AMF based location solution) to the external client 130.

For an AMF based location solution, an LMF based location solution or a combined AMF and LMF based location solution, GMLC 155 may contain subscription information for an external client 130 and may authenticate and authorize a location request for UE 105 from external client 130. GMLC 155 may further initiate a location session for UE 105 by sending a location request for UE 105 to either AMF 154 or LMF 152 (e.g. according to the type of location solution being used), and may include in the location request an identity for UE 105 and the type of location being requested (e.g. such as a current location or a sequence of periodic or triggered locations).

As further illustrated in FIG. 1, the LMF 152 and the gNBs 110 may communicate using a New Radio Position Protocol A (NRPPa) defined in 3GPP TS 38.455, with NRPPa messages being transferred between the gNBs 110 and the LMF 152 via the AMF 154. As further illustrated in FIG. 1, LMF 152 and UE 105 may communicate using the LTE Positioning Protocol (LPP) defined in 3GPP TS 36.355, where LPP messages are transferred between the UE 105 and the LMF 152 via the serving AMF 154 and a serving gNB 110-1 for UE 105. For example, LPP messages may be transferred between the LMF 152 and the AMF 154 using service operations based on the HyperText Transfer Protocol (HTTP), and may be transferred between the AMF 154 and the UE 105 using a 5G Non-Access Stratum (NAS) protocol. The LPP protocol may be used to support positioning of UE 105 using UE assisted and/or UE based position methods such as Assisted GNSS (A-GNSS), Real Time Kinematic (RTK), Wireless Local Area Network (WLAN), Observed Time Difference of Arrival (OTDOA) and/or Enhanced Cell Identity (ECID). The NRPPa protocol may be used to support positioning of UE 105 using network based position methods such as ECID (when used with measurements obtained by a gNB 110) and/or may be used by LMF 152 to obtain location related information from gNBs 110 such as parameters defining positioning reference signal (PRS) transmission from gNBs 110 and gNB 110 locations for support of OTDOA and ECID.

With a UE assisted position method, UE 105 may obtain location measurements (e.g. measurements of RSSI, RTT, RSTD, RSRP and/or RSRQ for gNBs 110, ng-eNBs 114 or WLAN APs, or measurements of GNSS pseudorange, code phase and/or carrier phase for SVs 190), and send the measurements to a location server (e.g. LMF 152) for computation of a location estimate for UE 105. With a UE based position method, UE 105 may obtain location measurements (e.g. which may be the same as or similar to location measurements for a UE assisted position method), and may compute a location of UE 105 (e.g. with the help of assistance data received from a location server such as LMF 152 or broadcast by gNBs 110, ng-eNBs 114 or other base stations or APs). With a network based position method, one or more base stations (e.g. gNBs 110 and/or ng-eNBs 114) or APs may obtain location measurements (e.g. measurements of RSSI, RTT, RSRP, RSRQ or TOA for signals transmitted by UE 105), and/or may receive measurements obtained by UE 105, and may send the measurements to a location server (e.g. LMF 152) for computation of a location estimate for UE 105.

Information provided by the gNBs 110 to the LMF 152 using NRPPa may include timing and configuration information for PRS transmission and location coordinates of the gNBs 110. The LMF 152 can then provide some or all of this information to the UE 105 as assistance data in an LPP message via the NG-RAN 112 and the 5GCN 150S.

An LPP message sent from the LMF 152 to the UE 105 may instruct the UE 105 to do any of a variety of things, depending on desired functionality. For example, the LPP message could contain an instruction for the UE 105 to obtain measurements for GNSS (or A-GNSS), WLAN, OTDOA, and/or ECID (or some other position method). In the case of OTDOA, the LPP message may instruct the UE 105 to obtain one or more measurements (e.g. RSTD measurements) of PRS signals transmitted within particular cells supported by particular gNBs 110 (or supported by one or more ng-eNBs 114 or eNBs). The UE 105 may send the measurements back to the LMF 152 in an LPP message (e.g. inside a 5G NAS message) via the serving gNB 110-1 and the AMF 154.

In some embodiments, LPP may be augmented by or replaced by an NR positioning protocol (NPP or NRPP) which supports position methods such as OTDOA and ECID for NR radio access. For example, an LPP message may contain an embedded NPP message or may be replaced by an NPP message. In some other embodiments, LPP may be augmented by the LPP Extensions (LPPe) protocol defined by the Open Mobile Alliance (OMA), in which an LPP message may include an embedded LPPe message. The combined LPP and LPPe protocols may then be referred to as LPP/LPPe.

When NG-RAN 112 includes one or more ng-eNBs 114, an ng-eNB 114 may communicate with LMF 152 using NRPPa in order to support positioning of UE 105 (e.g. using a network based position method) and/or may enable transfer of LPP and/or NPP messages between UE 105 and LMF 152 via the ng-eNB 114 and AMF 154. An ng-eNB 114 and/or a gNB 110 in NG-RAN 112 may also broadcast positioning assistance data to UEs such as UE 105.

As illustrated, a Unified Data Management (UDM) 156 may be connected to the GMLC 155. The UDM 156 is analogous to a Home Subscriber Server (HSS) for LTE access, and if desired, the UDM 156 may be combined with an HSS. The UDM 156 is a central database that contains user-related and subscription-related information for UE 105 and may perform the following functions: UE authentication, UE identification, access authorization, registration and mobility management, subscription management and Short Message Service management. Additionally, the GMLC 155 is connected to a Location Retrieval Function (LRF) 157, which handles retrieval of location information for the UE 105 and may be used to provide location information for UE 105 to an external client 130 that is a Public Safety Answering Point (PSAP), e.g. following an emergency call from UE 105 to the PSAP.

To support services including location services from external clients 130 for Internet of Things (IoT) UEs, a Network Exposure Function (NEF) 159 may be included. An NEF may also be referred to as a Service Capability Exposure Function (SCEF), e.g. for a UE 105 with LTE access to an Evolved Packet Core (EPC) rather than 5G NR radio access to 5GCN 150S. The NEF 159, for example, may function to obtain a current or last known location for a UE 105, may obtain an indication of a change in location for a UE 105, or an indication of when a UE 105 becomes available (or reachable). The NEF 159 may be connected to the GMLC 155 to support last known location, current location and/or periodic and triggered location for the UE 105. The NEF 159 may also or instead be connected to the AMF 154 to support last known location, current location and/or periodic and triggered location for the UE 105. If desired, the NEF 159 may include, or may be combined with, the GMLC 155. For example, in the procedures described later in association with FIGS. 6-8, NEF 159 may replace HGMLC 155H or may be combined with HGMLC 155H.

As described previously, an AMF based location solution uses an AMF as the main anchor point for location services for a target UE. In the case of communication system 100, this would mean using serving AMF 154 as the main anchor point for obtaining one or more locations of UE 105. The AMF based solution may then require all location requests for UE 105 to pass through, and to be managed and coordinated by, AMF 154. An LMF based location, on the other hand, may require all location requests to pass through, and to be managed and coordinated by an LMF in the serving 5GCN for a target UE. In the case of communication system 100, this would mean using LMF 152 as the main anchor point for obtaining one or more locations of UE 105. An LMF based solution may have fewer location specific impacts to a serving AMF than an AMF based solution. However, an AMF based solution may align better with the current EPC location solution for LTE access defined in 3GPP TS 23.271, which may reduce network impacts in migrating from one solution to the other or in supporting both solutions.

From an efficiency perspective, there may be little difference between an AMF based solution and an LMF based solution for a single location of a target UE. However, for multiple locations of a target UE 105 based on periodic or triggered events, an LMF based solution may be more efficient than an AMF based solution in terms of requiring less signaling and processing and using fewer network entities and network interfaces. This may be a consequence of avoiding transfer and support of location event reports for a UE 105 by a serving AMF 154 and by avoiding establishing and releasing a location session between an AMF 154 and LMF 152 for each periodic or triggered location of the UE 105 which needs to be obtained. Since location event reports are likely to consume the bulk of overall resource utilization for periodic or triggered location requests, optimization of this portion of a procedure using aspects of an LMF based solution may be desirable, whereas a portion of a procedure concerned with initiating a location request and activating a location request in a target UE 105, being performed once only, may be less in need of optimization and may therefore retain aspects of an AMF based solution. Accordingly, to retain consistency with an AMF based location solution for single location requests for a target UE 105, a combined AMF and LMF based solution may be used for periodic and triggered location, which uses elements from an AMF based solution to initiate and establish a deferred (e.g. periodic and triggered) location session and elements of an LMF based solution to obtain and report individual location events.

Figure 2:
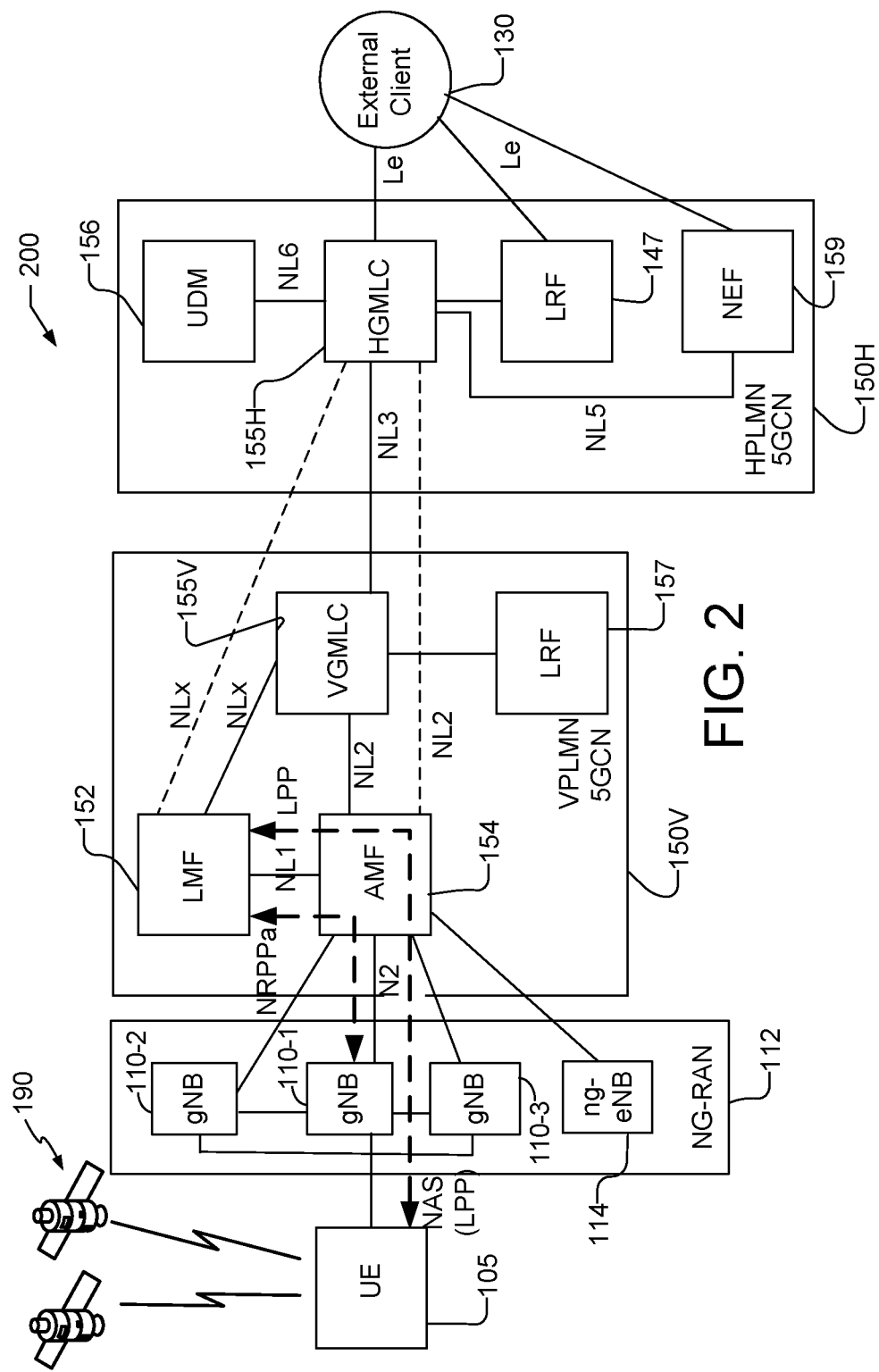
FIG. 2 is a block diagram illustrating a roaming reference architecture for a CP location solution in a 5G wireless network.

FIG. 2 illustrates a communication system 200 that is similar to the communication system 100 shown in FIG. 1, but supports location for a roaming UE 105. Similar to communication system 100, communication system 200 may provide roaming support for an AMF based location solution, an LMF based location solution or a combined AMF and LMF based location solution. In the communication system 200, the core network 5GCN 150V that is in communication with the UE 105 via the NG-RAN 112 is a visited network, also referred to as a Visited Public Land Mobile Network (VPLMN), which is in communication with a home network 5GCN 150H, also referred to as a Home Public Land Mobile Network (HPLMN). In communication system 200, the VPLMN 5GCN 150V includes the Location Management Function (LMF) 152. The LMF 152 in communication system 200 may perform the same functions and operations as LMF 152 in the non-roaming communication system 100 of FIG. 1. The VPLMN 5GCN 150V also includes a Visited Gateway Mobile Location Center (VGMLC) 155V, which is similar to the GMLC 155 in the non-roaming communication system of FIG. 1, and is designated as 155V to indicate that it is located in the visited network for UE 105. As illustrated in FIG. 2, the VGMLC 155V connects to the LMF 152 and to the LRF 157 in the VPLMN 5GCN 150V in the case of an LMF based location solution, connects to the AMF 154 and to the LRF 157 in the VPLMN 5GCN 150V in the case of an AMF based location solution, or connects to the AMF 154, LMF 152 and to the LRF 157 in the VPLMN 5GCN 150V in the case of a combined AMF and LMF based location solution.

As illustrated, HPLMN 5GCN 150H may include a Home GMLC (HGMLC) 155H that may be connected to the VGMLC 155V (e.g., via the Internet). Optionally (and as shown by the dashed lines in FIG. 2), HGMLC 155H may be connected to LMF 152 in the case of an LMF based location solution, to the AMF 154 in the case of an AMF based location solution, or to both LMF 152 and AMF 154 in the case of a combined AMF and LMF based location solution (e.g. via the Internet) and may in that case not always be connected to VGMLC 155V. The HGMLC 155H may be similar to the GMLC 155 in the non-roaming communication system of FIG. 1, and is designated as 155H to indicate that it located in the home network for UE 105. The VGMLC 155V and HGMLC 155H may be sometimes collectively and generically referred to herein as GMLC 155. The HGMLC 155H is in communication with the external client 130, as well as the UDM 156 and LRF 147 in the HPLMN 150H. The LRF 147 may also communicate with the external client 130 and may perform similar functions to LRF 157. The HGMLC 155H may provide location access to UE 105 on behalf of external clients such as external client 130. One or more of HGMLC 155H and LRF 147 may be connected to external client 130, e.g., through another network, such as the Internet. In some cases, a Requesting GMLC (RGMLC) located in another PLMN (not shown in FIG. 2) may be connected to HGMLC 155H (e.g., via the Internet) in order to provide location access to UE 105 on behalf of external clients connected to the RGMLC. The RGMLC, HGMLC 155H and VGMLC 155V may support location access to UE 105, at least in part, using the 3GPP CP solution defined in 3GPP TS 23.271. HPLMN 5GCN 150H also includes NEF 159 which may correspond to NEF 159 in communication system 100 and may be connected to HGMLC 155H and/or to AMF 154 (not shown in FIG. 2).

Some interfaces (also referred to as reference points) in FIGS. 1 and 2 are labelled. The interfaces labelled as Le, N2, NL1, NL2, NL3, NLS, NL6, NLx and N51 in FIGS. 1 and 2 may be interfaces that support control plane signaling and may be associated with control plane protocols that are used over one or more of the interfaces to support the control plane signaling. In the case of the NL1, NL2, NL3, NLS, NL6 NLx and N51 interfaces, the control plane protocols may support service based operations and may be based on the HyperText Transfer Protocol (HTTP). In addition, a CP NG Application Protocol (NGAP) defined in 3GPP TS 38.413 may be used between an AMF 154 and a gNB 110 or ng-eNB 114 over an N2 interface; a CP LPP or NPP protocol may be used between a UE 105 and an LMF 152; and a CP supplementary service protocol (e.g. as defined in 3GPP TS 24.080) may be used between UE 105 and LMF 152 and/or between UE 105 and AMF 154.

As noted, while the communication systems 100 and 200 are described in relation to 5G technology, the communication systems may be implemented to support other communication technologies, such as GSM, WCDMA, LTE, WiFi IEEE 802.11 etc., that are used for supporting and interacting with mobile devices such as the UE 105 (e.g., to implement voice, data, positioning, and other functionalities). For example, in some embodiments, 5GCN 150S, 150V and/or 150H may be connected to a WLAN using a Non-3GPP InterWorking Function (N3IWF, not shown FIGS. 1 and 2) in the 5GCN 150. For example, the WLAN may support IEEE 802.11 WiFi access for UE 105. Here, the N3IWF may connect to the WLAN and to other elements in the 5GCN 150 such as AMF 154. The location solutions described herein may then operate the same as or similarly to that described further down with the difference that an LMF 152 may no longer interact with NG-RAN 112 to obtain location related information for UE 105 and may instead interact with UE 105 by sending and receiving LPP and/or NPP messages with UE 105 via the N3IWF and WLAN.

In other embodiments, the 5GCNs 150S, 150V and 150H (collectively referred to as 5GCN 150) may be configured to control different air interfaces and associated RANs, such as the Evolved Universal Terrestrial Radio Access Network (E-UTRAN) comprising one or more evolved NodeBs (eNBs) in place of the gNBs 110. In some other embodiments, both the NG-RAN 112 and the 5GCNs 150S, 150V and 150H may be replaced by other RANs and other core networks. For example, in an Evolved Packet System (EPS) defined by 3GPP to support LTE access: the UE 105 may access the EPS rather than the NG-RAN 112 and 5GCN 150; the NG-RAN 112 may be replaced by an E-UTRAN containing eNBs in place of the gNBs 110; and the 5GCN 150 may be replaced by an Evolved Packet Core (EPC) comprising a Mobility Management Entity (MME) in place of the AMF 154, an Enhanced Serving Mobile Location Center (E-SMLC) in place of the LMF 152 and a GMLC that may be similar or identical to the GMLC 155 (or VGMLC 155V or HGMLC 155H). In such an EPS, the E-SMLC may use the LPPA protocol (LPPa) defined in 3GPP TS 36.455 in place of NRPPa to send and receive location information to and from the eNBs in the E-UTRAN and may use LPP to support positioning of UE 105. In addition, in some implementations, base stations (e.g. similar to or based on a gNB 110 or ng-eNB 114) may function as positioning only beacons and transmit signals (e.g. PRS) to assist positioning of a UE 105 but not receive signals.

Figure 3:
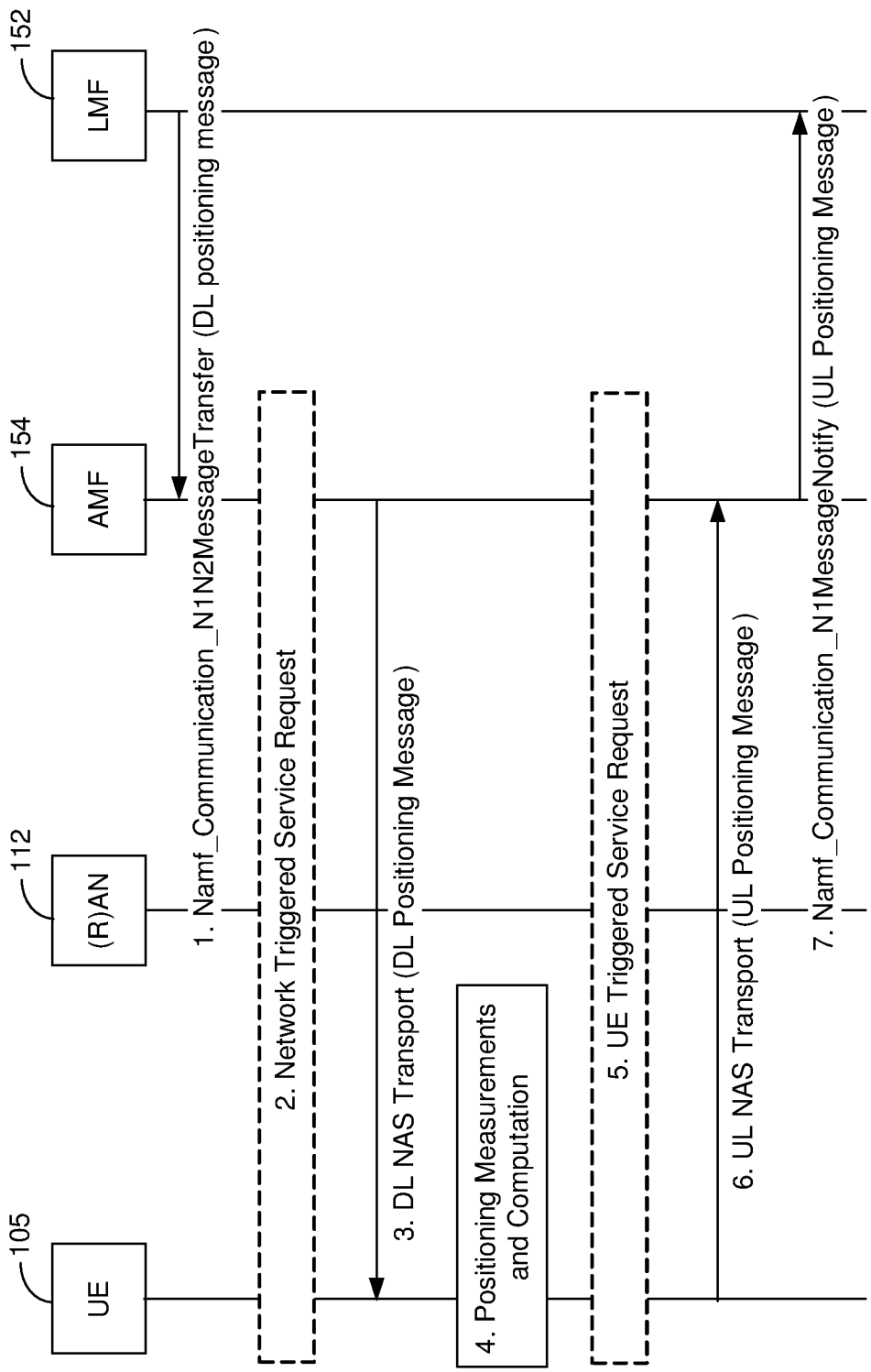
FIG. 3 shows a signaling flow to support UE based positioning, UE assisted positioning and delivery of assistance data.

FIG. 3 shows a signaling flow for a positioning procedure, applicable to communication systems 100 and 200 and referred to here as a UE assisted and UE based positioning procedure, used by an LMF 152 to support UE based positioning, UE assisted positioning and delivery of assistance data. The procedure can be based on use of the LPP protocol between the LMF 152 and UE 105, though can also be applicable to LPP/LPPe or to NPP. The procedure may be applicable to an LMF based location solution, an AMF based location solution and/or a combined AMF and LMF based location solution.

At stage 1 in FIG. 3, the LMF 152 invokes an Namf_Communication_N1N2MessageTransfer service operation (e.g. as defined in 3GPP TS 23.502) towards the AMF 154 to request the transfer of a Downlink (DL) Positioning (e.g. LPP) message to the UE. The service operation includes the DL Positioning message and may include a UE 105 identifier (e.g. for an LMF based location solution or combined AMF and LMF based location solution) or a location services (LCS) Correlation identifier (e.g. for an AMF based location solution). The Downlink Positioning message may request location information from the UE 105, provide assistance data to the UE 105 or query for the UE 105 positioning capabilities.

At stage 2, the AMF 154 may identify the UE 105 using the UE 105 identifier or LCS Correlation identifier received at stage 1. If the UE 105 is in an idle state, the AMF 154 initiates a network triggered Service Request procedure as defined in 3GPP TS 23.502 to establish a signaling connection with the UE 105.

At stage 3, the AMF 154 forwards the Downlink Positioning message to the UE in a DL NAS Transport message. The AMF 154 includes a Routing identifier, in the DL NAS Transport message, identifying the LMF 152 (e.g. a global or local address of the LMF 152).

At stage 4, the UE 105 stores any assistance data provided in the Downlink Positioning message and performs any positioning measurements and location computation requested by the Downlink Positioning message.

At stage 5, if the UE 105 is in an idle state, the UE 105 instigates a UE triggered Service Request as defined in 3GPP TS 23.502 in order to establish a signaling connection with the AMF 154.

At stage 6, the UE returns any location information obtained in stage 4 or returns any positioning capabilities requested in stage 3 to the AMF 154 in an Uplink (UL) Positioning (e.g. LPP) message included in an UL NAS Transport message. The Uplink Positioning message may alternatively carry a request for further assistance data. The UE also includes the Routing identifier in the UL NAS Transport message received in stage 3.

At stage 7, the AMF 154 invokes a Namf_Communication_N1MessageNotify service operation (e.g. as defined in 3GPP TS 23.502) towards the LMF 152 indicated by the routing identifier received in stage 6. The service operation includes the Uplink Positioning message received in stage 6 and may include a UE 105 identifier (e.g. for an LMF based location solution or combined AMF and LMF based location solution) or a location services (LCS) Correlation identifier (e.g. for an AMF based location solution). Stages 6 and 7 may be repeated if the UE 105 needs to send multiple messages to respond to the request received in Stage 3. Stages 1 to 7 may be repeated to send new assistance data, and to request further location information and further UE 105 positioning capabilities.

Figure 4:
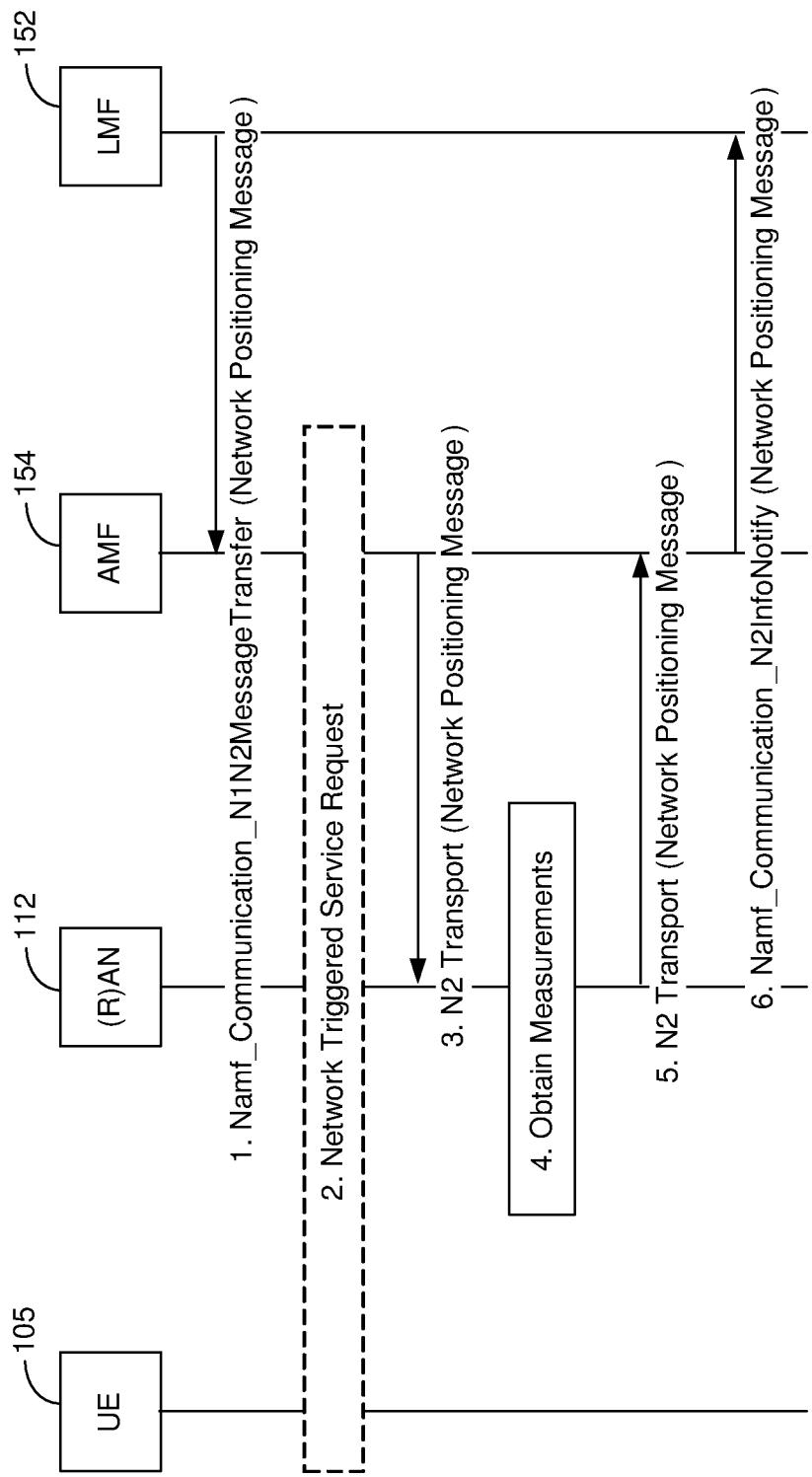
FIG. 4 shows a signaling flow to support network assisted and network based positioning.

FIG. 4 shows a signaling flow for a procedure, applicable to communication systems 100 and 200 and referred to here as a network assisted positioning procedure, that may be used by an LMF 152 to support network assisted and network based positioning. The procedure may be based on use of the NRPPa protocol between the LMF 152 and (R)AN 112. The procedure may be applicable to an LMF based location solution, an AMF based location solution and/or a combined AMF and LMF based location solution.

At stage 1 in FIG. 4, the LMF 152 invokes a Namf_Communication_N1N2MessageTransfer service operation (e.g. as defined in 3GPP TS 23.502) towards the AMF 154 to request the transfer of a Network Positioning (e.g. NRPPa) message to the serving base station (e.g. gNB 110 or ng-eNB 114) for the UE 105. The service operation includes the Network Positioning message and may include a UE 105 identifier (e.g. for an LMF based location solution or combined AMF and LMF based location solution) or a location services (LCS) Correlation identifier (e.g. for an AMF based location solution). The Network Positioning message may request location information for the UE 105 from the (R)AN 112.

At stage 2, the AMF 154 may identify the UE 105 using the UE 105 identifier or LCS Correlation identifier received at stage 1. If the UE 105 is in an idle state, the AMF 154 initiates a network triggered Service Request procedure as defined in 3GPP TS 23.502, to establish a signaling connection with the UE 105.

At stage 3, the AMF 154 forwards the Network Positioning message to the serving base station in an N2 Transport message. The AMF 154 includes a Routing identifier, in the N2 Transport message, identifying the LMF 152 (e.g. a global or local address of the LMF 152).

At stage 4, the serving base station obtains any location information for the UE 105 requested in stage 3.

At stage 5, the serving base station returns any location information obtained in stage 4 to the AMF 154 in a Network Positioning (e.g. NRPPa) message included in an N2 Transport message. The serving base station also includes the Routing identifier in the N2 Transport message received in stage 3.

At stage 6, the AMF 154 invokes a Namf_Communication_N2InfoNotify service operation (e.g. as defined in 3GPP TS 23.502) towards the LMF 152 indicated by the routing identifier received in stage 5. The service operation includes the Network Positioning message received in stage 5 and may include a UE 105 identifier (e.g. for an LMF based location solution or combined AMF and LMF based location solution) or a location services (LCS) Correlation identifier (e.g. for an AMF based location solution). Stages 1 to 6 may be repeated to request further location information and further (R)AN 112 capabilities.

Figure 5:
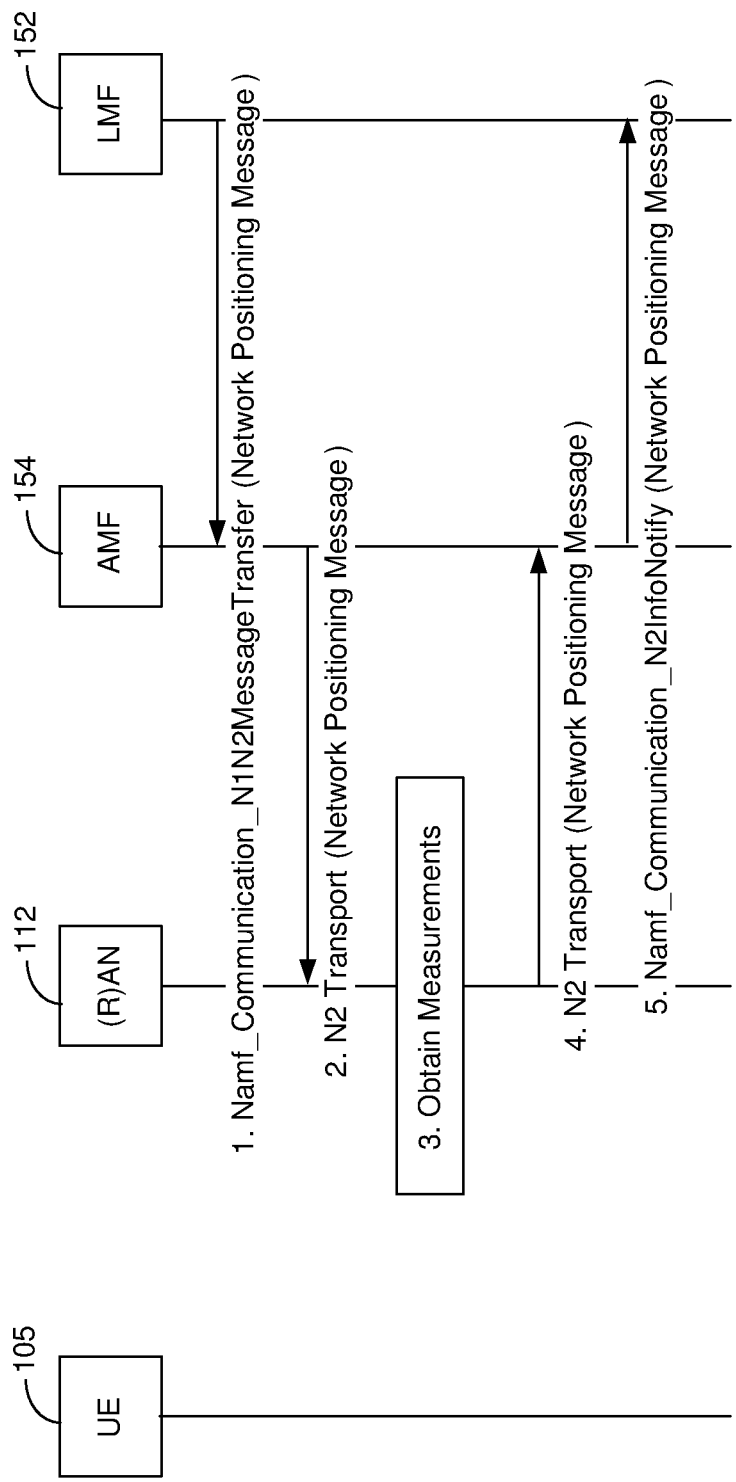
FIG. 5 shows a signaling flow to support positioning of one or many UEs.

FIG. 5 shows a signaling flow for a procedure, applicable to communication systems 100 and 200, for obtaining non-UE associated network assistance data, which may be used by an LMF 152 to support network assisted and network based positioning. This procedure is not associated with a UE location session. It is used to obtain network assistance data from a base station (e.g. gNB 110 or ng-eNB 114). The procedure may be based on using the NRPPa between the LMF 152 and (R)AN 112. The procedure may be applicable to an LMF based location solution, an AMF based location solution and/or a combined AMF and LMF based location solution.

At stage 1 in FIG. 5, the LMF 152 invokes a Namf_Communication_N1N2MessageTransfer service operation (e.g. as defined in 3GPP TS 23.502) towards the AMF 154 to request the transfer of a Network Positioning (e.g. NRPPa) message to a target base station (e.g. gNB 110 or ng-eNB 114) in the (R)AN 112. The service operation includes the Network Positioning message and the target base station identity. The Network Positioning message may request position related information from the (R)AN 112.

At stage 2, the AMF 154 forwards the Network Positioning message to the target base station indicated in stage 1 in an N2 Transport message. The AMF 154 includes a Routing identifier, in the N2 Transport message, identifying the LMF 152 (e.g. a global or local address of the LMF 152).

At stage 3, the target base station obtains any position related information requested in stage 2.

At stage 4, the target base station returns any position related information obtained in stage 3 to the AMF 154 in a Network Positioning (e.g. NRPPa) message included in an N2 Transport message. The target base station also includes the Routing identifier in the N2 Transport message received in stage 2.

At stage 5, the AMF 154 invokes a Namf_Communication_N2InfoNotify service operation (e.g. as defined in 3GPP TS 23.502) towards the LMF 152 indicated by the routing identifier received in stage 4. The service operation includes the Network Positioning message received in stage 4 and may include the target base station identifier. Stages 1 to 5 may be repeated to request further position related information from the (R)AN 112.

Figures 1, 6:
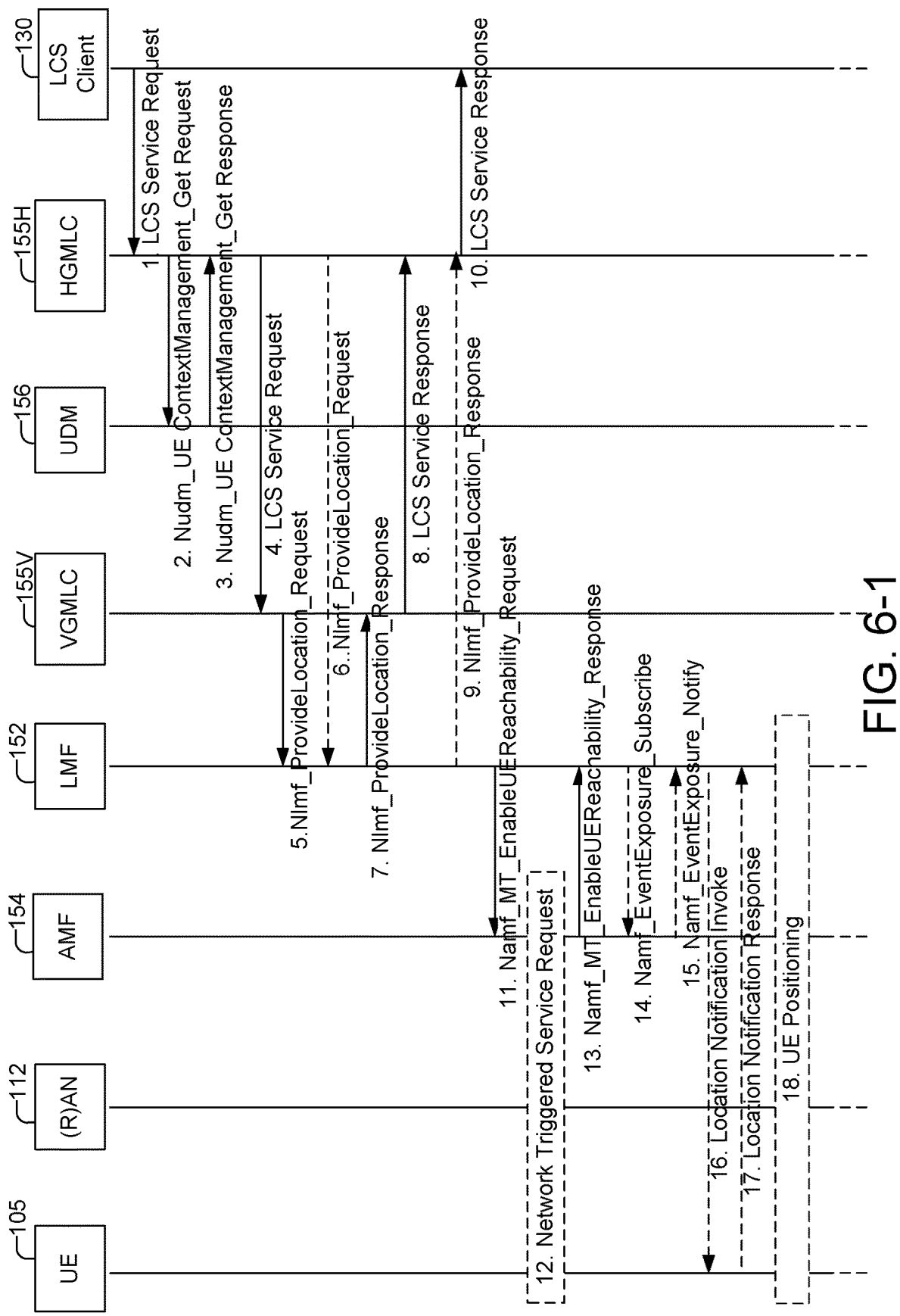
FIG. 6 (comprising FIGS. 6-1 and 6-2) shows a low power MT-LR procedure for a roaming UE to support periodic and triggered location.
Figures 2, 6:
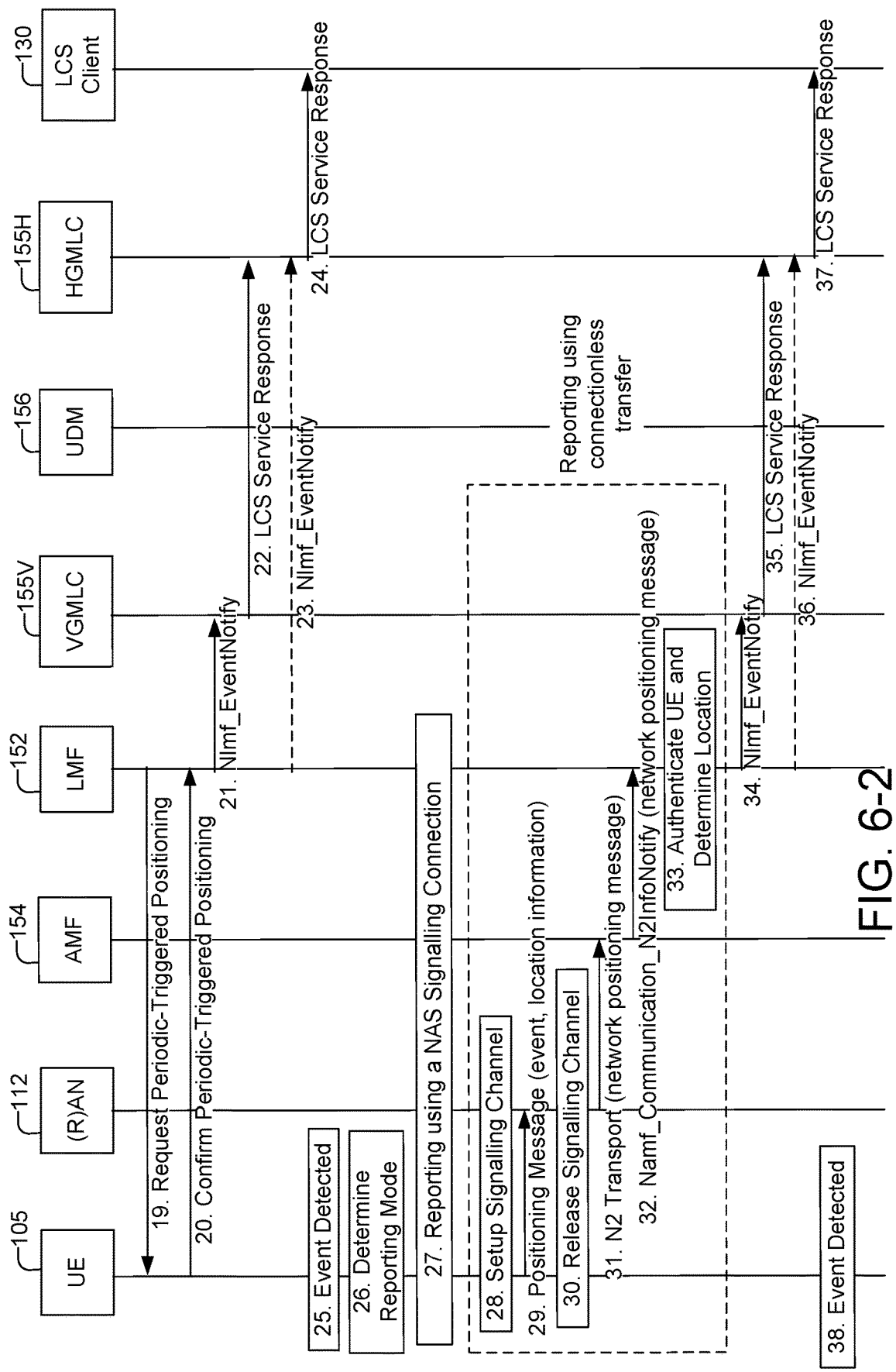

FIG. 6 (comprising FIGS. 6-1 and 6-2) summarizes a periodic and triggered location procedure (which may be referred to as a periodic and triggered 5GC-MT-LR) for a roaming UE 105, as in communication system 200, according to an LMF based location solution. A periodic and triggered 5GC-MT-LR procedure for a non-roaming UE 105, as in communication system 100, could comprise a subset of the procedure shown in FIG. 6. The procedure may enable periodic and triggered location of UE 105 with low resource utilization by the UE 105 and VPLMN 150V. The procedure may not use CP optimization or EDT, but is based on connectionless transfer of location event reports from a UE 105 to LMF 152 similar to that for CP optimization with EDT, where location determination for UE 105 and authentication of UE 105 can occur in real or non-real time in the LMF 152, where location reports from multiple UEs can be batched by the (R)AN 112 to the LMF 152 to reduce signaling overhead, and where transfer of location events reports can be prioritized according to Quality of Service (QoS) requirements.

The trigger events applicable to the procedure in FIG. 6 may comprise any of: a UE available event, an area event (e.g. UE 105 entering, leaving or remaining with a defined geographic area), a motion event (e.g. UE 105 moving by more than a threshold straight line distance from a previous location). One or more of these events may be requested by an LCS Client 130. For example, the UE available event may be combined with either a periodic event or another triggered event. When a UE 105 is already available, a request for the UE available event may be equivalent to requesting a current location for the target UE 105. With this procedure the LMF 152 and VGMLC 155V can be combined to reduce signaling and implementation impacts. Privacy requirements can be configured in the HGMLC 155H or transferred from the UDM 156 to the HGMLC 155H. The same LMF 152 may be used for each successive periodic or triggered location event thereby avoiding overhead to assign and release the LMF 152 for each location event and enabling use of information obtained by the LMF 152 for previous location fixes.

At stage 1 in FIG. 6-1, an external LCS client 130 sends a location request for a periodic and triggered location for a target UE 105 to an HGMLC 155H in the HPLMN 150H for the UE 105. The location request provides the type of location reporting being requested and associated parameters. For periodic location, the request may include the time interval between successive location reports and the total number of reports. For triggered reporting for an area event, the request includes details of the target area, whether the trigger event to be reported is the UE 105 being inside, entering into or leaving the target area, and whether event reporting shall include UE location estimates. For triggered reporting for the motion event, the request includes a threshold linear distance for triggering a location report and whether event reporting shall include UE location estimates. For the UE available trigger event, no additional parameters may be needed. The HGMLC 155H may verify UE 105 privacy requirements. It is noted that the external LCS client 130 may instead be a Network Function (NF) or an Application Function (AF) which accesses the HGMLC 155H via an NEF 159 (not shown in FIG. 6-1).

At stages 2-3 in FIG. 6-1, the HGMLC 155H queries the UDM 156 for the serving AMF 154 address, UE 105 privacy requirements and possibly a VGMLC 155V address and/or an LMF 152 address.

At stage 4, if a VGMLC 155V address was not returned in stage 3, the HGMLC 155H may use a Network Repository Function (NRF) service in the HPLMN 150H to select an available VGMLC 155V in the VPLMN 150V, based on a VPLMN 150V address contained in the AMF 154 address received in stage 3. The HGMLC 155H forwards the location request to the VGMLC 155V and includes the AMF 154 address, a target UE 105 identity (e.g. a Subscription Permanent Identifier (SUPI) or a Generic Public Subscription Identifier (GPSI)), any LMF 152 address received in stage 3 and any privacy requirements for the UE 105. The HGMLC 155H also includes in the location request the type of location reporting being requested and associated parameters, and a reference number to be used to identify later responses. For area event reporting, the HGMLC 155H, VGMLC 155V or LMF 152 may convert the target area into an equivalent set of cells or Tracking Areas (TAs) in the VPLMN 150V.

At stage 5, the VGMLC 155V determines an LMF 152V in the VPLMN 150V and invokes an Nlmf_ProvideLocation Request service operation to forward the location request to the LMF 152. If the VGMLC 155V and LMF 152 functions are combined, this stage may be omitted. It is noted that the VGMLC 155V may determine an LMF 152 in the following alternative ways, labelled A1-A4.

Alternative A1: if VGMLCs, LMFs and AMFs are fully interconnected (e.g. via an operator IP intranet) in VPLMN 5GCN 150V, a VGMLC 155V may determine an LMF 152 based on any suitable criteria (e.g. location QoS, type of LCS client, VGMLC 155V identity). As one example, a VGMLC 155V could be configured with all LMFs in the VPLMN 150V and could select LMFs on a round robin basis.

Alternative A2: if an AMF is allowed to use some but not all LMFs in the VPLMN 5GCN 150V, a VGMLC 155V could be configured with the allowed LMFs for each AMF—and could then select an LMF 152 based on specific criteria (e.g. QoS) or randomly.

Alternative A3: a VGMLC 155V may use an NRF service in the VPLMN 5GCN 150V to request a set of available LMFs in the VPLMN 5GCN 150V and may then select one LMF 152 as for Alternative A1.

Alternative A4: when a UE 105 registers with the VPLMN 5GCN 150V, the serving AMF 154 could select an LMF 152 (e.g. using an NRF service). The AMF 154 or the LMF 152 can then provide the LMF 152 address to the UDM 156 along with the AMF 154 address. The UDM 156 can then provide the LMF 152 address in stage 3 to the HGMLC 155H which would provide the address to the VGMLC 155V in stage 4.

At stage 6, as an optional optimization, instead of performing stages 4 and 5, if the HGMLC 155H can determine or select the LMF 152 (e.g. based on the VPLMN 5GCN 150V identity or AMF 154 address, using an NRF service or by receiving an LMF 152 address from the UDM 156 in stage 3), the HMLC 155H may invoke an Nlmf_ProvideLocation Request service operation to forward the location request directly to the LMF 152.

At stages 7-10, if the LMF 152 supports the type of periodic and triggered location requested, the LMF 152 returns an acknowledgment to the LCS client 130, via the VGMLC 155V and/or HGMLC 155H, indicating that the request for periodic or triggered location was accepted.

At stage 11, the LMF 152 invokes an Namf_MT_EnableUEReachability Request service operation towards the serving AMF 154 to verify UE 105 reachability. It is noted that if the serving AMF 154 is no longer available, the LMF 152 may use an NRF service in the VPLMN 5GCN 150V to select another AMF 154 from the same AMF set as the previous serving AMF 154.

At stage 12, if the UE 105 is currently in a connected state for 3GPP, this stage is skipped. Otherwise, if the UE 105 is currently in an idle state for cellular (e.g. NR or LTE) access but is reachable, the AMF 154 performs a 3GPP network triggered service request (e.g. as defined in 3GPP TS 23.502) in order to place the UE 105 in a connected state.

At stage 13, the AMF 154 invokes an Namf_MT_EnableUEReachability Response service operation towards the LMF 152 to confirm UE 105 reachability.

At stages 14-15, if the UE 105 is not reachable (e.g. is using extended discontinuous reception (eDRX) or power saving mode (PSM)), the LMF 152 invokes an Namf_EventExposure_Subscribe service operation towards the AMF 154 in order to be informed by the AMF 154 when the UE 105 again becomes reachable. At that point and if the UE 105 may not yet be in a connected state, the LMF 152 may again perform stages 11-13. The LMF 152 may also perform stages 14-15 to obtain the current access type(s) (i.e. cellular NR or LTE and/or WLAN) and any serving cell ID for the UE 105 from the AMF 154 after the UE 105 becomes reachable. It is noted that in the event of a change of serving AMF 154 for the UE 105 within the same VPLMN 5GCN 150V when the UE 105 becomes reachable, the old AMF 154 can notify the LMF 152 and the LMF 152 can perform stages 14-15 to obtain the current access type(s) and any serving cell ID for the UE 105 from the new AMF 154.

At stage 16, once the UE 105 is reachable, the LMF 152 may notify the UE 105 and verify UE 105 privacy requirements based on any privacy requirements received from the HGMLC 155H in stages 4-6. If this occurs, the LMF 152 sends a supplementary services Location Notification invoke to the UE 105 via the serving AMF 154 using an Namf_Communication_N1N2MessageTransfer service operation. It is noted that transfer of supplementary services messages between the LMF 152 and UE 105 for stages 16 and 17 may be based on the procedure described for FIG. 3 for exchange of positioning protocol messages.

At stage 17, the UE 105 notifies a user of UE 105 of the location request and verifies user permission for the location request if UE 105 privacy is to be verified. The UE 105 then returns a supplementary services Location Notification response to the LMF 152 indicating whether the user grants or withholds permission for the location request when UE 105 privacy is verified. The supplementary services response is transferred via the serving AMF 154 and delivered to the LMF 152 using an Namf_Communication_N1MessageNotify service operation. It is noted that stages 16 and 17 may not be needed (e.g. may not be performed) for an IoT UE 105 (e.g. since typically there is no user of an IoT UE).

At stage 18, if triggered location for the UE available event was requested or if an initial UE 105 location is requested for another type of periodic or triggered location request, the LMF 152 performs positioning of UE 105 by performing one or more of the positioning procedures described in FIGS. 3-5. The LMF 152 then determines the UE 105 location using information obtained in this stage and/or in stage 15. If no other triggered or periodic location reporting was requested, the LMF 152 may skips stages 19-20 and 25-38 and performs stages 21-24 to return the UE 105 location to the LCS Client 130 after which the procedure terminates.

At stage 19 in FIG. 6-2, the LMF 152 sends a message to the UE 105 via the serving AMF 154 using an Namf_Communication_N1N2MessageTransfer service operation. The message may be a supplementary services message, a positioning protocol (e.g. LPP or NPP) message or may comprise both (e.g. a supplementary services message carrying an embedded LPP message). The LMF 152 includes in the message a request for periodic or triggered location reporting by the UE 105 (including the type(s) of event(s) to be reported) and the type of location measurements or location estimate to be provided by the UE 105 for location reporting at stage 29. The LMF 152 also includes a routing identifier identifying the LMF 152 in the Namf_Communication_N1N2MessageTransfer service operation which is transferred to the UE 105 by the AMF 154 (e.g. in a DL NAS Transport message which carries the message from the LMF 152). In addition, the LMF 152 includes in the message a request for the UE 105 to send event reports at stage 29 using connectionless transfer via (R)AN 112 and includes: (i) one or more UE IDs (e.g. assigned locally to UE 105 by the LMF 152) for connectionless reporting, (ii) ciphering information, (iii) a priority indication, and (iv) criteria for reporting using connectionless transfer versus a NAS signaling connection.

At stage 20 in FIG. 6-2, if the request in stage 19 can be supported, the UE 105 returns an acknowledgment to the LMF 152 in a supplementary services and/or positioning protocol (e.g. LPP) message, which is transferred via the serving AMF 154 and delivered to the LMF 152 using an Namf_Communication_N1MessageNotify service operation. The UE 105 indicates in the acknowledgment whether sending event reports using connectionless transfer is supported in addition to sending using a NAS signaling connection.

At stages 21-24, the LMF 152 sends a response to the LCS client 130 via the VGMLC 155V and/or HGMLC 155H carrying any location estimate obtained at stage 18 and a confirmation that event reporting for periodic or triggered location was activated in the UE 105. The VGMLC 155V (if used) can then release state information for the periodic and triggered 5GC-MT-LR request.

At stage 25, the UE 105 monitors for occurrence of the periodic and/or trigger events requested at stage 19. The monitoring may occur while the UE 105 is in idle state and/or while the UE 105 is unreachable from the network (e.g. with eDRX or PSM). The UE 105 may also (e.g. periodically) request assistance data from the LMF 152 to help determine a location, if needed to detect a trigger event. When a trigger event is detected, the UE 105 proceeds to stage 26.

At stage 26, the UE 105 determines, based on the criteria received in stage 19, whether to report the trigger event using connectionless transfer or a NAS signaling connection. If the UE 105 is already in connected state or can only access the 5GCN 150V via a type of (R)AN 112 node which does not support connectionless transfer, the UE 105 determines to use a NAS signaling connection.

At stage 27, if the UE 105 determines to use a NAS signaling connection at stage 26, the UE 105 sends a supplementary services message and/or a positioning protocol message (or a combination of these) to the LMF 152 according to stages 5-7 of FIG. 3. The message(s) may indicate the type of event detected at stage 25 and may include a location estimate or location measurements, e.g. if requested at stage 19. The LMF 152 may request additional location information from UE 105 and/or from (R)AN 112 using the procedures in FIGS. 3-5 and may determine a location estimate for UE 105 from this information, e.g. if requested at stages 4-6. The UE 105 then skips stages 28-33.

At stage 28, if the UE 105 determines to use connectionless transfer at stage 26, the UE 105 obtains any location measurements or location estimate requested in stage 19. If the UE 105 is using cellular (e.g. NR or LTE) access, the UE 105 determines a suitable temporary serving cell and requests and obtains a signaling channel or signaling connection with an associated RAN node in (R)AN 112. The RAN node may be a gNB 110 or ng-eNB 114 when (R)AN 112 is an NG-RAN (e.g. NG-RAN 112 for communication system 100 or 200).

At stage 29, the UE 105 sends a positioning message to the RAN node for cellular access or an N3IWF in 5GCN 150V for WLAN access. The positioning message includes the routing identifier for the LMF 152 received in stage 19, the UE ID or one of the UE IDs received in stage 19, an authentication code to authenticate the UE ID and the priority indication received at stage 19. The positioning message also includes a positioning protocol (e.g. LPP) and/or supplementary services message which includes any location measurements or location estimate obtained in stage 28 and may identify the type of event being reported. The positioning protocol and/or supplementary services message may be ciphered using the ciphering information received at stage 19. Other content of the positioning message is not ciphered.

At stage 30, the UE 105 and the RAN node release the signaling channel or signaling connection in the case of cellular access.

At stage 31, for cellular access, the RAN node may obtain uplink location measurements of UE signaling received at stage 28 and/or stage 29. For example, the RAN node may obtain measurements of RSSI, TOA, Rx-Tx, RTT or AOA. The RAN node sends a network positioning message (e.g. an NRPPa message) included in an N2 Transport message to an AMF 154 (e.g. which may be different from the AMF 154 for stages 11-20). The network positioning message includes any uplink location measurements obtained by the RAN node, and the positioning protocol and/or supplementary services message, the UE ID, the authentication code and the priority indication received at stage 29. The RAN node also includes the routing identifier for the LMF 152 received at stage 29 in the N2 Transport message. The RAN node may use the priority indication to expedite sending of the network positioning message and/or to include information for additional UEs related to the same LMF 152 in the same network positioning message. Any information for additional UEs could be treated and processed separately by the LMF 152.

At stage 32, the AMF 154 invokes an Namf_Communication_N2InfoNotify service operation towards the LMF 152 indicated by the routing identifier received in stage 31. The service operation includes the network positioning message received in stage 31.

At stage 33, the LMF 152 identifies the UE 105 using the UE ID in the network positioning message and authenticates the UE ID using the authentication code in the network positioning message. The LMF 152 then deciphers the positioning protocol and/or supplementary services message in the network positioning message if this was (or these were) ciphered. If inclusion of a location estimate in event reports was requested in stage 5 or stage 6, the LMF 152 uses any uplink location measurements included in the network positioning messages and any location measurements or location estimate included in the positioning protocol and/or supplementary services message to determine or verify a location estimate for the UE 105. The LMF 152 may use the priority indication in the network positioning message to expedite or retard processing of the network positioning message at stage 33.

At stage 34, the LMF 152 selects a VGMLC 155V (which may be different to the VGMLC 155V for stages 4-8) and invokes an Nlmf_EventNotify service operation towards the VGMLC 155V with an indication of the type of event being reported, the reference number, the H-GMLC 155H address and a location estimate if this was requested and obtained at stage 27 or stage 33. Stage 34 may be omitted if the LMF 152 and VGMLC 155V are combined.

At stage 35, the VGMLC 155V forwards the information received in stage 34 to the HGMLC 155H.

At stage 36, as an optional optimization, stages 34 and 35 are omitted and the LMF 152 instead sends the information in stage 34 directly to the HGLMC 155H.

At stage 37, the HGMLC 155H uses the reference number received in stage 35 or stage 36 to identify the periodic and triggered location request received in stage 1 and then sends the location estimate and type of trigger event being reported to the external LCS client 130.

At stage 38, the UE 105 continues to monitor for and detect further trigger events as in stage 25 and instigates stages 26-37 each time a trigger event is detected.

Figure 7:
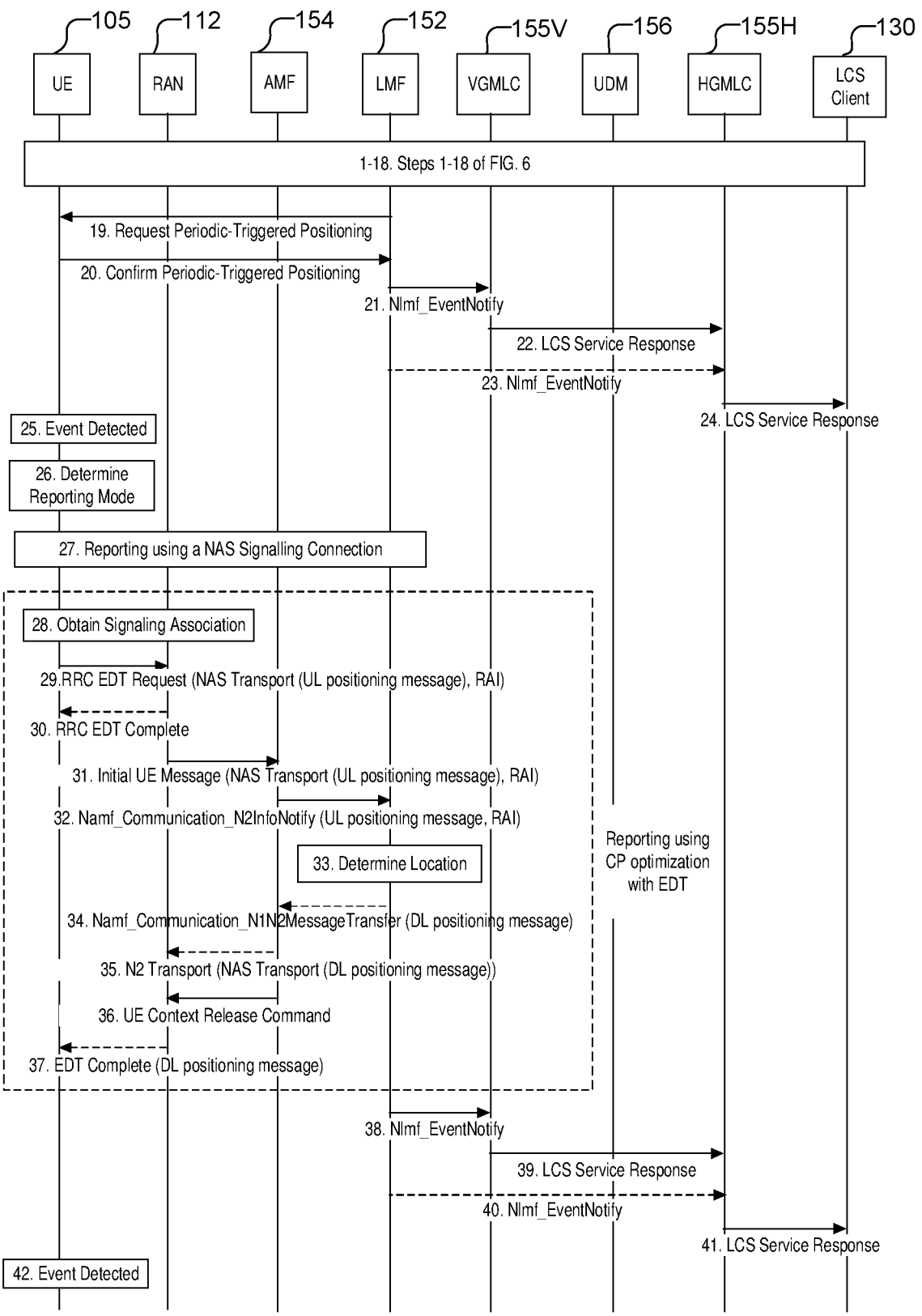
FIG. 7 shows another low power MT-LR procedure for a roaming UE to support periodic and triggered location.

FIG. 7 summarizes another periodic and triggered location procedure (which may be referred to as a periodic and triggered 5GC-MT-LR) for a roaming UE 105, as in communication system 200, according to an LMF based location solution. A periodic and triggered 5GC-MT-LR procedure for a non-roaming UE 105, as in communication system 100, could comprise a subset of the procedure shown in FIG. 7. The procedure may enable periodic and triggered location of UE 105 with low resource utilization by the UE 105 and VPLMN 150V. This procedure has the same characteristics as the procedure in FIG. 6, but uses the enhancements E1 to E4 described previously for CP optimization. For example: (i) the UE 105 is enabled to report the occurrence of trigger events and provide associated location information using CP optimization with EDT and an RAI; (ii) the UE is enabled to request immediate release of the signaling connection by the RAN 112 following the sending of an event report using EDT, which may minimize the duration of the signaling connection; (iii) the UE 105 is enabled to indicate an expectation of receiving a single response from the LMF 152 after which the signaling connection is released by the AMF 154, which may reduce the duration of the signaling connection; and (iv) the RAI may be provided by the UE 105 at the Access Stratum (AS) level or at the NAS level.

At stages 1-18 in FIG. 7, stages 1 to 18 of FIG. 6-1 are performed.

At stage 19 in FIG. 7, the LMF 152 sends a message to the UE 105 via the serving AMF 154 using an Namf_Communication_N1N2MessageTransfer service operation. The message may be a supplementary services message, a positioning protocol (e.g. LPP or NPP) message or may comprise both (e.g. a supplementary services message carrying an embedded LPP message). The LMF 152 includes in the message a request for periodic or triggered location reporting by the UE 105 (including the type(s) of event(s) to be reported) and the type of location measurements or location estimate to be provided by the UE 105 for location reporting at stage 29. The LMF 152 also includes a routing identifier identifying the LMF 152 in the Namf_Communication N1N2MessageTransfer service operation which is transferred to the UE 105 by the AMF 154 (e.g. in a DL NAS Transport message which carries the message from the LMF 152). In addition, the LMF 152 includes in the message an indication that the UE 105 is permitted to send event reports using CP optimization and/or CP optimization with EDT. The LMF 152 may also include criteria indicating when CP optimization and/or CP optimization with EDT may be used by the UE 105 and which values of RAI the UE 105 is permitted to include (e.g. RAI for immediate release and/or RAI for early release). It is noted that the LMF 152 may determine UE 105 support for CP optimization and/or CP optimization with EDT for event reporting, including values of RAI supported by the UE 105, by obtaining the positioning (e.g. LPP) capabilities of the UE 105 prior to stage 19. It is also noted that use of CP optimization and/or CP optimization with EDT and permitted values of RAI may be negotiated at the NAS level during registration of UE 105 with 5GCN 150V. The UE 105 may then only make use of CP optimization and/or CP optimization with EDT and particular RAI values for location event reporting at stage 29 if both agreed during registration of UE 105 and allowed by the LMF 152 at stage 19.

At stage 20, if the request in stage 19 can be supported, the UE 105 returns an acknowledgment to the LMF 152 in a positioning protocol (e.g. LPP) and/or a supplementary services message, which is transferred via the serving AMF 154 and delivered to the LMF 152 using a Namf_Communication_N1MessageNotify service operation.

At stage 21-24, stages 21-24 of FIG. 6-2 are performed to confirm that event reporting for periodic or triggered location was activated in the UE 105 and to return any location estimate obtained at stage 18 if the UE available event or an initial location estimate was requested at stage 5 or stage 6.

At stage 25, the UE 105 monitors for occurrence of the trigger event(s) requested in stage 19. The monitoring may occur while the UE 105 is in idle state and/or while the UE 105 is not reachable from the 5GCN 150V (e.g. with eDRX or PSM). The UE 105 may also (e.g. periodically) request assistance data from the LMF 152 to help determine a location, if needed to detect a trigger event. When a trigger event is detected, the UE 105 proceeds to stage 26.

At stage 26, the UE 105 determines (e.g. based on any criteria received in stage 19) whether to report the trigger event using a NAS signaling connection, CP optimization without EDT or CP optimization with EDT. If the UE 105 is already in a connected state or can only access a RAN 112 node which does not support CP optimization or CP optimization with EDT, the UE 105 may determine to use a NAS signaling connection At stage 27, if the UE 105 determines to use a NAS signaling connection at stage 26, the UE 105 performs stage 27 of FIG. 6-2 to report the detected event and optionally provide location information to LMF 152 using a NAS signaling connection. The UE 105 then skips stages 28-37. If the UE 105 determines to use CP optimization without EDT at stage 26, the UE 105 may proceed as described further down for stages 28-37 of FIG. 8-2 for the case CP optimization without EDT in FIG. 8 and then skips stages 28-37 in FIG. 7 and resumes the procedure in FIG. 7 at stage 38.

At stage 28 in FIG. 7, if the UE 105 determines to use CP optimization with EDT at stage 26, the UE 105 obtains any location measurements or location estimate requested in stage 19, determines a suitable serving cell if accessing NG-RAN 112 and requests and obtains an RRC signaling association with a RAN node in RAN 112 (e.g. a gNB 110 or ng-eNB 114), e.g. by sending a request to the RAN node on a Random Access Channel and receiving a response from the RAN node.

At stage 29, the UE 105 sends a Radio Resource Control (RRC) EDT Request message to the RAN node. The EDT Request message may also be referred to as an RRC Early Data Request message or by some other name, and may be sent by UE 105 using a Common Control Channel (CCCH) in some implementations. The RRC EDT Request message may include an identifier for UE 105 (e.g. a 5G Globally Unique Temporary Identifier (5G-GUTI)), and a NAS message (e.g. a NAS CP service request message) containing a supplementary services message and/or an UL positioning protocol (e.g. LPP) message, either of which may include any location measurements or location estimate obtained in stage 28 and may identify the type of event being reported. As an example, a supplementary services message containing an embedded UL positioning protocol message may be sent by UE 105 inside the NAS message at stage 29, or just one of an UL positioning protocol message or a supplementary services message. In one embodiment, the UL positioning protocol message (if sent) may be an LPP Provide Location Information message. The NAS message also includes the routing identifier received by the UE at stage 19. The NAS message is ciphered and integrity protected, e.g. as defined in 3GPP TS 24.501. The RRC EDT Request may further include an Access Stratum (AS) RAI. The AS RAI may indicate immediate release or early release of the RRC signaling connection. For early release, the AS RAI may further indicate whether the UE 105 expects to receive a message (e.g. a DL positioning protocol message) from the LMF 152 in response. The AS RAI may be referred to as an EDT session indication and may in some embodiments be determined by the RAN node (e.g. if an AS RAI is not included by a UE 105 in the RRC EDT Request message).

In some embodiments, the NAS message sent at stage 29 by UE 105 may include a NAS RAI, which may be similar to or the same as the AS RAI just described (e.g. may indicate immediate release or early release of the RRC signaling connection and, for early release, may indicate whether or not UE 105 expects to receive a message from the LMF 152 in response). In one embodiment, the AS RAI may be restricted to indicating only immediate release of the RRC signaling connection and the NAS RAI may be restricted to indicating only early release of the RRC signaling connection and whether or not the UE 105 expects to receive a message from LMF 152 in response. The AS RAI may be included by UE 105 at stage 29 when the RAN node (and possibly AMF 154) needs to take some action based on the AS RAI (e.g. such as releasing the RRC signaling connection at stage 30 as described below). The NAS RAI may be included by UE 105 at stage 29 when AMF 154 but not the RAN node needs to take some action based on the NAS RAI (e.g. such as sending a UE Context Release Command at stage 36 as described below). Typically, at least one of the AS RAI and NAS RAI is included by UE 105 at stage 29, but both RAIs may not be included.

At stage 30, if the AS RAI is received at stage 29 and indicates immediate release, the RAN node sends an RRC message (e.g. an RRC EDT Complete message, which may be referred to as an RRC Early Data Complete message) to the UE 105 to immediately release the RRC signaling connection.

At stage 31, the RAN node sends an N2 Initial UE message to the serving AMF 154 for the UE 105 (e.g. with the UE 105 identified by the RAN node using a 5G-GUTI). The Initial UE message includes the NAS message and its contents received at stage 29 and an indication of EDT. The indication of EDT may include or comprise the AS RAI if received at stage 29.

At stage 32, the AMF 154 performs integrity protection verification and deciphering of the NAS message, e.g. as defined in 3GPP TS 24.501. The AMF 154 then invokes an Namf_Communication_N2InfoNotify service operation towards the LMF 152 indicated by the routing identifier received in the NAS message in stage 31. The service operation includes the supplementary services message and/ or UL positioning protocol message that were included in the NAS message and may include the NAS RAI and/or AS RAI if received at stage 31. If the NAS RAI or AS RAI received at stage 31 indicates either immediate release or early release where no LMF response is expected by the UE 105, the AMF 154 omits support for stages 34-35, since the AMF 154 does not expect to receive a response from LMF 152 at stage 34.

At stage 33, if inclusion of a location estimate in event reports was requested at stage 5 or stage 6, the LMF 152 uses any location measurements or location estimate included in the supplementary services and/or UL positioning protocol message received at stage 32 to determine a location estimate for the UE 105.

At stage 34, if the NAS RAI or AS RAI received at stage 32 indicates early release where the UE 105 expects to receive a response from the LMF 152, the LMF 152 invokes an Namf_Communication_N1N2MessageTransfer service operation towards the AMF 154 to request the transfer of a supplementary services message and/or DL positioning protocol message (e.g. an LPP message) to the UE 105. As an example, a supplementary services message containing an embedded DL positioning protocol message may be sent by LMF 152 at stage 34, or just one of a DL positioning protocol message or supplementary services message. In one embodiment, the DL positioning protocol message (if sent) may be an LPP acknowledgment message. The service operation includes the supplementary services message and/ or DL positioning protocol message.

At stage 35, if the AMF 154 receives a supplementary services message and/or DL positioning protocol message for the UE 105 from the LMF 152 at stage 34, the AMF 154 forwards the supplementary services message and/or DL positioning protocol message to the RAN 112 (e.g. to a gNB 110 or ng-eNB 114) in a NAS response message (e.g. a NAS Service Accept message), which may be conveyed inside an NGAP Downlink NAS Transport message. AMF 154 may also include an end indication (e.g. in the NGAP Downlink NAS Transport message), indicating to RAN 112 that the signaling connection or signaling association to UE 105 can be released by RAN 112.

At stage 36, unless the AMF 154 receives a NAS RAI or AS RAI indicating immediate release at stage 31 or included an end indication at stage 35, the AMF 154 sends a UE Context Release Command to the RAN 112 to release the RRC signaling connection to the UE 105. Stage 36 may be performed after stage 35 when a NAS RAI or AS RAI is received at step 31 indicating that a response is expected by the UE 105 from the LMF 152. Step 36 may instead be performed either after a timeout if stage 35 does not occur or after stage 32 when a NAS RAI or AS RAI is received by the AMF 154 indicating no response is expected by the UE 105 from the LMF 152. It is noted that the AMF 154 may also send any pending MT small data or pending MT SMS messages to the UE 105 following stage 31 and prior to stage 36, in which case, AMF 154 may establish a full signaling connection to UE 105 via RAN 112.

At stage 37, unless the RAN 112 previously performed stage 30 for immediate release of the UE 105, the RAN 112 (e.g. a gNB 110 or ng-eNB 114 in RAN 112) sends an RRC message (e.g. an RRC EDT Complete message or an RRC Early Data Complete message) to the UE 105 to release the RRC signaling connection to the UE 105 and may include any NAS response message and its contents received at stage 35 if stage 35 occurs. The RRC message for stage 37 may be sent by RAN 112 using a CCCH in some implementations.

At stages 38-41, stages 34-37 of FIG. 6-2 are performed to return an event report (containing an indication of the trigger event and a location estimate if this was requested) to the external client 130.

At stage 42, the UE 105 continues to monitor for and detect further trigger events as in stage 25 and instigates stages 26-41 each time a trigger event is detected.

Figures 1, 8:
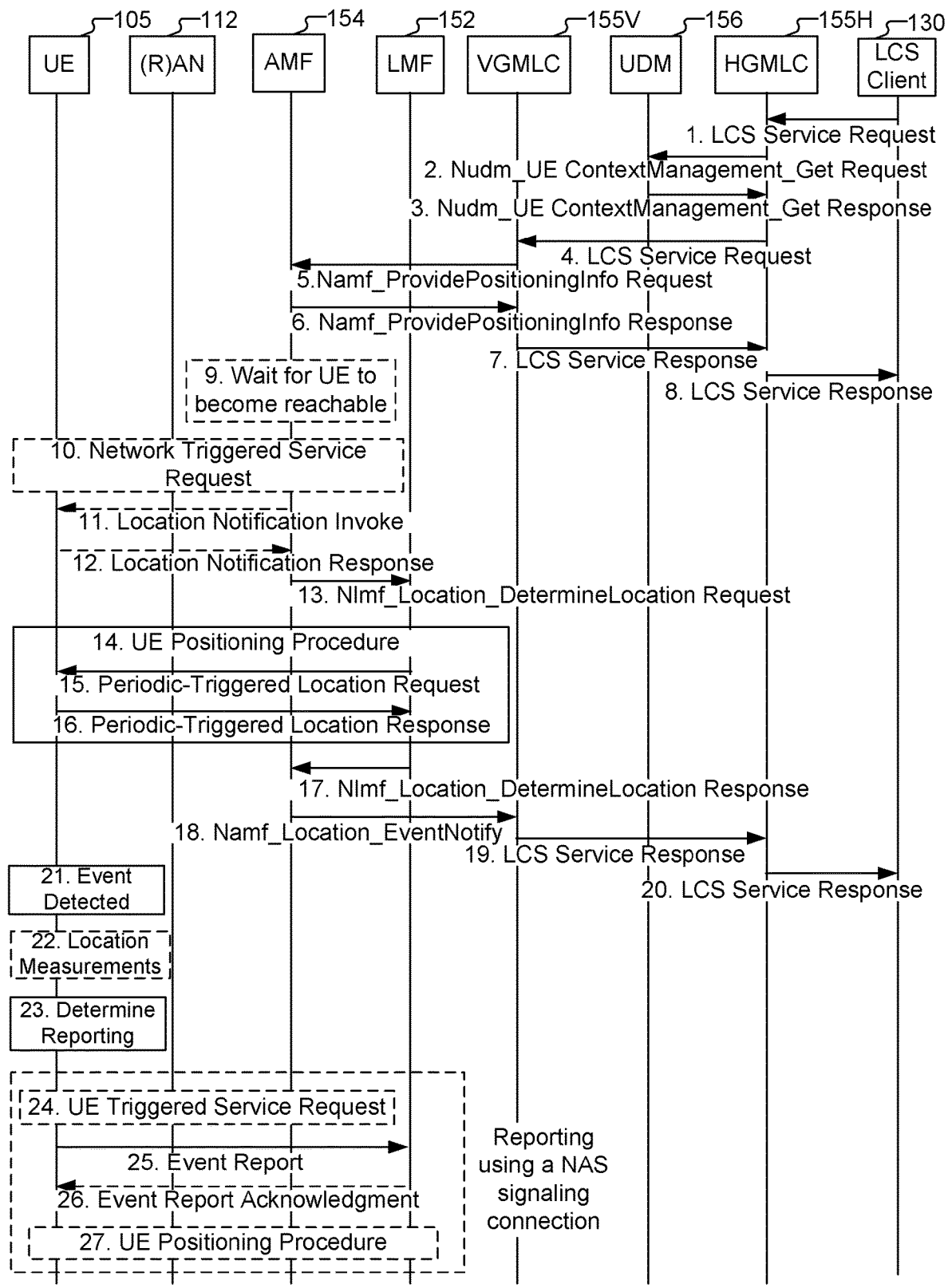
FIG. 8 (comprising FIGS. 8-1 and 8-2) shows a further low power MT-LR procedure for a roaming UE to support periodic and triggered location.
Figures 2, 8:
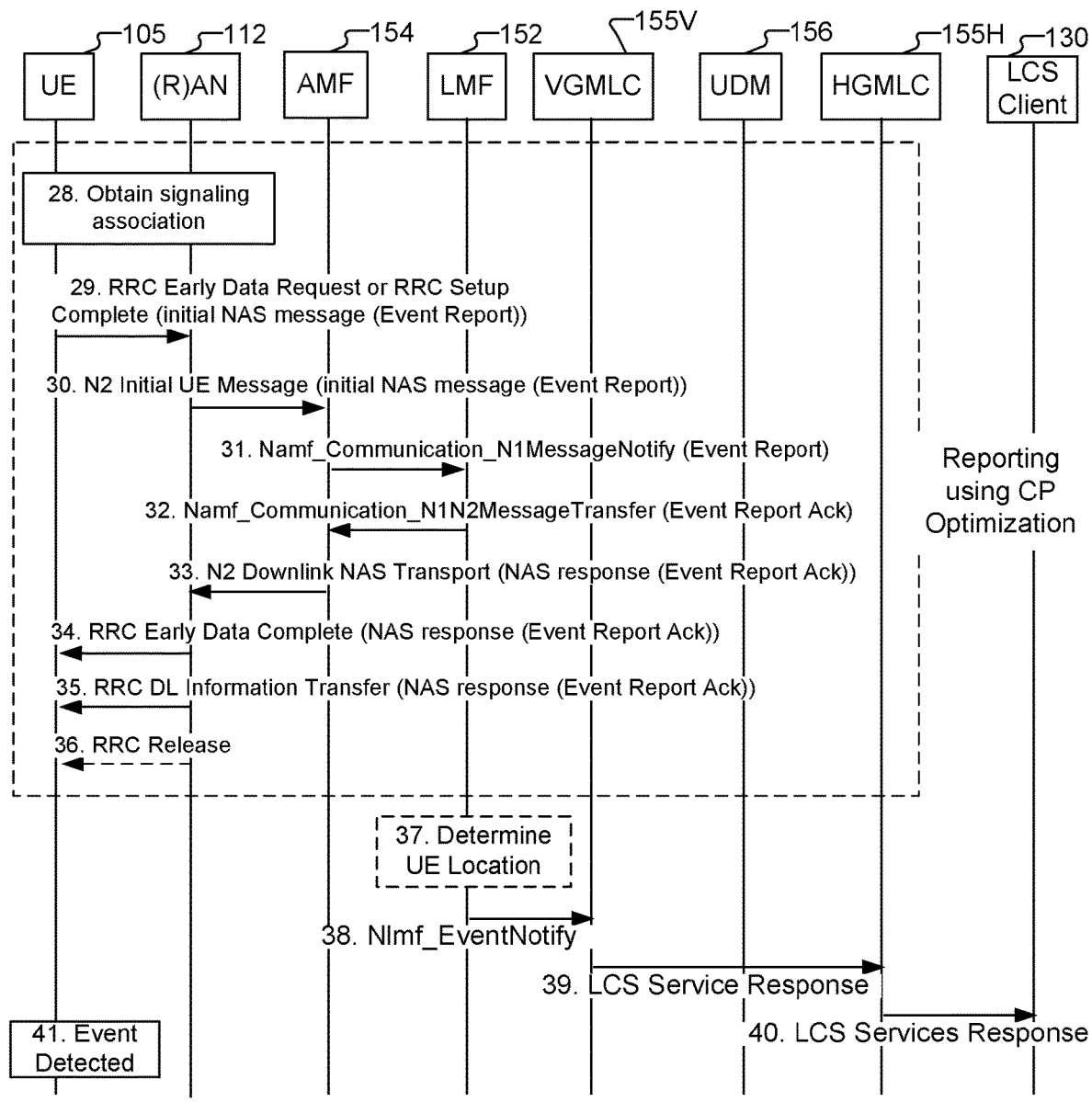

FIG. 8 (comprising FIGS. 8-1 and 8-2) summarizes another example of a periodic and triggered location procedure (which may be referred to as a periodic and triggered 5GC-MT-LR) for a roaming UE 105, as in communication system 200, according to a combined AMF and LMF based location solution. The procedure in FIG. 8 may use CP optimization, as described previously, and may in addition use EDT and one or more of enhancements E1 to E4 described previously. Due to length, FIG. 8 is split into two figures as shown by FIGS. 8-1 and 8-2, which are collectively referred to here as FIG. 8. EDT may be a special case of control plane optimization (to reduce UE power and network signaling) that may not be supported by all UEs or by all NG-RAN nodes. The procedure shown in FIG. 8-2 uses CP optimization either without EDT or with EDT allowed as a special case. The generalized procedure in FIG. 8-2 may use a NAS Control Plane Service Request and a NAS Service Accept to transfer an event report and an event report acknowledgment, respectively. A periodic and triggered 5GC-MT-LR procedure for a non-roaming UE 105, as in communication system 100, and/or in which external LCS client 130 accesses VGMLC 155V instead of HGMLC 155H, could comprise a subset of the procedure shown in FIG. 8. For example, in a subset of the procedure shown in FIG. 8, H-GMLC 155H and V-GMLC 155V may be combined (e.g. may be part of the same GMLC 155 which may act as a VGMLC, HGMLC or as both a VGMLC and HGMLC), and the stages described below for FIG. 8 may be the same, except that messages for stages 4, 7, 19 and 39 may not be sent or received. The procedure exemplified in FIG. 8 may support mobility of the UE 105 within the VPLMN 5GCN 150V and from the 5GCN 150V to an EPC also belonging to the VPLMN 150V. The procedure uses both the NL2 and NLx reference points shown for FIGS. 1 and 2. Use of the NLx reference point may enable reduced signaling and processing when reporting periodic or triggered location events which may lead to lower latency and better scalability.

At stage 1 in FIG. 8, an external LCS client 130 sends a deferred location request for a periodic, triggered or UE available location event for a target UE 105 to an HGMLC 155H in the HPLMN 5GCN 150H for the UE. The location request provides an identification for the UE 105 (e.g. a GPSI or SUPI) and the type of location reporting being requested and associated parameters. For periodic location, the request may include the time interval between successive location reports, the total number of reports and a location QoS. For triggered reporting for an area event, the request may include details of a target area, whether the trigger event to be reported is the UE 105 being inside, entering or leaving the target area, whether event reporting shall include UE location estimates and if so a location QoS and the duration of reporting. For triggered reporting for the motion event, the request may include a threshold linear distance for triggering a location report, whether event reporting shall include UE location estimates and if so a location QoS and the duration of reporting. For the UE available location event, a location QoS may be included. The HGMLC 155H may verify UE privacy requirements.

It is noted that in some embodiments, the external LCS client 130 may instead be a Network Function (NF) or an Application Function (AF) which accesses the HGMLC 155H via an NEF 159, as shown in FIGS. 1 and 2. In some other embodiments, external LCS client 130 (e.g. a PSAP or some other client supporting public safety) may access an LRF 147 or LRF 157, as shown in FIGS. 1 and 2, which then accesses the HGMLC 155H or VGMLC 155V. In these embodiments, signaling and message transfer, described below for stages 1, 8, 20 and 40 of FIG. 8 as occurring between HGMLC 155H and external LCS client 130, may instead occur between HGMLC 155H (or VGMLC 155V) and external LCS client 130 via NEF 159, LRF 147 or LRF 157.

At stage 2 in FIG. 8, the HGMLC 155H may invoke an Nudm_UE_ContextManagement_Get service operation towards the home UDM 156 of the target UE 105 and includes a GPSI or SUPI of the UE 105.

At stage 3, if stage 2 has occurred, the UDM 156 returns the serving AMF 154 address and optionally a VGMLC 155V address and current access type(s) for the UE 105 (e.g. such as NR, LTE and/or WLAN). The UDM 156 may also return subscribed privacy requirements for the target UE 105—e.g. if not stored in the HGMLC 155H and not accessible from a Privacy Profile Register (PPR) (not shown in FIG. 8).

It is noted that the HGMLC 155H may also query a Home Subscriber Server (HSS) of the target UE 105 (not shown in FIG. 8) for a serving Mobility Management Entity (MME) address as described in 3GPP TS 23.271. A deferred EPC-MT-LR procedure for Periodic and Triggered Location described in 3GPP TS 23.271 or an EPC-MT-LR procedure for the UE availability event described in 3GPP TS 23.271 may then be performed instead of stages 4-39 in FIG. 8—e.g. if the HSS returns an MME address but the UDM 156 does not return an AMF address. It is further noted that if HGMLC 155H already knows the serving AMF 154 address for UE 105 (and possibly a VGMLC 155V address and UE 105 privacy requirements), then stages 2 and 3 may not be performed.

At stage 4, if a VGMLC 155V address was not returned in stage 3, the HGMLC 155H may use a Network Repository Function (NRF) service in the HPLMN 5GCN 150H to select an available VGMLC 155V in the VPLMN 5GCN 150V, based on a VPLMN 150V address contained in the AMF 154 address received in stage 3, e.g. as described in 3GPP TSs 23.501 and 23.502. The HGMLC 155H forwards the location request to the VGMLC 155V (identified by the VGMLC 155V address obtained at stage 3 or stage 4) and includes the AMF 154 address, the target UE 105 identity (e.g. SUPI or GPSI), any access type(s) received at stage 3 and any privacy requirements for the UE 105. The HGMLC 155H also includes a contact address for the HGMLC 155H (e.g. a Uniform Resource Identifier (URI)) and a Location Deferred Request (LDR) reference number (also referred to as a correlation identifier (ID)), as well as some or all of the parameters received at stage 1 such as a type of location reporting, a location Quality of Service (QoS), a maximum duration, a maximum number of event reports, a request for location estimate inclusion in location event reports to be used for event reporting at stages 19 and 39.

At stage 5, the VGMLC 155V invokes an Namf_Location_ProvidePositioningInfo Request service operation to forward the location request including all information received at stage 4 to the serving AMF 154. The VGMLC 155V may optionally determine an LMF 152 and then includes the LMF 152 identity in the request sent to the AMF

154. LMF 152 determination by VGMLC 155V may be based on the UE 105 access type(s) and/or on the type of location requested at stage 1 (e.g. whether periodic, triggered or for the UE availability event).

At stages 6-8, if the AMF 154 supports the type of location request received at stage 5, the AMF 154 returns an acknowledgment to the external LCS client 130, via the VGMLC 155V and HGMLC 155H, indicating that the request for location was accepted. The VGMLC 155V may then optionally release all resources for the location request.

It is noted that as an optional optimization, a VGMLC 155V may not be used. In this case, instead of performing stages 4-7, the HGMLC 155H may invoke the Namf_Location_ProvidePositioningInfo Request service operation to forward the location request directly to the AMF 154. The AMF 154 then returns an acknowledgment directly to the HGMLC 155H.

At stage 9, if the UE 105 is not currently reachable (e.g. if UE 105 is using Extended Discontinuous Reception (eDRX) or Power Saving Mode (PSM)), the AMF 154 waits for the UE 105 to become reachable.

It is noted that in the event of mobility of the UE 105 to another AMF in 5GCN 150V or to an EPC when the UE 105 becomes reachable, the old serving AMF 154 for UE 105 can return an event indication to the HGMLC 155H as at stages 18 and 19 and may include the address of the new serving AMF or new serving MME if known. If an address for a new serving AMF or MME is not known by the old AMF 154, the HGMLC 155H can repeat stages 2 and 3 to query the UDM 156 and HSS for a new AMF or MME address. The HGMLC 155H can then restart the procedure from stage 3.

At stage 10, once the UE 105 is reachable, the AMF 154 performs a network triggered service request if needed to move the UE 105 into a connected state.

At stage 11, the AMF 154 may notify the UE 105 and verify UE 105 privacy requirements based on any privacy requirements received from the HGMLC 155H in stages 4-5. If this occurs, the AMF 154 may send a supplementary services Location Notification invoke to the UE 105.

At stage 12, the UE 105 may notify a user of UE 105 of the location request and may verify user permission for the location request if UE 105 privacy is to be verified. The UE 105 may then return a supplementary services Location Notification response to the AMF 154 indicating whether the user grants or withholds permission for the location request when UE 105 privacy is verified. It is noted that stages 11 and 12 may not be needed (e.g. may not be performed) for an IoT UE 105 (e.g. since typically there is no user of an IoT UE).

At stage 13, if the VGMLC 155V did not include an LMF 152 identity at stage 5, the AMF 154 determines an LMF 152, e.g. based on the type of location request and current UE access type(s). The AMF 154 then invokes an Nlmf_Location_DetermineLocation Request service operation towards the LMF 152 to initiate a request for UE location. For a request for periodic or triggered location, the AMF 154 may include all the information received in stage 5 including the HGMLC 155H contact address and LDR reference number. For a request for the UE available location event, the HGMLC 155H contact address and LDR reference number may not be included. The AMF 154 may also include certain positioning capabilities of UE 105 in the request sent at stage 13, which may have been obtained by AMF 154 from UE 105 during registration or reregistration of UE 105 with AMF 154 at the NAS level. The positioning capabilities may indicate, for example, whether UE 105 supports periodic and/or triggered location and/or whether UE 105 supports location event reporting using CP optimization and/or location event reporting using CP optimization with EDT. For example, as part of negotiating 5G network behavior during registration, UE 105 may send a NAS Registration Request to a CN node, such as AMF 154, where the Registration Request includes as indication of whether CP Optimization is supported by UE 105 for location event reporting. The positioning capabilities may then comprise the indication of whether CP Optimization is supported by UE 105 for location event reporting.

At block 14, the LMF 152 may instigate positioning of UE 105 using the UE Assisted and UE Based Positioning Procedure as described for FIG. 3, the Network Assisted Positioning Procedure as described for FIG. 4, and/or the procedure for obtaining non-UE associated network assistance data as described for FIG. 5. During the UE Assisted and UE Based Positioning procedure (if performed), the LMF 152 may request and obtain the UE positioning capabilities (e.g. which may indicate the type(s) of periodic and triggered location supported by the UE 105, the access types supported by the UE 105 for event reporting and whether UE 105 supports CP optimization and/or CP optimization with EDT). The LMF 152 may also obtain the UE 105 location using one or more of these procedures—e.g. for a request for the UE available location event or when an initial location is requested for periodic or triggered UE location. For a request for the UE available location event only, or if the UE 105 positioning capabilities obtained using the UE Assisted and UE Based Positioning Procedure or from the AMF 154 at stage 13 indicate that UE 105 does not support the type of periodic and/or triggered location being requested, the LMF 152 skips stages 15 and 16.

At stage 15, as part of block 14 and if periodic or triggered location was requested, the LMF 152 sends a Periodic-Triggered Location Request to the UE 105 via the serving AMF 154 by invoking an Namf_Communication_N1N2MessageTransfer service operation. The message carries the location request information received from the AMF 154 at stage 13, though can omit the HGMLC 155H contact address and LDR reference number when mobility of the procedure to EPC is not supported and when the LMF 152 acts an anchor LMF (as described later herein). The message also indicates whether the LMF 152 will act as an anchor LMF (which may also be referred to as a "serving LMF") and includes either the LMF 152 identification when the LMF 152 will act as an anchor LMF or a default LMF (or "any LMF") identification otherwise. The LMF identification that is included may be referred to as a "deferred routing identifier". The LMF 152 may indicate the allowed access types for event reporting by UE 105 (e.g. one or more of NR, LTE connected to 5GCN, LTE connected to EPC, WLAN access connected to 5GCN) and may indicate certain allowed or required location measurements (or a location estimate) for each location event reported by UE 105 (e.g. based on positioning capabilities of the UE 105 obtained as part of block 14 and the allowed access types). As part of NAS transport of the Periodic-Triggered Location Request from the serving AMF 154 to the UE 105, the serving AMF 154 may include a routing identifier in the NAS transport message identifying the LMF 152.

As part of stage 15 and when the request at stage 1 is for periodic or triggered location, the LMF 152 may include in the Periodic-Triggered Location Request an indication that the UE 105 is permitted (or required) to send event reports using CP optimization (with or without EDT). The LMF 152 may also include criteria indicating when CP optimization may (or shall) be used by the UE 105 and/or which values of RAI the UE 105 is permitted (or required) to include (e.g. RAI for immediate release and/or RAI for early release). For example, the criteria may indicate that use of CP optimization is allowed or required when UE 105 is idle, except following a threshold time period or threshold number of consecutive event reports for which CP optimization is used to report periodic and trigger events (e.g. following which, UE 105 may be required to use a NAS signaling connection).

It is noted that the LMF 152 may determine UE 105 support for CP optimization and/or CP optimization with EDT for event reporting, including values of RAI supported by the UE 105, by obtaining the positioning (e.g. LPP and/or NPP) capabilities of the UE 105 as part of block 14 and/or from positioning capabilities of UE 105 provided by AMF 154 at stage 13. It is also noted that use of CP optimization and/or CP optimization with EDT and/or permitted values of RAI may be negotiated at the NAS level during registration of UE 105 with 5GCN 150V. The UE 105 may then only use CP optimization and/or CP optimization with EDT and/or particular RAI values if both agreed during registration of UE 105 and allowed by the LMF 152.

At stage 16, if the request in stage 15 can be supported by UE 105, the UE 105 returns an acknowledgment to the LMF 152 as part of block 14, which is transferred via the serving AMF 154 and delivered to the LMF 152 using an Namf_Communication_N1MessageNotify service operation.

It is noted that the Periodic-Triggered Location Request sent at stage 15 and its acknowledgment at stage 16 may be messages for a positioning protocol (e.g. LPP or NPP) or may be messages for a separate protocol (e.g. a supplementary services protocol). In the latter case, each message may carry an embedded positioning protocol message (e.g. an LPP or NPP message) to enable the LMF 152 to request or allow specific location measurements from the UE 105 at stage 22 and to set up an initial location session (e.g. an LPP location session) for subsequent location reporting (e.g. at stage 25 and stage 29).

At stage 17, the LMF 152 invokes an Nlmf_Location_DetermineLocation Response service operation towards the AMF 154 to respond to the request at stage 13. For a request for the UE available location event, the response may include any UE location obtained at block 14 and the LMF 152 then releases all resources. For a periodic or triggered location request, the response may include any location obtained at block 14 and a confirmation of whether periodic or triggered location was successfully activated in the UE 105 according to stages 15 and 16; the LMF 152 also retains state information and resources for later stages if the LMF 152 acts an anchor LMF.

At stage 18, the AMF 154 invokes an Namf_Location_EventNotify service operation towards the VGMLC 155V and includes any location received at stage 17 and for periodic or triggered location, a confirmation of whether periodic or triggered location was successfully activated in the target UE 105. The VGMLC 155V may be the same VGMLC 155V used in stages 5 and 6 or may be a different VGMLC 155V. In the case of a different VGMLC 155V, the AMF 154 includes the HGMLC 155H contact address and LDR reference number. The AMF 154 may then release all resources for the location request.

At stage 19, the VGMLC 155V forwards the response received at stage 18 to the HGMLC 155H using the HGMLC 155H contact address received at stage 18 (for a different VGMLC 155V) or received and stored at stage 4 (for the same VGMLC 155V) and includes the LDR reference number. The VGMLC 155V may then release all resources for the location request.

It is noted that as an optional optimization, instead of performing stages 18 and 19, the AMF 154 may invoke an Namf_Location_EventNotify service operation directly towards the HGMLC 155H (e.g. if a VGMLC 155V is not used or if the VGMLC 155V ceases support after stage 7).

At stage 20, the HGMLC 155H forwards the response to the external LCS client 130. If the location request at stage 1 was for the UE available location event, the procedure terminates here and stages 21-41 are not performed.

At stage 21, for a periodic or triggered location request where stages 15 and 16 were successfully performed, the UE 105 monitors for occurrence of the trigger or periodic event requested in stage 15. When a trigger event is detected and if the UE 105 is camped on or connected to (or can otherwise access) an access type allowed by the LMF 152 at stage 15, the UE 105 proceeds to stage 22. If the UE 105 cannot access an allowed access type, the UE 105 may skip reporting the trigger event or may report the trigger event at a later time when an allowed access type becomes available, according to requirements configured in the UE 105 or received from the LMF 152 at stage 15.

At stage 22, the UE 105 obtains any location measurements or a location estimate that were requested or allowed at stage 15. The UE 105 may also record the type of trigger event detected at stage 21.

At stage 23, the UE 105 determines (e.g. based on any criteria received in stage 15) whether to report the trigger event using a NAS signaling connection, CP optimization with EDT, or CP optimization without EDT. If the UE 105 is already in a connected state or can only access a RAN node which does not support CP optimization (including CP optimization with or without EDT), the UE 105 determines to use a NAS signaling connection. UE 105 then performs stages 24-27 and skips stages 28-36. When UE 105 determines to use CP optimization (which may or may not include EDT), UE 105 skips stages 24-27 and performs stages 28-36 in FIG. 8. UE 105 determination to use CP optimization with EDT at stage 23 may be based in part on whether UE 105 and an NG-RAN node selected later at stage 28 can both support EDT At stage 24, if the UE 105 determines to use a NAS signaling connection at stage 23, the UE 105 performs a service request if in idle state. The description here assumes that a cellular access type to the 5GCN 150V (e.g. NR or LTE) is used for stages 24-27, although similar stages can apply to a non-cellular access (e.g. WLAN access) to 5GCN 150V.

At stage 25, the UE 105 sends an event report message to the LMF 152 which is transferred via the current serving AMF 154 for UE 105 (which may be different to the original serving AMF 154 for block 14) and is delivered to the LMF 152 using an Namf_Communication_N1MessageNotify service operation. The UE 105 may send the event report message to AMF 154 inside a NAS transport message, with AMF 154 then forwarding the event report message to LMF 152. The event report may indicate the type of event being reported and includes any location measurements or location estimate obtained by UE 105 at stage 22. When an anchor LMF 152 is indicated at stage 15, the UE 105 includes a routing identifier in the NAS transport message indicating the anchor LMF 152 to ensure the event report is forwarded by the AMF 154 to the anchor LMF 152. In this case, and unless there was a change of anchor LMF as described later for FIG. 9, the LMF 152 for stage 25 is the same as the LMF 152 for block 14. When the LMF 152 at stage 15 is not an anchor LMF, the UE 105 includes a routing identifier in the NAS transport message indicating a default LMF (or any LMF) and the AMF 154 forwards the event report to any suitable LMF 152 (e.g. which may be different to the LMF 152 for block 14). In this case, the UE 105 also includes the HGMLC 155H contact address, the LDR reference number, whether location estimates are to be reported and if so the location QoS in the event report.

At stage 26, the LMF 52 may return an acknowledgment for the event report to the UE 105.

It is noted that the event report and acknowledgment sent at stages 25 and 26 may be messages for a positioning protocol (e.g. LPP or NPP) or may be messages for a separate protocol (e.g. a supplementary services protocol). In the latter case, the event report at stage 25 may carry an embedded UL positioning protocol message (e.g. an LPP or NPP message) to enable the UE 105 to include any location measurements or location estimate obtained at stage 22. For example, the UL positioning protocol message may be an LPP Provide Location Information message.

At stage 27, the LMF 152 may obtain location measurements or a location estimate for the UE 105 by performing a UE positioning procedure using the UE Assisted and UE Based Positioning Procedure as described for FIG. 3, the Network Assisted Positioning Procedure as described for FIG. 4, and/or the procedure for obtaining non-UE associated network assistance data as described for FIG. 5.

Stages 28-36 in FIG. 8-2 are performed when UE 105 determines to use CP optimization at stage 23 (with or without EDT) and are not performed when UE 105 determines to use a NAS signaling connection at stage 23.

At stage 28, the UE 105 determines (or selects) a suitable serving cell if accessing NG-RAN 112 and requests and obtains a signaling association with an NG-RAN node in NG-RAN 112 that supports the determined cell (e.g. a gNB 110 or ng-eNB 114). If the UE 105 determines to use control plane optimization without EDT at stage 23, the signaling association comprises an RRC signaling connection to the NG-RAN node. If the UE 105 determines to use control plane optimization with EDT at stage 23, obtaining the signaling association at stage 28 may comprise a random access procedure in which UE 105 sends a random access request to send an RRC message (e.g. where the random access request may comprise a preamble) to the NG-RAN node, and receives a random access response from the RAN node providing scheduling information for later transmission at stage 29 of the requested RRC message. However, UE 105 does not obtain a signaling connection with a CN node, such as AMF 154, at stage 28.

At stage 29, if CP optimization with EDT was determined at stage 23, the UE sends an RRC Early Data Request message to the NG-RAN node according to the signaling association obtained at stage 28 (e.g. according to a random access response received from the NG-RAN node at stage 28), and includes an initial NAS message within the RRC Early Data Request message. The initial NAS message may be a NAS Control Plane Service Request (CPSR) message or an Uplink (UL) NAS Transport message. The RRC Early Data Request message may be sent to the NG-RAN node by UE 105 using a CCCH which may not require an RRC signaling connection between UE 105 and the NG RAN node, which may reduce signaling. Otherwise, if CP optimization will be used without EDT, the UE 105 establishes an RRC signaling connection with the NG-RAN node as described for stage 28, and sends the initial NAS message at stage 29, which may be a NAS CPSR message or UL NAS Transport message, to the NG-RAN node as part of RRC connection establishment. For example, the initial NAS message may be sent to the NG-RAN node inside an RRC Setup Complete message if the NG-RAN node is a gNB 110 or inside an RRC Connection Setup Complete message if the NG-RAN node is an ng-eNB 114. The initial NAS message (e.g. NAS CPSR or UL NAS Transport) for either use of EDT or non-use of EDT includes an event report message which includes the information described for stage 25 in FIG. 8 (e.g. the type of event being reported and any location measurements or location estimate obtained at stage 22). The initial NAS message also includes a routing identifier which contains the LMF identification (i.e. the deferred routing identifier) received in stage 15. The UE 105 also includes a NAS Release Assistance Indication (NAS RAI) in the initial NAS message. The NAS RAI may indicate a single response is expected by UE 105. It is noted that event reporting using control plane optimization may require a single Event report acknowledgment from LMF 152.

At stage 30, the NG-RAN node 112 forwards the initial NAS message to the AMF 154 in an N2 Initial UE message and includes an "EDT Session" indication if EDT was used at stages 28 and 29.

At stage 31, the AMF 154 checks the integrity of the initial NAS message and deciphers its contents. The AMF 154 then invokes an Namf_Communication_N1MessageNotify service operation to forward the event report to either the anchor LMF 152 or any suitable LMF 152 as described for stage 25. The AMF 154 includes an indication of control plane optimization in the service operation and may include the serving cell ID.

At stage 32, the LMF 152 invokes an Namf_Communication_N1N2MessageTransfer operation to return an acknowledgment for the event report as described for stage 26.

At stage 33, The AMF 154 forwards the acknowledgment to the NG-RAN node in a NAS response message (e.g. a NAS Service Accept (SA) message if the initial NAS message was a NAS CPSR or a Downlink (DL) NAS Transport message if the initial NAS message was an UL NAS Transport message), which is transferred to the NG-RAN node in an N2 message (e.g. an N2 Downlink NAS Transport message). The AMF 154 also includes an "end indication" in the N2 message. If the AMF 154 determines more data or signaling may be pending for the UE 105, the AMF 154 may first send either an N2 Downlink NAS Transport message to the NG-RAN node 112 carrying the NAS response message or an N2 Initial Context Setup Request message without an "end indication" and stage 34 and stage 36 below are then not performed.

At stage 34, if CP optimization with EDT was used at stage 29, the NG-RAN node sends an RRC Early Data Complete message to the UE 105 and includes the NAS response message received at stage 33.

At stage 35, if CP optimization without EDT was used at stage 29, the NG-RAN node 112 sends an RRC DL Information Transfer message to the UE 105 and includes the NAS response message received at stage 33.

At stage 36, if stage 35 occurs, the NG-RAN node releases the RRC signaling connection to UE 105, e.g. by sending to UE 105 either an RRC Release message if the NG-RAN node is a gNB 110 or an RRC Connection Release message if the NG-RAN node is an ng-eNB 114.

Stages 37-41 in FIG. 8 may be supported for all cases—i.e. when CP optimization is used and when it is not used.

At stage 37, if a location estimate is needed for event reporting, the LMF 152 determines the UE 105 location using the location measurements and/or location estimate(s) obtained at stage 25 and/or stage 27 when UE 105 sends an event report using a NAS signaling connection or obtained at stage 32 when UE 105 sends an event report using CP optimization.

At stage 38, the LMF 152 selects a VGMLC 155V (which may be different to the VGMLC 155V for stages 4-8 and stages 18-20) and invokes an Nlmf_EventNotify service operation towards the VGMLC 155V with an indication of the type of event being reported, the H-GMLC 155H contact address and LDR reference number and any location estimate obtained at stage 37.

It is noted that the LMF 152 may select the VGMLC 155V in one of three different ways at stage 38. In a first way, the LMF 152 may be configured with the addresses of one or more VGMLCs 155 in the VPLMN 5GCN 150V and may select a particular VGMLC 155V randomly, based on current or expected loading of VGMLCs 155 in VPLMN 5GCN 150V, or based on UE 105 access type(s) and/or the type of reported location event. In a second way, the LMF 152 may use an NRF service in the VPLMN 5GCN 150V to select a VGMLC 155V as described in 3GPP TS 23.501 and 3GPP TS 23.502. In a third way, if the LMF 152 is an anchor LMF, the LMF 152 may have received the original VGMLC 155V address from AMF 154 at stage 13, and may have stored the address, in which case LMF 152 may select the original VGMLC 155V.

At stage 39, the VGMLC 155V forwards the information received in stage 38 to the HGMLC 155H.

It is noted that as an optional optimization, instead of performing stages 38 and 39, the LMF 152 may invoke an Nlmf_EventNotify service operation directly towards the HGMLC 155H.

At stage 40, the HGMLC 155H uses the LDR reference number received in stage 39 to identify the periodic and triggered location request received in stage 1 and then sends the type of event being reported and any location estimate to the external LCS client 130. The HGMLC 155H may also verify UE 105 privacy requirements before reporting the event and any location to the external LCS client 130.

At stage 41, the UE 105 continues to monitor for further periodic or trigger events and instigates stages 22-40 each time a trigger event is detected.

Figure 9:
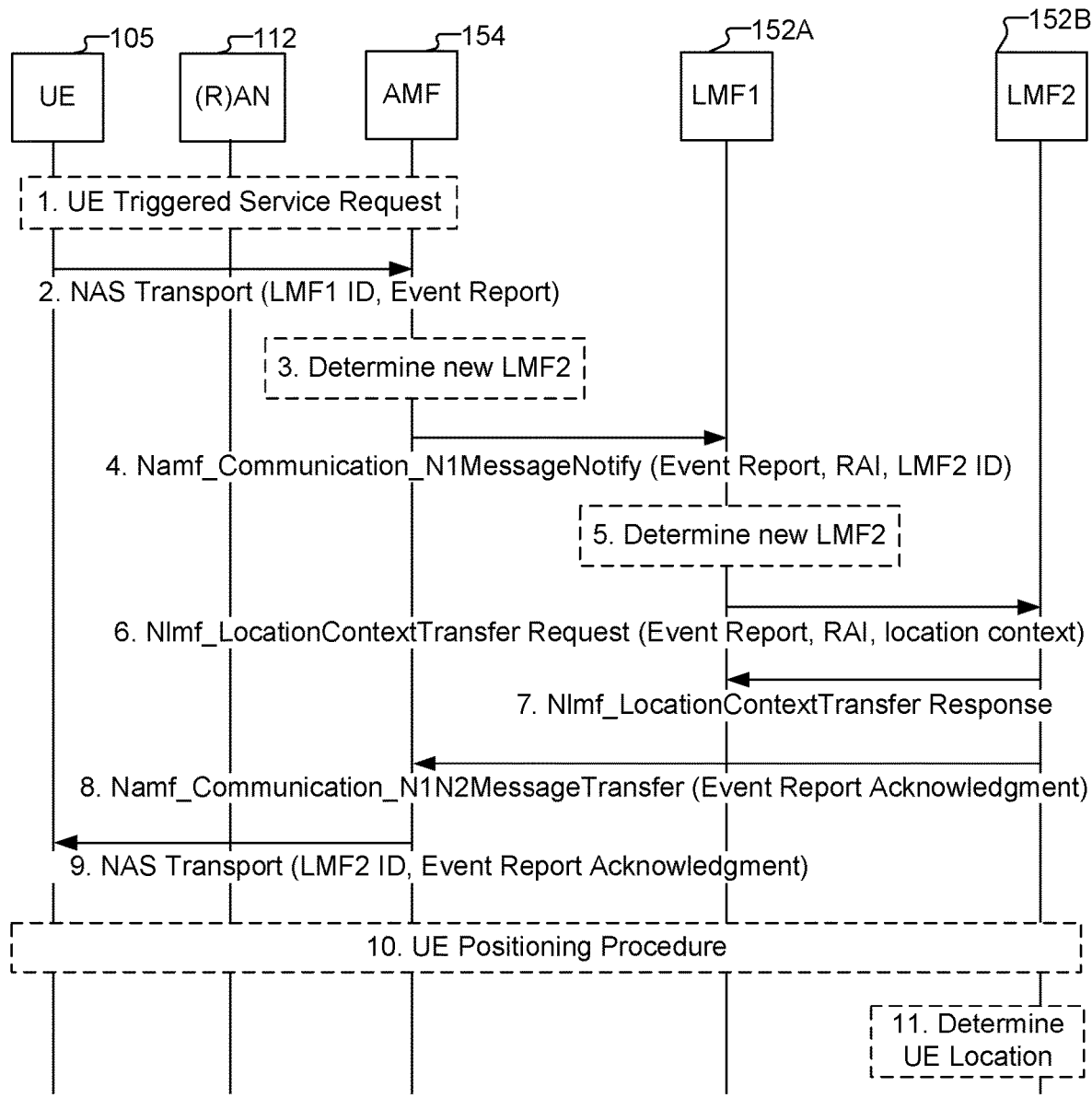
FIG. 9 shows a procedure for changing an anchor LMF for the low power MT-LR procedure shown in FIG. 8.

FIG. 9 shows a procedure for when an anchor LMF 152 is used for the procedure shown in FIG. 8 and mobility of the target UE 105 leads to a change of serving AMF for which the original anchor LMF 152 is not reachable or not suitable. For example, the anchor LMF 152 may be remote from the AMF 154 leading to higher resource utilization for AMF 154 to LMF 152 signaling, or the LMF 152 may not have sufficient information for the current access network (e.g. serving and neighbor gNBs 110, ng-eNB 114 and/or a WLAN) for the UE 105 to enable accurate and reliable location. In such a case, the anchor LMF 152 may need to change. FIG. 9 shows a procedure to enable change of the anchor LMF 152 when a UE 105 sends an event report as at stage 25 or stages 29-31 in FIG. 8, at a time when the current anchor LMF for UE 105 is LMF1 152A in FIG. 9.

At stage 1 in FIG. 9, the UE 105 performs a UE triggered service request, if needed, as for stage 24 in FIG. 8-1 if a NAS signaling connection is used.

At stage 2 in FIG. 9, the UE 105 sends an initial NAS message containing an event report message to the serving AMF 154. The initial NAS message includes a routing identifier indicating LMF1 152A. Stage 2 may correspond to stage 25 for FIG. 8, when UE 105 uses a NAS signaling connection, or stages 28-31 for FIG. 8 when UE 105 uses control plane optimization (with or without EDT).

At stage 3 in FIG. 9, the AMF 154 may determine that LMF1 152A is either unreachable or unsuitable to process the event report. The AMF 154 may then determine another anchor LMF, LMF2 152B. Stage 3 is optional and may not always be performed.

At stage 4, the AMF 154 invokes an Namf_Communication_N1MessageNotify service operation towards LMF1 152A. The service operation includes the event report received in stage 2, an indication of whether control plane optimization is used, and an identification (ID) of LMF2 152B if AMF 154 determines LMF2 152B at stage 3.

At stage 5, if an ID of LMF2 152B was not included at stage 4, LMF1 152A may determine that LMF1 152A is unsuitable to process the event report (e.g. because LMF1 152A is not configured with information for a current access type or current access node for UE 105). The LMF1 152A may then determine another anchor LMF, LMF2 152B. Stage 5 may not be performed when stage 3 is performed but may typically be performed otherwise (when there is a change of anchor LMF).

At stage 6, based on receiving the identification of LMF2 152B at stage 4 or determining LMF2 152B at stage 5, LMF1 152A invokes an Nlmf_LocationContextTransfer Request service operation towards LMF2 152B to transfer the event report. The service operation may also include an indication of whether control plane optimization is used, an indication (e.g. identification) of AMF 154, optionally a current serving cell ID for UE 105, and a current location context of the UE 105, and may indicate a change of anchor LMF. The location context of UE 105 may include all the information originally received by LMF1 152A for the periodic or triggered location request for UE 105 from either (i) the VGMLC 155V or HGMLC 155H according to the procedure in FIG. 8 or (ii) an earlier anchor LMF according to the procedure in FIG. 9. The location context may also include the current status of event reporting for UE 105 (e.g. the number of event reports so far received from UE 105 and/or the duration of event reporting so far) and may include location related information for UE 105 such a previous location estimate or previous location measurements.

At stage 7, LMF2 152B returns an acknowledgment to LMF1 152A confirming the transfer of anchor LMF for UE 105. LMF1 152A then releases all resources for location of UE 105.

At stage 8, LMF2 152B invokes an Namf_Communication_N1N2MessageTransfer service operation towards the AMF 154 to request the transfer of an Event Report Acknowledgment message to the UE 105. The Event Report Acknowledgment may indicate a change of anchor LMF and may include the LMF2 152B identification or identifier. Stage 8 may correspond to stage 26 in FIG. 8 when UE 105 uses a NAS signaling connection, or stage 32 for FIG. 8 when UE 105 uses control plane optimization.

At stage 9, the AMF 154 forwards the Event Report Acknowledgment to the UE 105 in a NAS response message. AMF 154 may also include a routing identifier indicating LMF2 152B in the NAS response message, which may avoid the need for LMF2 152B to include an LMF2 152B identification in the Event Report Acknowledgment at stage 8. Stage 9 may correspond to part of stage 26 in FIG.

8 when UE 105 uses a NAS signaling connection, or stages 33-36 for FIG. 8 when UE 105 uses control plane optimization.

At stage 10, when the UE 105 uses a NAS signaling connection, LMF2 152B may obtain location measurements or a location estimate for the UE 105 by performing a UE positioning procedure as at stage 27 in FIG. 8.

At stage 11, if a location estimate is needed for event reporting, LMF2 152B determines the UE 105 location as at stage 37 in FIG. 8. The rest of the procedure in FIG. 8 may then continue from stage 38 in FIG. 8 with LMF2 152B retaining state information to enable support of subsequent event reports from the UE 105.

It is noted that in a variant of the procedure shown in FIG. 9, AMF 154 may always perform stage 3 in FIG. 9 to determine LMF2 152B when a change of anchor LMF 152 is needed. In this variant, AMF 154 may invoke an Namf_Communication_N1MessageNotify service operation towards LMF2 152B at stage 4 in FIG. 8 rather than towards LMF1 152A, where the service operation includes the event report received in stage 2, an indication of whether control plane optimization is used, and an identification (ID) of LMF1 152A. LMF2 152B may then send a request to LMF1 152A for a location context of UE 105, which LMF1 152A may return, with the location context as defined for stage 6 of the original procedure in FIG. 9. The variant of the procedure may then continue according to stages 8-11 of the original procedure described above for FIG. 9.

Figure 10:
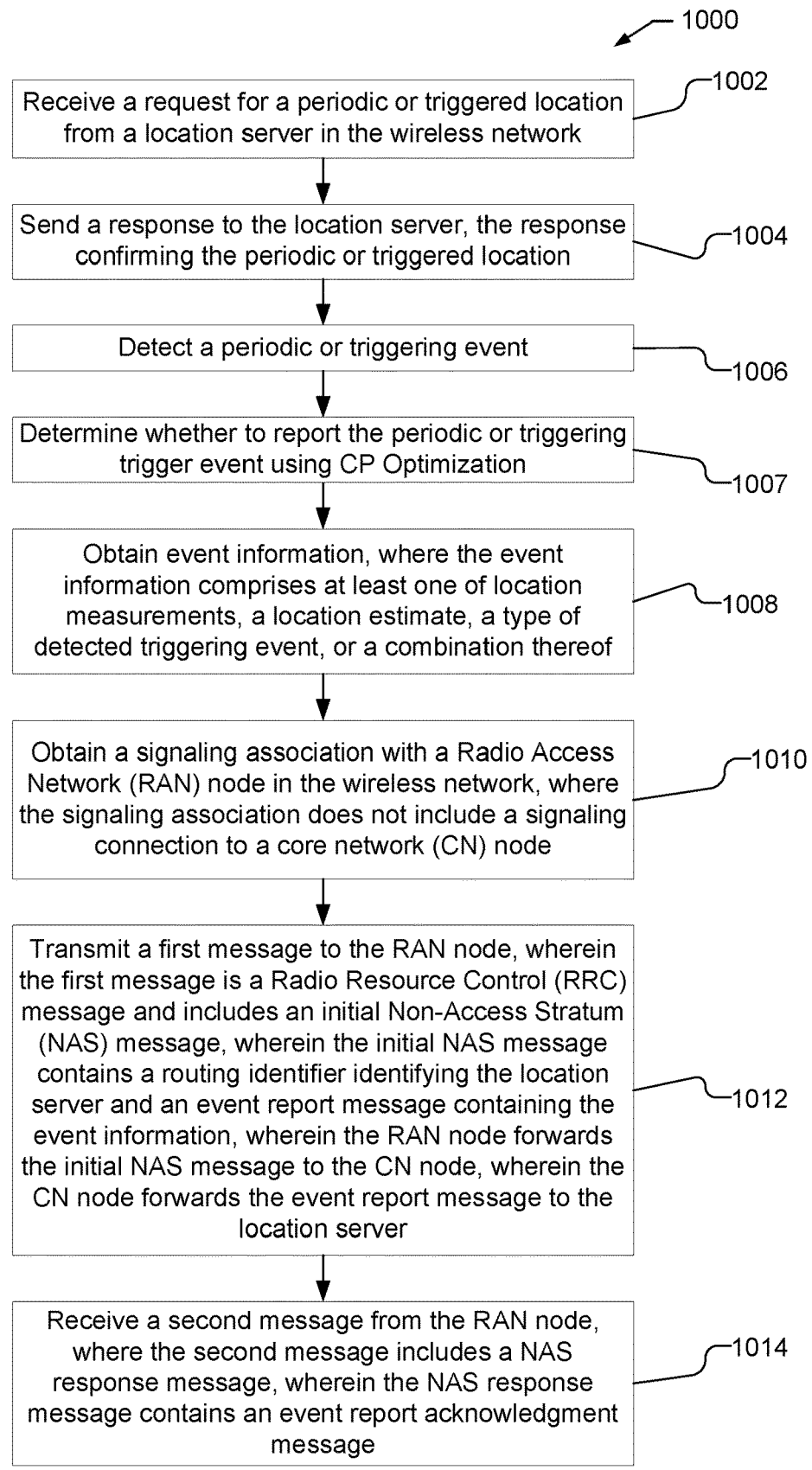
FIG. 10 shows a process flow illustrating a method for supporting low power periodic and triggered location of a user equipment (UE) performed by the UE.

FIG. 10 shows a process flow 1000 illustrating a method for supporting periodic and triggered location of a user equipment (UE) in a wireless network performed by the UE, such as the UE 105. As illustrated, at block 1002, the UE receives a request for a periodic or triggered location from a location server in the wireless network, such as an LMF (e.g. LMF 152), e.g. as at stage 19 in FIG. 7 or stage 15 in FIG. 8. At block 1004, the UE sends a response to the location server confirming the periodic or triggered location, e.g. as at stage 20 in FIG. 7 or stage 16 in FIG. 8. The request received at block 1002 and the response sent at block 1004 may be messages for a positioning protocol (e.g. LPP or NPP), messages for a supplementary services protocol, or may each comprise both types of message. At block 1006, the UE detects a periodic or triggering event, e.g. as at stage 25 in FIG. 7 or stage 21 in FIG. 8. At block 1007, the UE determines whether to report the periodic or triggering event using Control Plane (CP) Optimization, e.g., as at stage 26 in FIG. 7 or stage 23 in FIG. 8. At block 1008, the UE obtains event information, which may comprise at least one of location measurements, a location estimate, a type of detected triggering event, or a combination thereof, e.g. as at stage 28 in FIG. 7 or stage 22 in FIG. 8. At block 1010, the UE obtains a signaling association with a Radio Access Network (RAN) node in the wireless network, such as New Radio (NR) Node B (e.g. a gNB 110) or a next generation evolved Node B (e.g. a ng-eNB 114), where the signaling association does not include a signaling connection to a core network (CN) node such as a serving AMF (e.g. the AMF 154), e.g. as at stage 28 in FIG. 7 or stage 28 in FIG. 8. At block 1012, the UE transmits a first message to the RAN node, where the first message is a Radio Resource Control (RCC) message and includes an initial Non-Access Stratum (NAS) message, wherein the initial NAS message contains a routing identifier identifying the location server and an event report message containing the event information, e.g. as at stage 29 in FIG. 7 or stage 29 in FIG. 8. The RAN node then forwards the initial NAS message to the CN node (e.g. as at stage 31 in FIG. 7 or stage 30 in FIG. 8), and the CN node forwards the event report message to the location server (e.g. as at stage 32 in FIG. 7 or stage 31 in FIG. 8). At block 1014, the UE receives a second message from the RAN node, where the second message includes a NAS response message, wherein the NAS response message contains an event report acknowledgment message, e.g. as at stage 30 or 37 in FIG. 7 or stage 34 or 35 in FIG. 8.

In one embodiment, the method further comprises including a NAS release assistance indication (RAI) in the initial NAS message transmitted at block 1012, where the CN node forwards the event report message and an indication of CP optimization to the location server, as at stage 32 in FIG. 7 or stage 31 in FIG. 8. The NAS RAI may indicate a single response is expected.

The event report message sent at block 1012 may comprise a message for a positioning protocol (e.g. LPP or NPP), a message for a supplementary services protocol, or both messages.

The wireless network may be Fifth Generation System (5GS), the RAN node may be a New Radio (NR) Node B (e.g. a gNB 110) or a next generation evolved Node B (e.g. ng-eNB 114), the CN node may be an Access and Mobility Management Function (e.g. AMF 154), and the location server may be a Location Management Function (e.g. LMF 152). In one implementation, the initial NAS message is a NAS Control Plane Service Request message or an Uplink NAS Transport message, and the NAS response message may be a NAS Service Accept message or a Downlink NAS Transport message. For example, in one embodiment, determining whether to report the periodic or triggering event using CP Optimization in block 1007 may include determining to report the periodic or triggering event using CP Optimization without Early Data Transmission (EDT), where the signaling association with the RAN node comprises an RRC signaling connection to the RAN node. In this embodiment, the first message may be an RRC Setup Complete message or an RRC Connection Setup Complete message, and/or the second message may be an RRC Downlink Information Transfer message. In another embodiment, determining whether to report the periodic or triggering event using CP Optimization in block 1007 may include determining to report the periodic or triggering event using CP Optimization with Early Data Transmission (EDT), where the first message is an RRC Early Data Request message and the second message is an RRC Early Data Complete message. In this other embodiment, the first message may be transmitted using a Common Control Channel (CCCH), and the second message may be received using a CCCH.

In one implementation, the event report acknowledgment message may be an acknowledgment of the event report message.

In one implementation, the request for the periodic or triggered location received at block 1002 includes a first indication as to whether the UE may report the detected periodic or triggering event using CP optimization. In this implementation, the method for process flow 1000 may further include sending a NAS Registration Request message to a CN node in the wireless network (e.g. AMF 154), and including in the NAS Registration Request message a second indication as to whether CP Optimization is supported by the UE for location event reporting, where the first indication is based in part on the second indication, e.g., as discussed for stage 13 in FIG. 8. In this implementation, the request for the periodic or triggered location received at block 1002 may include criteria for reporting the detected periodic or triggering event using CP optimization. The criteria may include at least one of the following: use by the UE of CP optimization for reporting is allowed or required when the UE is idle; use by the UE of CP optimization for reporting is not allowed following a threshold time period for which CP optimization for reporting is used by the UE to report periodic and trigger events; use by the UE of CP optimization for reporting is not allowed following a threshold number of consecutive event reports for which CP optimization is used by the UE to report periodic and trigger events; or a combination thereof.

Figure 11:
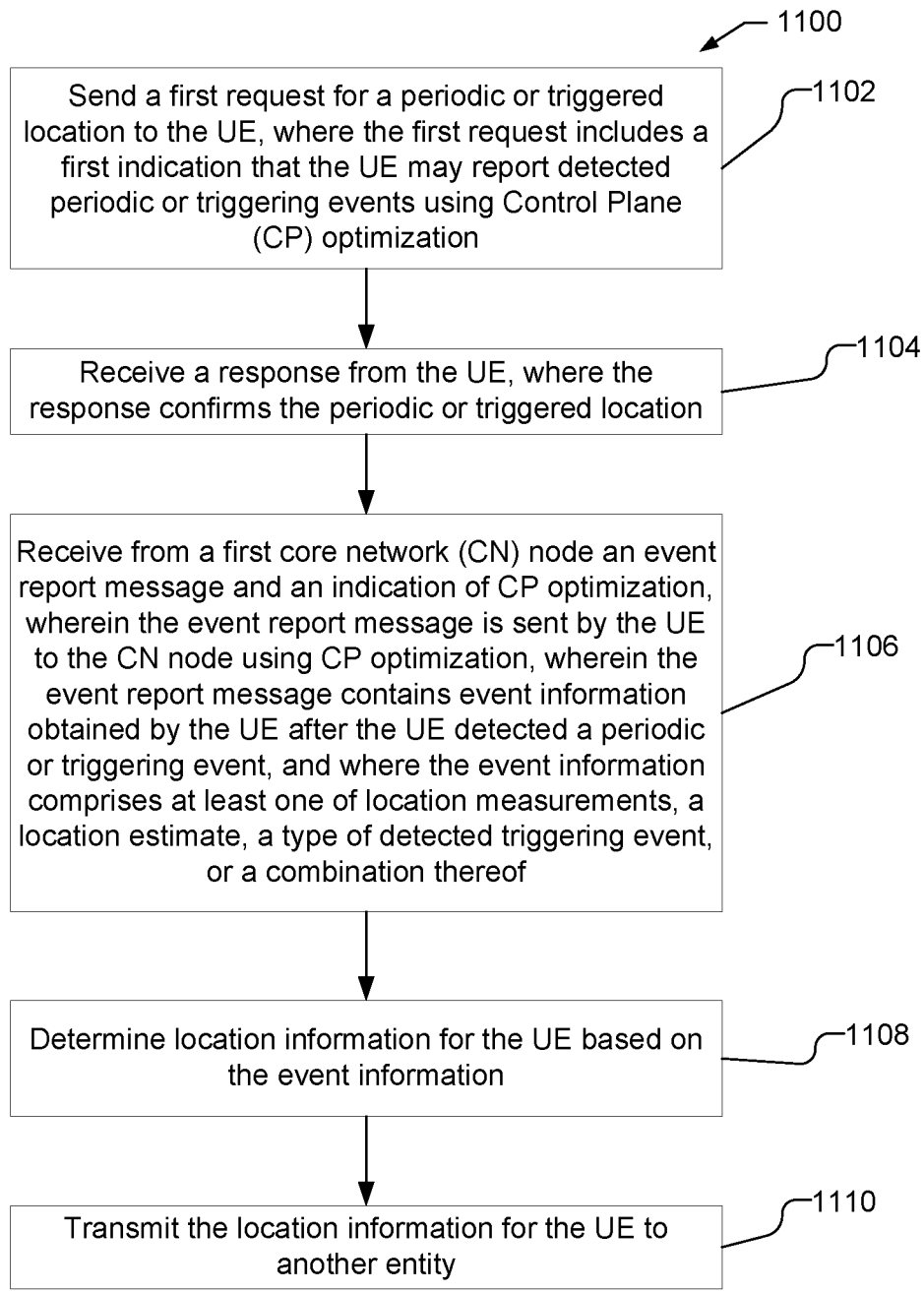
FIG. 11 shows a process flow illustrating a method for supporting low power periodic and triggered location of a user equipment performed by a location server.

FIG. 11 shows a process flow 1100 illustrating a method for supporting periodic and triggered location of a user equipment (UE), such as UE 105, performed by the location server, such as an LMF (e.g. the LMF 152). As illustrated, at block 1102, the location server sends a first request for a periodic or triggered location to the UE, where the first request includes a first indication that the UE may (or shall) report detected periodic or triggering events using Control Plane (CP) optimization, e.g. as at stage 19 in FIG. 7 or stage 15 in FIG. 8. At block 1104, the location server receives a response from the UE, where the response confirms the periodic or triggered location, e.g. as at stage 20 in FIG. 7 or stage 16 in FIG. 8. The request sent at block 1102 and the response received at block 1104 may be messages for a positioning protocol (e.g. LPP or NPP), messages for a supplementary services protocol, or may each comprise both types of message.

At block 1106, the location server receives from a first core network (CN) node, such as an AMF (e.g. AMF 154), an event report message and an indication of CP optimization, wherein the event report message is sent by the UE to the CN node using CP optimization, wherein the event report message contains event information obtained by the UE after the UE detected a periodic or triggering event, and where the event information comprises at least one of location measurements, a location estimate, a type of detected triggering event, or a combination thereof. For example, block 1106 may correspond to stage 32 in FIG. 7 or stage 31 in FIG. 8

At block 1108, the location server determines location information for the UE based on the event information, e.g. as at stage 33 in FIG. 7 or stage 37 in FIG. 8. At block 1110, the location server transmits the location information for the UE to another entity, such as a GMLC (e.g. GMLC 155V or GMLC 155H) or an LCS client (e.g. LCS client 130), e.g. as at stage 38 or 40 in FIG. 7 or stage 38 in FIG. 8. For example, the location information may comprise a location estimate for the UE, a type of detected triggering event, or both.

The event report message received at block 1106 may comprise a message for a positioning protocol (e.g. LPP or NPP), a message for a supplementary services protocol, or both messages.

The process may further comprise sending an event report acknowledgment message to the first CN node in response to the event report message, where the event report acknowledgment message is forwarded to the UE by the first CN node), e.g. as at stage 32 in FIG. 8. The event report acknowledgment message may comprise an acknowledgment of the event report message.

The process may further comprise including in the first request for the periodic or triggered location a first indication that the UE may use CP optimization for reporting the detected periodic or triggering events, e.g. as at stage 19 in FIG. 7 or stage 15 in FIG. 8.

The process may further include including criteria in the first request for the periodic or triggered location, wherein the criteria comprise criteria for reporting the detected periodic or triggering events using CP optimization, e.g. as at stage 19 in FIG. 7 or stage 15 in FIG. 8. The criteria may include at least one of the following: use of CP optimization for reporting is allowed or required when the UE is idle; use of CP optimization for reporting is not allowed following a threshold time period for which CP optimization is used by the UE to report periodic and trigger events; use of CP optimization for reporting is not allowed following a threshold number of consecutive event reports for which CP optimization is used by the UE to report periodic and trigger events; or a combination thereof, e.g. as described for stage 15 in FIG. 8.

The process may further include receiving a second request for the periodic or triggered location from a second CN node, wherein the second request for the periodic or triggered location includes a second indication that the UE supports and is allowed to use CP optimization to report periodic and trigger events, wherein the first indication is based in part on the second indication, e.g. as described for stage 13 in FIG. 8.

Figure 12:
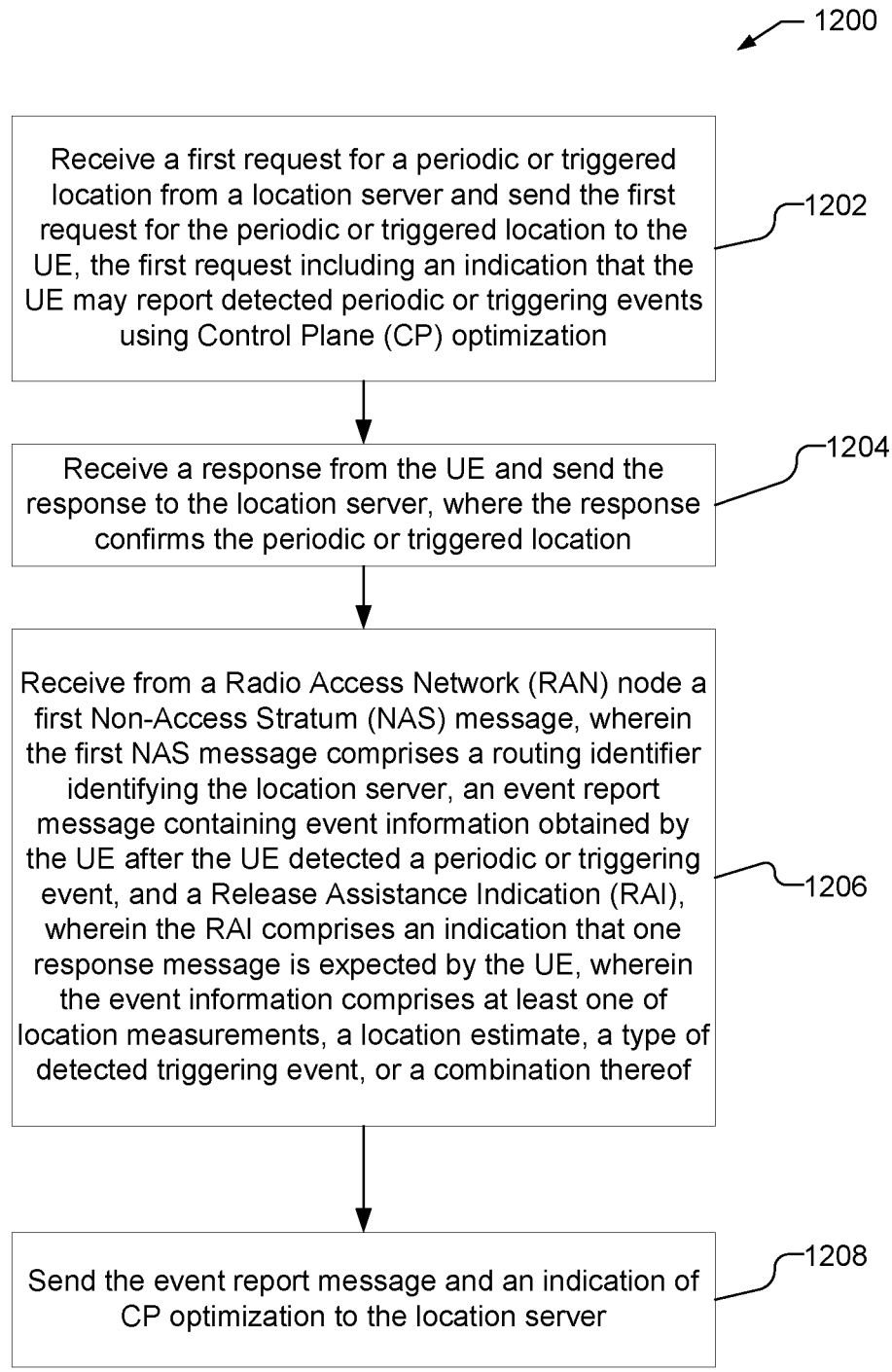
FIG. 12 shows a process flow illustrating a method for supporting low power periodic and triggered location of a user equipment performed by a core network (CN) node.

FIG. 12 shows a process flow 1200 illustrating a method for supporting periodic and triggered location of a user equipment (UE), such as UE 105, performed by a core network (CN) node, such as an AMF (e.g. AMF 154). As illustrated, at block 1202, the CN node receives a first request for a periodic or triggered location from a location server, such as an LMF (e.g. LMF 152), and sends the first request for the periodic or triggered location to the UE (e.g. inside a NAS Transport message), where the first request includes an indication that the UE may report detected periodic or triggering events using Control Plane (CP) optimization. For example, block 1202 may correspond to part of stage 19 for FIG. 7 or part of stages 15 for FIG. 8. At block 1204, the CN node receives a response from the UE (e.g. inside a NAS Transport message) and sends the response to the location server, where the response confirms the periodic or triggered location. For example, block 1204 may correspond to part of stage 20 for FIG. 7 or part of stage 16 for FIG. 8. The request received at block 1202 and the response received at block 1204 may be messages for a positioning protocol (e.g. LPP or NPP), messages for a supplementary services protocol, or may each comprise both types of message.

At block 1206, the CN node receives from a Radio Access Network (RAN) node, such as a New Radio (NR) Node B (e.g. a gNB 110) or a next generation evolved Node B (e.g. a ng-eNB 114), a first Non-Access Stratum (NAS) message, wherein the first NAS message may comprise a routing identifier, identifying the location server, an event report message containing event information obtained by the UE after the UE detected a periodic or triggering event, and a Release Assistance Indication (RAI), wherein the RAI comprises an indication that one response message is expected by the UE, e.g. as at stage 31 in FIG. 7 or stage 30 in FIG. 8. For example, the event information may comprise at least one of location measurements, a location estimate, a type of detected triggering event, or a combination thereof. At block 1208, the CN node sends the event report message and an indication of CP optimization to the location server, e.g. as at stage 32 in FIG. 7 or stage 31 in FIG. 8.

The event report message may comprise a message for a positioning protocol (e.g. LPP or NPP), a message for a supplementary services protocol, or both.

In one embodiment of the method which may be applicable to a combined AMF and LMF location solution, the CN node further receives a second request for a periodic or triggered location from another entity (e.g. gateway mobile location center), e.g. as at stage 5 in FIG. 8. The CN node may then send a third request for a periodic or triggered location to the location server, wherein the third request for a periodic or triggered location is based on the second request for a periodic or triggered location; (e.g. as at stage 13 in FIG. 8). The CN node may include in the third request a first indication of whether the UE supports reporting of detected periodic or triggering events using CP optimization, where the receiving the first request for the periodic or triggered location from the location server at block 1202 is in response to the sending the third request for the periodic or triggered location to the location server. The CN node may receive positioning capabilities of the UE from the UE during a registration of the UE with the CN node, wherein the positioning capabilities comprise a second indication of whether the UE supports reporting of periodic and triggering events using CP optimization; and may then include the second indication in the first indication (e.g., as described for stage 13 of FIG. 8).

The CN node may further receive an event report acknowledgment message from the location server in response to the event report message (e.g. as at stage 34 in FIG. 7 or stage 32 in FIG. 8); and may then send a second NAS message containing the event report acknowledgment message to the UE (e.g. as at stage 35 in FIG. 7 or stage 33 in FIG. 8). The event report acknowledgment message may comprise an acknowledgment of the event report message. The first NAS message may be a NAS Control Plane Service Request message or an Uplink NAS Transport message, and the second NAS message may be a NAS Service Accept message or a Downlink NAS Transport message.

The method may further include the first request for the periodic or triggered location received at block 1202 including criteria for reporting the detected periodic or triggering events using CP optimization. The criteria may comprise at least one of the following: use of CP optimization for reporting is allowed or required when the UE is idle; use of CP optimization for reporting is not allowed following a threshold time period for which CP optimization is used by the UE to report periodic and trigger events; use of CP optimization for reporting is not allowed following a threshold number of consecutive event reports for which CP optimization is used by the UE to report periodic and trigger events; or a combination thereof.

Figure 13:
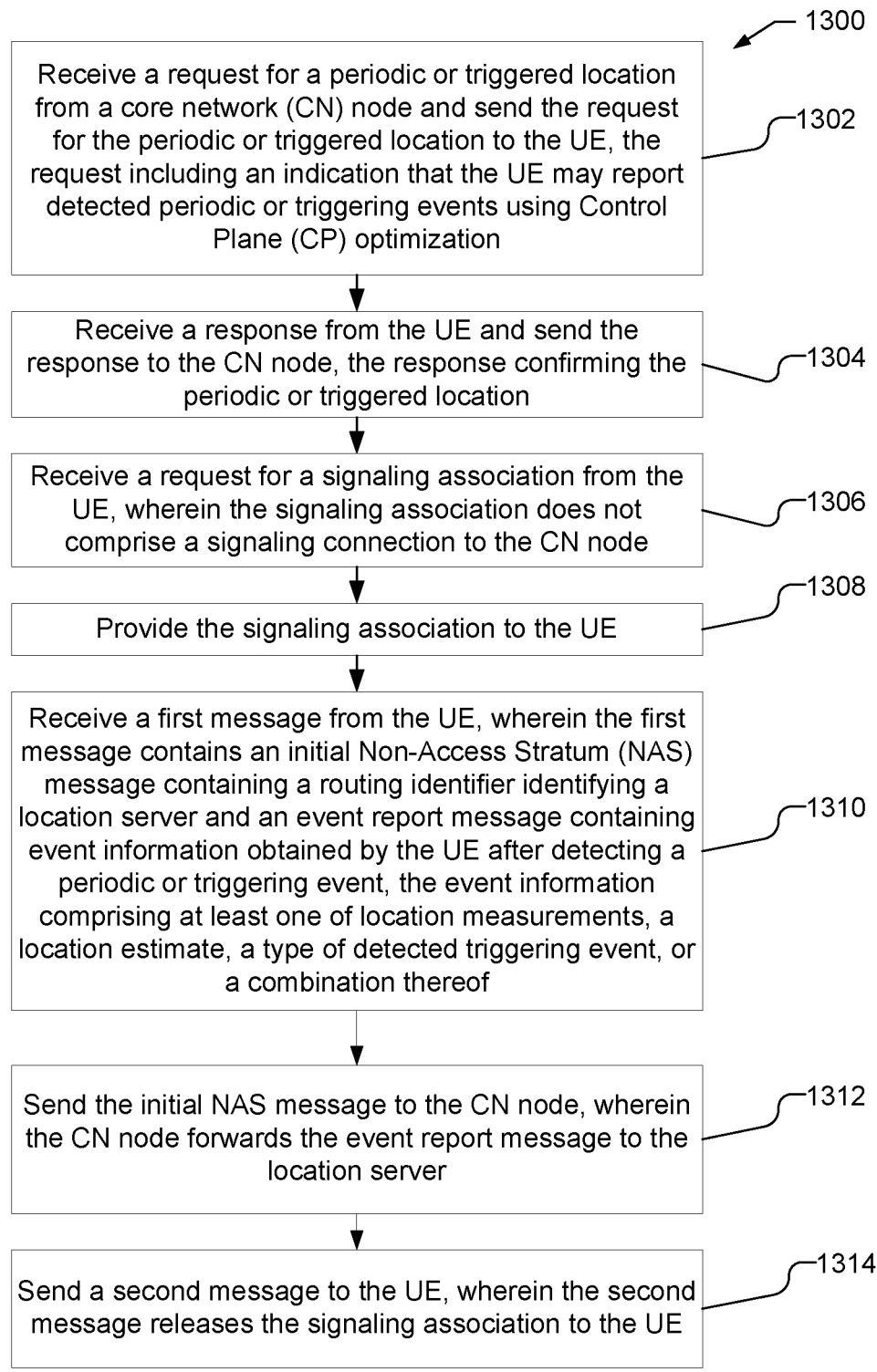
FIG. 13 shows a process flow illustrating a method for supporting low power periodic and triggered location of a user equipment performed by a Radio Access Network (RAN) node.

FIG. 13 shows a process flow 1300 illustrating a method for supporting periodic and triggered location of a user equipment (UE), such as UE 105, performed by a Radio Access Network (RAN) node, such as a New Radio (NR) Node B (e.g. a gNB 110) or a next generation evolved Node B (e.g. an ng-eNB 114). As illustrated, at block 1302, the RAN node receives a request for a periodic or triggered location (e.g. contained in a NAS Transport message) from a core network (CN) node, such as an AMF (e.g. AMF 154), and sends the request for the periodic or triggered location to the UE. Here, the request includes an indication that the UE may report detected periodic or triggering events using Control Plane (CP) optimization. For example, block 1302 may correspond to part of stage 19 in FIG. 7 or part of stage 15 in FIG. 8. At block 1304, the RAN node receives a response from the UE (e.g. contained in a NAS Transport message), and sends the response to the CN node, where the response confirms the periodic or triggered location, e.g. as at stage 20 in FIG. 7 or stage 16 in FIG. 8. The request received at block 1302 and the response received at block 1304 may be messages for a positioning protocol (e.g. LPP or NPP), messages for a supplementary services protocol, or may each comprise both types of message.

At block 1306, the RAN node receives a request for a signaling association from the UE, where the signaling association does not comprise a signaling connection to the CN node, e.g. as at stage 28 in FIG. 7 or stage 28 in FIG. 8. At block 1308, the RAN node provides the signaling association to the UE, e.g. as at stage 28 in FIG. 7 or stage 28 in FIG. 8. At block 1310, the RAN node receives a first message from the UE via the signaling association, where the first message contains an initial Non-Access Stratum (NAS) message containing a routing identifier identifying a location server (e.g. an LMF such as LMF 152) and an event report message containing event information obtained by the UE after detecting a periodic or triggering event, and where the event information comprises at least one of location measurements, a location estimate, a type of detected triggering event, or a combination thereof. For example, block 1310 may correspond to stage 29 in FIG. 7 or stage 29 in FIG. 8.

At block 1312, the RAN node sends the initial NAS message to the CN node (e.g. as at stage 31 in FIG. 7 or stage 30 in FIG. 8), and the CN node forwards the event report message to the location server (e.g. as at stage 32 in FIG. 7 or stage 31 in FIG. 8). At block 1314, the RAN node sends a second message to the UE, where the second message releases the signaling association to the UE, e.g. as at stage 30 or 37 in FIG. 7 or stage 34 or 36 in FIG. 8.

In one embodiment, the first message may be a Radio Resource Control (RRC) Early Data Request message, and the second message may be an RRC Early Data Complete message. In this embodiment, the first message may include a release assistance indication (RAI), where the RAI may comprise a request for immediate connection release or a request for early connection release, where the request for early connection release may comprise an indication that no response message is expected by the UE, or an indication that one response message is expected by the UE. The RAI may comprise the request for immediate connection release, in which case, the RAN node may send the second message to the UE in response to the request for immediate connection release, e.g. as at stage 30 in FIG. 7. In this embodiment, the method may further comprise including an Early Data Transmission session indication along with the initial NAS message sent to the CN node. In this embodiment, the RAN node may send the second message to the UE in response to receiving a request for connection release from the CN node, e.g. as at stages 36 and 37 in FIG. 7 or as at stages 33 and 34 in FIG. 8.

In another embodiment, the first message may be a Radio Resource Control (RRC) Setup Complete message or an RRC Connection Setup Complete message, and the second message may be an RRC Downlink Information Transfer message.

The event report message may comprise a message for a positioning protocol (e.g. LPP or NPP), a message for a supplementary services protocol, or both.

In one embodiment, the process may further include receiving a third message from the CN node, where the third message contains a NAS response message containing an event report acknowledgment message, and where the event report acknowledgment message is sent by the location server to the CN node in response to the event report message, e.g. as at stage 35 in FIG. 7 or stage 33 in FIG. 8. The process may then further include sending a fourth message to the UE, where the fourth message contains the NAS response message, e.g. as at stage 37 in FIG. 7 or stage 34 or stage 35 in FIG. 8. The RAN node may send the second message after the fourth message (e.g. as at stages 35 and 36 in FIG. 8) or the second message may comprise the fourth message (e.g. as at stage 37 in FIG. 7 or stage 34 in FIG. 8). The event report acknowledgment may comprise an acknowledgment of the event report message.

Figure 14:
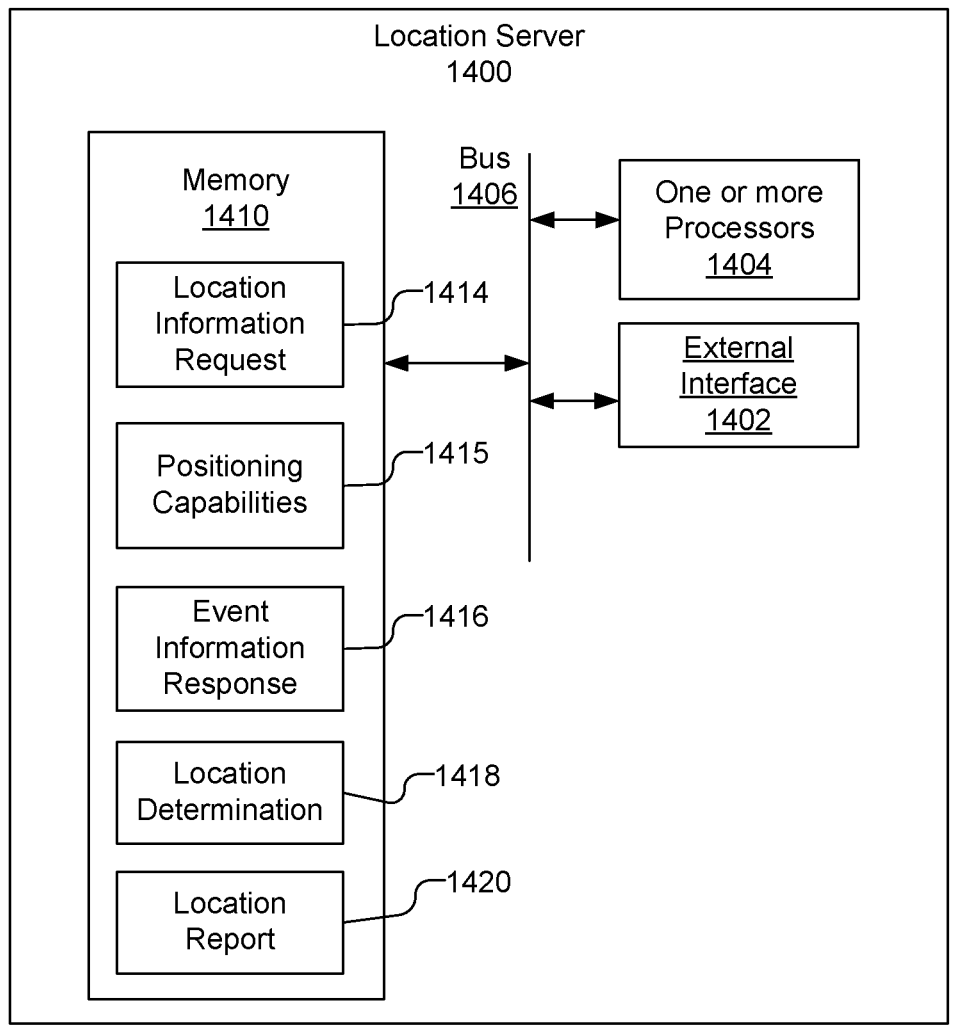
FIG. 14 is a block diagram of an embodiment of an LMF capable of supporting location services for a UE.

FIG. 14 is a diagram illustrating an example of a hardware implementation of an location server 1400, such as LMF 152 shown in FIGS. 1-9. The location server 1400 may be, e.g., part of a wireless network such as a 5G Core network (5GCN). The location server 1400 includes, e.g., hardware components such as an external interface 1402, which may be a wired or wireless interface capable of connecting to a GMLC, such as GMLC 155, VGMLC 155V or HGMLC 155H, and an AMF, such as AMF 154. The location server 1400 includes one or more processors 1404 and memory 1410, which may be coupled together with a bus 1406. The memory 1410 may store data and may contain executable code or software (or firmware) instructions that when executed by the one or more processors 1404 cause the one or more processors 1404 to operate as a special purpose computer programmed to perform the procedures and techniques disclosed herein.

As illustrated in FIG. 14, the memory 1410 includes one or more components or modules that when implemented by the one or more processors 1404 implement the methodologies described, e.g., according to FIGS. 2-9 and FIG. 11. While the components or modules are illustrated as software in memory 1410 that is executable by the one or more processors 1404, it should be understood that the components or modules may be dedicated hardware either in the processors 1404 or off processor. As illustrated, the memory 1410 may include a location information request unit 1414 that causes the one or more processors 1404 to: communicate via the external interface 1402 with at least one other entity, such as a UE (e.g. UE 105) which may be accessed via a CN node (e.g. AMF 154); send a request for a periodic or triggered location to the UE, where the request includes an indication that the UE may report detected periodic or triggering events using Control Plane (CP) optimization; and receive a response from the UE confirming the periodic or triggered location. The location information request unit 1414 may enable the one or more processors 1404 to include criteria in the request for the periodic or triggered location, wherein the criteria may comprise criteria for reporting the detected periodic or triggering events using the CP optimization. The location information request unit 1414 may further enable the one or more processors 1404 to receive via the external interface 1402 a request for the periodic or triggered location from a CN node, wherein the request for the periodic or triggered location includes an indication that the UE supports and is allowed to use CP optimization to report periodic and trigger events.

The memory 1410 may also include an event information response unit 1416, which may enable the one or more processors 1404 to receive from a core network (CN) node (e.g. an AMF 154) via the external interface 1402 an event report message and an indication of CP optimization, wherein the event report message is sent by the UE to the CN node using CP optimization, and where the event report message contains event information obtained by the UE after the UE detected a periodic or triggering event, where the event information comprises at least one of location measurements, a location estimate, a type of detected triggering event, or a combination thereof. The event information response unit 1416, may enable the one or more processors 1404 to send via the external interface 1402 an event report acknowledgment message to the CN node in response to the event report message.

The memory 1410 may further include a location determination unit 1418 that causes the one or more processors 1404 to determine location information for the UE based on, at least in part, the event information received by the event information response unit 1416. For example, the location determination unit 1418 may cause the one or more processors 1404 to determine an estimated location for the UE 105 using the received event information by using one or more position methods, such as, for example, GNSS, Assisted GNSS (A-GNSS), Advanced Forward Link Trilateration (AFLT), Observed Time Difference Of Arrival (OTDOA), WLAN or Enhanced Cell ID (ECID) or combinations thereof.

In some implementations, the memory 1410 may also include a location report unit 1420 that causes the one or more processors 1404 to send via the external interface 1402, the location information determined with location determination unit 1418 to another entity, such as a GMLC or an external client.

In some implementations, the memory 1410 may also include a positioning capabilities unit 1415 that causes the one or more processors 1404 to send via the external interface 1402 a request to the UE for positioning capabilities of the UE and to receive a response from the UE containing the positioning capabilities of the UE, e.g., where the positioning capabilities may comprise an indication that the UE supports reporting of periodic and triggering events using the request for early connection release or the request for immediate connection release or both. The location information request unit 1414 may cause the one or more processors 1404 to include the indication that the UE may report the detected periodic or triggering events using the request for early connection release or the request for immediate connection release or both in response to receiving the indication that the UE supports reporting of periodic and triggering events using the request for early connection release or the request for immediate connection release or both.

The methodologies described herein may be implemented by various means depending upon the application. For example, these methodologies may be implemented in hardware, firmware, software, or any combination thereof. For a hardware implementation, the one or more processors 1404 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1410) and executed by one or more processor units (e.g. processors 1404), causing the processor units to operate as a special purpose computer programmed to perform the techniques and procedures disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1410, and are configured to cause the one or more processors (e.g. processors 1404) to operate as a special purpose computer programmed to perform the techniques and procedures disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a location server 1400, such as the LMF 152, may include a means for sending a first request for a periodic or triggered location to the UE, the first request including a first indication that the UE may report detected periodic or triggering events using Control Plane (CP) optimization, which may be, e.g., the external interface 1402 and one or more processors 1404 with dedicated hardware or implementing executable code or software instructions in memory 1410 such as the location information request unit 1414. A means for receiving a response from the UE, the response confirming the periodic or triggered location may be, e.g., the external interface 1402 and one or more processors 1404 with dedicated hardware or implementing executable code or software instructions in memory 1410 such as the location information request unit 1414. A means for receiving from a first core network (CN) node an event report message and an indication of CP optimization, wherein the event report message is sent by the UE to the CN node, wherein the event report message contains event information obtained by the UE after the UE detected a periodic or triggering event, where the event information comprises at least one of location measurements, a location estimate, a type of detected triggering event, or a combination thereof may be, e.g., the external interface 1402 and one or more processors 1404 with dedicated hardware or implementing executable code or software instructions in memory 1410 such as the event information response unit 1416. A means for determining location information for the UE based on the event information may be, e.g., the one or more processors 1404 with dedicated hardware or implementing executable code or software instructions in memory 1410 such as the location determination unit 1418. A means for transmitting the location information for the UE to another entity may be, e.g., the external interface 1402 and one or more processors 1404 with dedicated hardware or implementing executable code or software instructions in memory 1410 such as the location report unit 1420.

The location server 1400 may further include means for sending an event report acknowledgment message to the first CN node in response to the event report message, where the event report acknowledgment message is forwarded to the UE by the first CN node, which may be, e.g., the external interface 1402 and one or more processors 1404 with dedicated hardware or implementing executable code or software instructions in memory 1410 such as the event information response unit 1416.

The location server 1400 may further include means for including in the first request for the periodic or triggered location a first indication that the UE may use CP optimization for reporting the detected periodic or triggering events, which may be, e.g., the external interface 1402 and one or more processors 1404 with dedicated hardware or implementing executable code or software instructions in memory 1410 such as the location information request unit 1414.

The location server 1400 may further include means for including criteria in the first request for the periodic or triggered location, wherein the criteria comprise criteria for reporting the detected periodic or triggering events using CP optimization, which may be, e.g., the external interface 1402 and one or more processors 1404 with dedicated hardware or implementing executable code or software instructions in memory 1410 such as the location information request unit 1414.

The location server 1400 may further include means for receiving a second request for the periodic or triggered location from a second CN node, wherein the second request for the periodic or triggered location includes a second indication that the UE supports and is allowed to use CP optimization to report periodic and trigger events, wherein the first indication is based in part on the second indication, which may be, e.g., the external interface 1402 and one or more processors 1404 with dedicated hardware or implementing executable code or software instructions in memory 1410 such as the location information request unit 1414.

Figure 15:
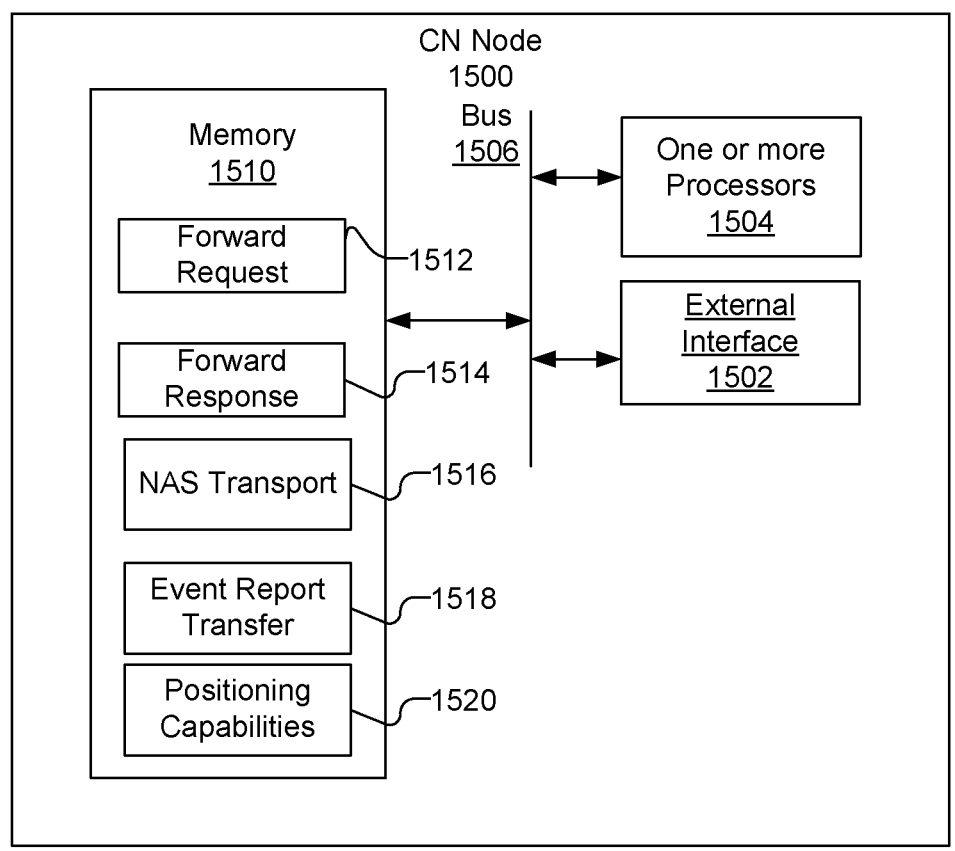
FIG. 15 is a block diagram of an embodiment of an Access and Mobility Management Function (AMF) capable of supporting location services for a UE.

FIG. 15 is a diagram illustrating an example of a hardware implementation of a Core Network (CN) node 1500, such as an AMF, e.g. AMF 154 shown in FIGS. 1-9. The CN node 1500 includes, e.g., hardware components such as an external interface 1502, which may be a wired or wireless interface capable of connecting to a location server, such as LMF 152 shown in FIGS. 1-9, and to a RAN such as RAN 112 (e.g. NG-RAN 112). The CN node 1500 includes one or more processors 1504 and memory 1510, which may be coupled together with a bus 1506. The memory 1510 may store data and may contain executable code or software (or firmware) instructions that when executed by the one or more processors 1504 cause the one or more processors 1504 to operate as a special purpose computer programmed to perform the procedures and techniques disclosed herein.

As illustrated in FIG. 15, the memory 1510 includes one or more components or modules that when implemented by the one or more processors 1504 implements the methodologies as described herein. While the components or modules are illustrated as software in memory 1510 that is executable by the one or more processors 1504, it should be understood that the components or modules may be dedicated hardware either in the processor or off processor. As illustrated, the memory 1510 may include a forward request unit 1512 that enables the one or more processors 1504 to receive via the external interface 1502 a request for a periodic or triggered location from a location server (e.g. an LMF 152) and to send the request to a UE (e.g. UE 105), where the request includes an indication that the UE may report detected periodic or triggering events using Control Plane (CP) optimization. The forward request unit 1512 may further enable the one or more processors 1504 to receive via the external interface 1502 a request for a periodic or triggered location from a gateway mobile location center (e.g., GMLC 155), and send the request for the periodic or triggered location to the location server. The periodic or triggered location sent to the location server may include positioning capabilities received from the UE.

The memory 1510 may include a forward response unit 1514 that enables the one or more processors 1504 to receive via the external interface 1502 a response from the UE and send the response to the location server, where the response confirms the periodic or triggered location. A NAS transport unit 1516 causes the one or more processors 1504 to receive via the external interface 1502 from a Radio Access Network (RAN) node (e.g. a gNB 110 or ng-eNB 114) a Non-Access Stratum (NAS) message, and where the NAS message comprises a routing identifier identifying the location server, an event report message containing event information obtained by the UE after the UE detected a periodic or triggering event and a Release Assistance Indication (RAI), wherein the RAI comprises an indication that one response message is expected by the UE, and where the event information comprises at least one of location measurements, a location estimate, a type of detected triggering event, or a combination thereof. The NAS transport unit 1516 may further cause the one or more processors 1504 to send via the external interface 1502 a NAS transport message containing a received event report acknowledgment message to the UE.

An event report transfer unit 1518 causes the one or more processors 1504 to send via the external interface 1502 the event report message and an indication of CP optimization to the location server. The event report transfer unit 1518 may further cause the one or more processors 1504 to receive via the external interface 1502 an event report acknowledgment message from the location server in response to the event report message.

A positioning capabilities unit 1520 may cause the one or more processors 1504 to receive via the external interface 1502 positioning capabilities of the UE from the UE during a registration of the UE with the CN node, wherein the positioning capabilities comprise an indication of whether the UE supports reporting of periodic and triggering events using CP optimization.

The methodologies described herein may be implemented by various means depending upon the application. For example, these methodologies may be implemented in hardware, firmware, software, or any combination thereof. For a hardware implementation, the one or more processors 1504 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1510, and are configured to cause the one or more processors to operate as a special purpose computer programmed to perform the procedures and techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a CN node 1500, such as the AMF 154, may include a means for receiving a first request for a periodic or triggered location from a location server and sending the first request for the periodic or triggered location to the UE, the first request including an indication that the UE may report detected periodic or triggering events using Control Plane (CP) optimization, which may be, e.g., the external interface 1502 and one or more processors 1504 with dedicated hardware or implementing executable code or software instructions in memory 1510, such as the forward request unit 1512. A means for receiving a response from the UE and sending the response to the location server, the response confirming the periodic or triggered location may be, e.g., the external interface 1502 and one or more processors 1504 with dedicated hardware or implementing executable code or software instructions in memory 1510, such as the forward response unit 1514. A means for receiving from a Radio Access Network (RAN) node a first Non-Access Stratum (NAS) message, wherein the first NAS message comprises a routing identifier identifying the location server, an event report message containing event information obtained by the UE after the UE detected a periodic or triggering event, and a Release Assistance Indication (RAI), wherein the RAI comprises an indication that one response message is expected by the UE, wherein the event information comprises at least one of location measurements, a location estimate, a type of detected triggering event, or a combination thereof may be, e.g., the external interface 1502 and one or more processors 1504 with dedicated hardware or implementing executable code or software instructions in memory 1510, such as the NAS transport unit 1516. A means for sending the event report message and an indication of CP optimization to the location server may be, e.g., the external interface 1502 and one or more processors 1504 with dedicated hardware or implementing executable code or software instructions in memory 1510, such as the event report transfer unit 1518.

The CN node 1500 may include means for receiving a second request for a periodic or triggered location from a gateway mobile location center, which may be, e.g., the external interface 1502 and one or more processors 1504 with dedicated hardware or implementing executable code or software instructions in memory 1510, such as the forward request unit 1512. A means for sending a third request for a periodic or triggered location to the location server, wherein the third request for a periodic or triggered location is based on the second request for a periodic or triggered location, may be, e.g., the external interface 1502 and one or more processors 1504 with dedicated hardware or implementing executable code or software instructions in memory 1510, such as the forward request unit 1512. A means for including in the third request a first indication of whether the UE supports reporting of detected periodic or triggering events using CP optimization, wherein the receiving the request for the periodic or triggered location from the location server is in response to the sending the second request for the periodic or triggered location to the location server may be may be, e.g., the external interface 1502 and one or more processors 1504 with dedicated hardware or implementing executable code or software instructions in memory 1510, such as the forward request unit 1512. The CN node may further include a means for receiving positioning capabilities of the UE from the UE during a registration of the UE with the CN node, wherein the positioning capabilities comprise a second indication of whether the UE supports reporting of periodic and triggering events using CP optimization; and including the second indication in the first indication, which may be, e.g., the external interface 1502 and one or more processors 1504 with dedicated hardware or implementing executable code or software instructions in memory 1510, such as the positioning capabilities 1520 and forward request unit 1512.

The CN node 1500 may further include a means for receiving an event report acknowledgment message from the location server in response to the event report message, which may be, e.g., the external interface 1502 and one or more processors 1504 with dedicated hardware or implementing executable code or software instructions in memory 1510, such as the event report transfer unit 1518. A means for sending a second NAS message containing the event report acknowledgment message to the UE may be, e.g., the external interface 1502 and one or more processors 1504 with dedicated hardware or implementing executable code or software instructions in memory 1510, such as the NAS transport unit 1516.

Figure 16:
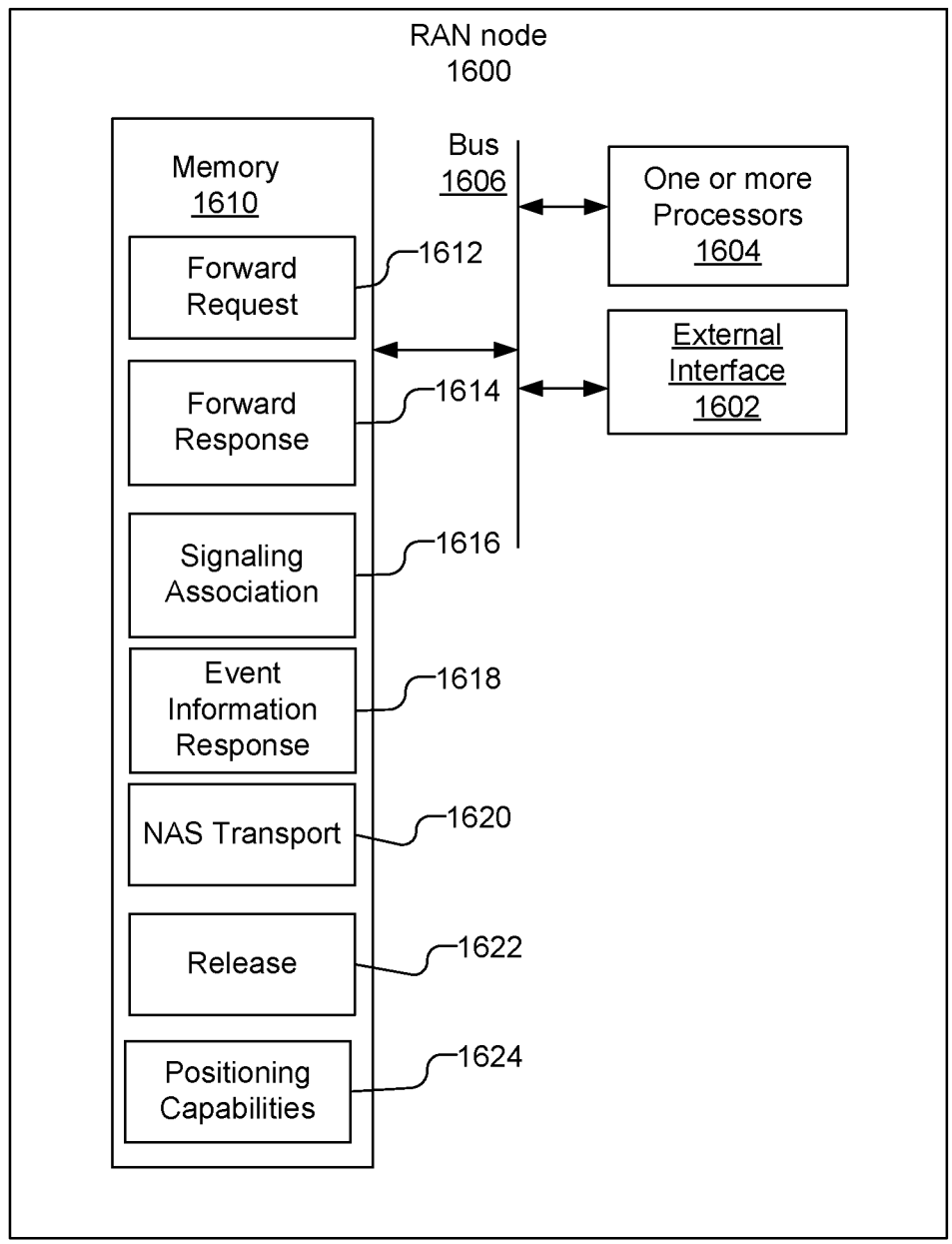
FIG. 16 is a block diagram of an embodiment of a RAN node capable of supporting location services for a UE.

FIG. 16 is a diagram illustrating an example of a hardware implementation of a RAN node 1600, such as a gNB 110 or ng-eNB 114 shown in FIGS. 1 and 2 and referred to in FIGS. 3-9. The RAN node 1600 may be, e.g., part of a wireless network, such as a 5GS, and may be, e.g., an element in RAN 112 (e.g. NG-RAN 112), which may be a New Radio (NR) Node B (gNB) or a next generation evolved Node B (ng-eNB). The RAN node 1600 includes, e.g., hardware components such as an external interface 1602, which may be a wired and/or wireless interface capable of connecting to a Core Network (CN) node, such as AMF 154, and to a UE such as UE 105. The RAN node 1600 includes one or more processors 1604 and memory 1610, which may be coupled together with a bus 1606. The memory 1610 may store data and may contain executable code or software (or firmware) instructions that when executed by the one or more processors 1604 cause the one or more processors 1604 to operate as a special purpose computer programmed to perform the procedures and techniques disclosed herein.

As illustrated in FIG. 16, the memory 1610 includes one or more components or modules that when implemented by the one or more processors 1604 implements the methodologies as described herein. While the components or modules are illustrated as software in memory 1610 that is executable by the one or more processors 1604, it should be understood that the components or modules may be dedicated hardware either in the processors 1604 or off processor. As illustrated, the memory 1610 may include a forward request unit 1612 that enables the one or more processors 1604 to receive via the external interface 1602 a request for a periodic or triggered location from a core network (CN) node and send the request for the periodic or triggered location to a UE, the request including an indication that the UE may report detected periodic or triggering events using Control Plane (CP) optimization. A forward response unit 1614 causes the one or more processors 1604 to receive via the external interface 1602 a response from the UE and send the response to the CN node, where the response confirms the periodic or triggered location.

The memory 1610 may include a signaling association unit 1616 that causes the one or more processors 1604 to receive a request for a signaling association from the UE via the external interface 1602 and to provide via the external interface 1602 a signaling association with the UE.

An event information response unit 1618 may enable the one or more processors 1604 to receive from the UE via the external interface 1602 a first message, where the first message contains an initial Non-Access Stratum (NAS) message containing a routing identifier identifying a location server and an event report message containing event information obtained by the UE after detecting a periodic or triggering event, where the event information comprises at least one of location measurements, a location estimate, a type of detected triggering event, or a combination thereof.

The event information response unit 1618 may further enable the one or more processors 1604 to receive from the CN node via the external interface 1602 a message containing a NAS Transport message containing an event report acknowledgment message.

A NAS transport unit 1620 causes the one or more processors 1604 to send via the external interface 1602 the initial NAS message to the CN node (e.g. an AMF 154), where the CN node forwards the event report message to the location server. The NAS transport unit 1620 may further cause the one or more processors 1604 to send via the external interface 1602 a NAS message containing an event report acknowledgment message to the UE.

A release unit 1622 causes the one or more processors 1604 to send via the external interface 1602 a second message to the UE, where the second message releases the signaling association to the UE.

A positioning capabilities unit 1624 may cause the one or more processors 1604 to receive via the external interface 1602 a request for positioning capabilities of the UE from the location server via the CN node and send the request for the positioning capabilities to the UE. The positioning capabilities unit 1624 may further cause the one or more processors 1604 to receive via the external interface 1602 a response from the UE comprising the positioning capabilities of the UE and to send the response to the location server via the CN node.

The methodologies described herein may be implemented by various means depending upon the application. For example, these methodologies may be implemented in hardware, firmware, software, or any combination thereof. For a hardware implementation, the one or more processors 1604 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1610, and are configured to cause the one or more processors 1604 to operate as a special purpose computer programmed to perform the procedures and techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a RAN node 1600, such as a gNB 110 or ng-eNB 114, may include a means for receiving a request for a periodic or triggered location from a core network (CN) node and sending the request for the periodic or triggered location to the UE, the request including an indication that the UE may report detected periodic or triggering events using Control Plane (CP) optimization, which may be, e.g., the external interface 1602 and one or more processors 1604 with dedicated hardware or implementing executable code or software instructions in memory 1610, such as the forward request unit 1612. A means for receiving a response from the UE and sending the response to the CN node, the response confirming the periodic or triggered location may be, e.g., the external interface 1602 and one or more processors 1604 with dedicated hardware or implementing executable code or software instructions in memory 1610, such as the forward response unit 1614. A means for receiving a request for a signaling association from the UE, wherein the signaling association does not comprise a signaling connection to a core network (CN) node may be, e.g., the external interface 1602 and one or more processors 1604 with dedicated hardware or implementing executable code or software instructions in memory 1610, such as the signaling association unit 1616. A means for providing the signaling association to the UE may be, e.g., the external interface 1602 and one or more processors 1604 with dedicated hardware or implementing executable code or software instructions in memory 1610, such as the signaling association unit 1616. A means for receiving a first message from the UE, wherein the first message contains an initial a Non-Access Stratum (NAS) message containing a routing identifier identifying a location server and an event report message containing event information obtained by the UE after detecting a periodic or triggering event, the event information comprising at least one of location measurements, a location estimate, a type of detected triggering event, or a combination thereof may be, e.g., the external interface 1602 and one or more processors 1604 with dedicated hardware or implementing executable code or software instructions in memory 1610, such as the event information response unit 1618. A means for sending the initial NAS message to the CN node, wherein the CN node forwards the event report message to the location server may be, e.g., the external interface 1602 and one or more processors 1604 with dedicated hardware or implementing executable code or software instructions in memory 1610, such as the NAS transport unit 1620. A means for sending a second message to the UE, wherein the second message releases the signaling association to the UE may be, e.g., the external interface 1602 and one or more processors 1604 with dedicated hardware or implementing executable code or software instructions in memory 1610, such as the release unit 1622.

The RAN node 1600 may further include a means for receiving a third message from the CN node, the third message containing a NAS response message containing an event report acknowledgment message, the event report acknowledgment message sent by the location server to the CN node in response to the event report message, which may be, e.g., the external interface 1602 and one or more processors 1604 with dedicated hardware or implementing executable code or software instructions in memory 1610, such as the event information response unit 1618. A means for sending a fourth message to the UE, the fourth message containing the NAS response message may be, e.g., the external interface 1602 and one or more processors 1604 with dedicated hardware or implementing executable code or software instructions in memory 1610, such as the NAS transport unit 1620.

Figure 17:
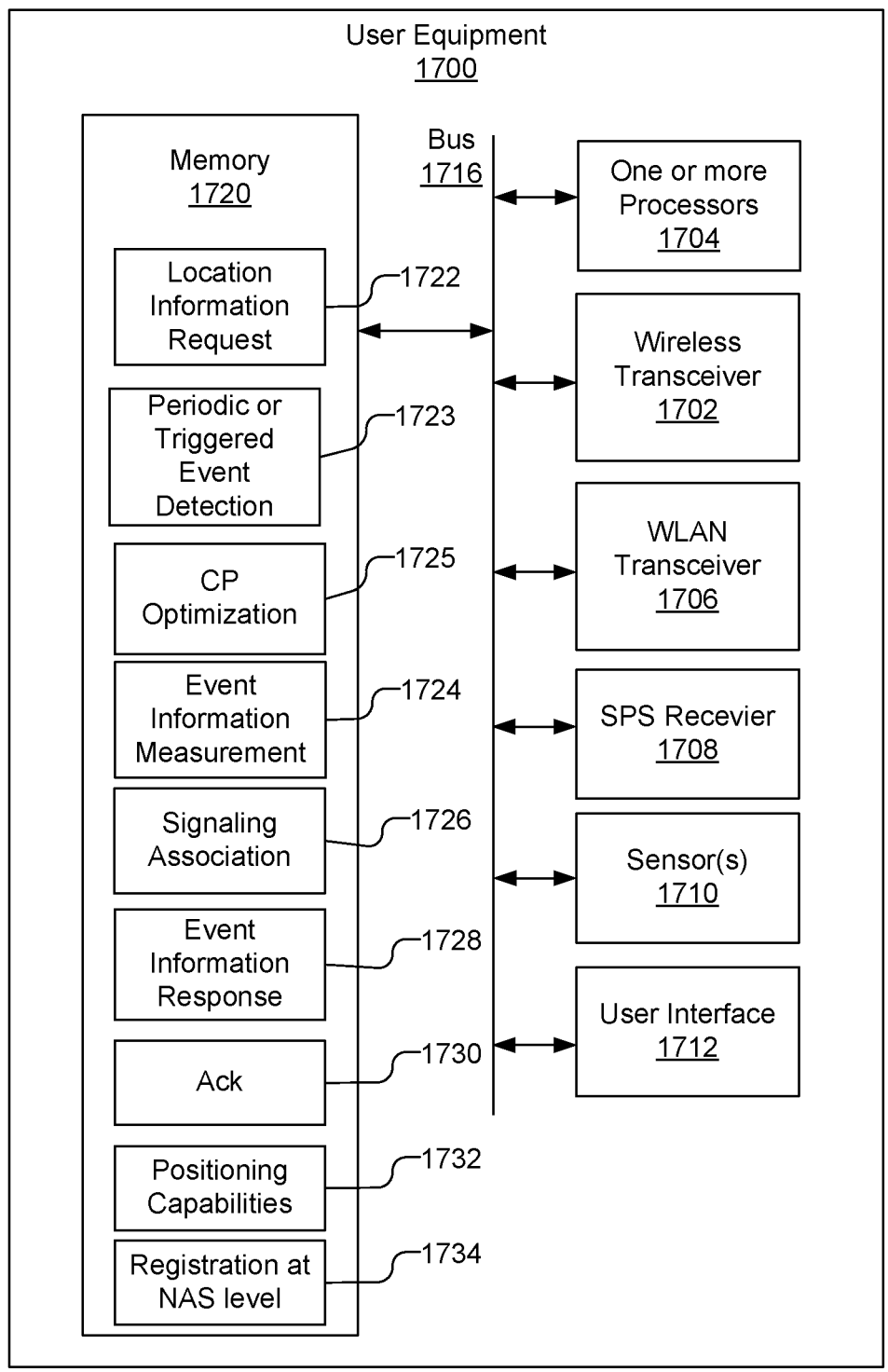
FIG. 17 is a block diagram of an embodiment of a UE capable of supporting location services for the UE.

FIG. 17 is a diagram illustrating an example of a hardware implementation of a UE 1700, such as UE 105 shown in FIGS. 1-9. The UE 1700 may include a wireless transceiver 1702 to wirelessly communicate with an NG-RAN 112, e.g., base stations such as gNB 110 or ng-eNB 114 (shown in FIGS. 1 and 2). The UE 1700 may also include additional transceivers, such a wireless local area network (WLAN) transceiver 1706, as well as an SPS receiver 1708 for receiving and measuring signals from SPS SVs 190 (shown in FIGS. 1 and 2). The UE 1700 may further include one or more sensors 1710, such as cameras, accelerometers, gyroscopes, electronic compass, magnetometer, barometer, etc. The UE 1700 may further include a user interface 1712 that may include e.g., a display, a keypad or other input device, such as virtual keypad on the display, through which a user may interface with the UE 1700. The UE 1700 further includes one or more processors 1704 and memory 1720, which may be coupled together with a bus 1716. The one or more processors 1704 and other components of the UE 1700 may similarly be coupled together with bus 1716, a separate bus, or may be directly connected together or coupled using a combination of the foregoing. The memory 1720 may store data and may contain executable code or software (or firmware) instructions that when executed by the one or more processors 1704 cause the one or more processors 1704 to operate as a special purpose computer programmed to perform the procedures and techniques disclosed herein.

As illustrated in FIG. 17, the memory 1720 may include one or more components or modules that may be implemented by the one or more processors 1704 to perform the methodologies described herein. While the components or modules are illustrated as software in memory 1720 that is executable by the one or more processors 1704, it should be understood that the components or modules may be dedicated hardware either in the one or more processors 1704 or off the processors. As illustrated, the memory 1720 may include a location information request unit 1722 that enables the one or more processors 1704 to receive via the wireless transceiver 1702 or WLAN transceiver 1706 a request for a periodic or triggered location from a location server (e.g. an LMF 152) and to send a response to the location server, where the response confirms the periodic or triggered location. The memory 1720 may include a periodic or triggered event detection unit 1723 that enables the one or more processors 1704 to detect a periodic or triggering event. The periodic or triggered event detection unit 1723 when implemented by the one or more processors 1704 configures the one or more processors 1704 to receive and monitor trigger events, as indicated by trigger parameters in the request for periodic or triggered location from the location server. The trigger parameters may include, e.g., a trigger evaluation interval, a periodic maximum reporting interval, and one or more location triggers, such as a change of location, an entry into, an exit from or a remaining within a defined geographic area, a movement by more than a threshold linear distance from a previous location, etc. The memory 1720 may include a CP optimization unit 1725 that enables the one or more processors 1704 to determine whether to report a trigger event using Control Plane (CP) optimization. The CP optimization unit 1725 may enable the one or more processors 1704 to determine to report the trigger event using CP Optimization without Early Data Transmission (EDT) or with EDT.

The memory 1720 may include an event information measurement unit 1724 that causes the one or more processors 1704 to obtain event information, such as location measurements, a location estimate, a type of detected triggering event, or a combination thereof. The memory 1720 may include a signaling association unit 1726 that causes the one or more processors 1704 to obtain a signaling connection with a RAN node, such as a gNB 110 or ng-eNB 114, via the wireless transceiver 1702. The memory 1720 may additionally include an event information response unit 1728 that causes the one or more processors 1704 to send via the wireless transceiver 1702 a first message to the RAN node, where the first message includes a release assistance indication (RAI), and a Non-Access Stratum (NAS) Transport message containing a routing identifier identifying the location server and an event report message containing the event information, where the RAN node forwards the NAS Transport message and the RAI to a core network (CN) node (e.g. an AMF 154), where the CN node forwards the event report message and the RAI to the location server. The event information response unit 1728 may further cause the one or more processors 1704 to receive, via the wireless transceiver 1702 or WLAN transceiver 1706, a message from the RAN node containing a NAS Transport message containing an event report acknowledgment message. An acknowledgement unit 1730 enables the one or more processors 1704 to receive via the wireless transceiver 1702 a second message from the RAN node that contains a NAS response message, wherein the NAS response message contains an event report acknowledgment message.

The memory 1720 may include a positioning capabilities unit 1732 that causes the one or more processors 1704 to receive via the wireless transceiver 1702 or WLAN transceiver 1706 a request from the location server for positioning capabilities of the UE. The positioning capabilities unit 1732 may further cause the one or more processors 1704 to send via the wireless transceiver 1702 or WLAN transceiver 1706 a response to the location server comprising the positioning capabilities of the UE.

The memory 1720 may include a registration at NAS level unit 1734 that causes the one or more processors 1704 to use the wireless transceiver 1702 to register with the AMF 154 including, as part of negotiating 5G network behavior to send a NAS Registration Request that indicates whether CP Optimization is supported for location event reporting.

The methodologies described herein may be implemented by various means depending upon the application. For example, these methodologies may be implemented in hardware, firmware, software, or any combination thereof. For a hardware implementation, the one or more processors 1704 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 1700 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1720) and executed by one or more processors 1704, causing the one or more processors 1704 to operate as a special purpose computer programmed to perform the techniques disclosed herein. Memory may be implemented within the one or processors 1704 or external to the one or more processors 1704. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 1700 may be stored as one or more instructions or code on a non-transitory computer-readable storage medium such as memory 1720. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 1700 may be provided as signals on transmission media included in a communication apparatus. For example, a communication apparatus comprising part or all of UE 1700 may include a transceiver having signals indicative of instructions and data. The instructions and data are stored on non-transitory computer readable media, e.g., memory 1720, and are configured to cause the one or more processors 1704 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, the UE 1700 may include a means for receiving a request for a periodic or triggered location from a location server in a wireless network, which may be, e.g., one of wireless transceiver 1702 or WLAN transceiver 1706 and one or more processors 1704 with dedicated hardware or implementing executable code or software instructions in memory 1720, such as the location information request unit 1722. A means for sending a response to the location server, the response confirming the periodic or triggered location may be, e.g., one of wireless transceiver 1702 or WLAN transceiver 1706 and one or more processors 1704 with dedicated hardware or implementing executable code or software instructions in memory 1720, such as the location information request unit 1722. A means for detecting a periodic or triggering event may be, e.g., one of wireless transceiver 1702 or WLAN transceiver 1706, SPS receiver 1708, sensors 1710 and one or more processors 1704 with dedicated hardware or implementing executable code or software instructions in memory 1720, such as the periodic or triggered event detection unit 1723. A means for determining whether to report a trigger event using Control Plane (CP) optimization may be, e.g., one or more processors 1704 with dedicated hardware or implementing executable code or software instructions in memory 1720, such as the CP optimization unit 1725. A means for obtaining event information, the event information comprising at least one of location measurements, a location estimate, a type of detected triggering event, or a combination thereof may be, e.g., one of wireless transceiver 1702, WLAN transceiver 1706, SPS receiver 1708 or sensors 1710 and one or more processors 1704 with dedicated hardware or implementing executable code or software instructions in memory 1720, such as the event information measurement unit 1724. A means for obtaining a signaling association with a Radio Access Network (RAN) node in the wireless network, wherein the signaling association does not include a signaling connection to a core network (CN) node may be, e.g., wireless transceiver 1702 and one or more processors 1704 with dedicated hardware or implementing executable code or software instructions in memory 1720, such as the signaling association unit 1726. A means for transmitting a first message to the RAN node, wherein the first message is a Radio Resource Control (RRC) message and includes an initial Non-Access Stratum (NAS) message, wherein the initial NAS message contains a routing identifier identifying the location server and an event report message containing the event information, wherein the RAN node forwards the initial NAS message to the CN node, wherein the CN node forwards the event report message to the location server may be, e.g., wireless transceiver 1702 and one or more processors 1704 with dedicated hardware or implementing executable code or software instructions in memory 1720, such as the event information response unit 1728. A means for receiving a second message from the RAN node, wherein the second message includes a NAS response message, wherein the NAS response message contains an event report acknowledgment message may be, e.g., one of wireless transceiver 1702 and one or more processors 1704 with dedicated hardware or implementing executable code or software instructions in memory 1720, such as the acknowledgement unit 1730.

The UE 1700 may further include a means for including a NAS release assistance indication (RAI) in the initial NAS message, wherein the CN node forwards the event report message and an indication of CP optimization to the location server, which may be, e.g., the wireless transceiver 1702 and one or more processors 1704 with dedicated hardware or implementing executable code or software instructions in memory 1720, such as the event information response unit 1728.

The UE 1700 may further include a means for determining to report the trigger event using CP Optimization without Early Data Transmission (EDT), which may be, e.g., the one or more processors 1704 with dedicated hardware or implementing executable code or software instructions in memory 1720, such as the CP optimization unit 1725.

The UE 1700 may further include a means for determining to report the trigger event using CP Optimization with Early Data Transmission (EDT), which may be, e.g., the one or more processors 1704 with dedicated hardware or implementing executable code or software instructions in memory 1720, such as the CP optimization unit 1725.

The UE 1700 may further include a means for sending a NAS Registration Request message to a CN node in the wireless network and including in the NAS Registration Request message a second indication as to whether CP Optimization is supported by the UE for location event reporting, which may be, e.g., one of wireless transceiver 1702 and one or more processors 1704 with dedicated hardware or implementing executable code or software instructions in memory 1720, such as the registration at NAS level unit 1734.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

One implementation (1) may be a method for supporting periodic and triggered location of a user equipment (UE) performed by a location server, the method comprising: sending a first request for a periodic or triggered location to the UE, the first request including a first indication that the UE may report detected periodic or triggering events using Control Plane (CP) optimization; receiving a response from the UE, the response confirming the periodic or triggered location; receiving from a first core network (CN) node an event report message and an indication of CP optimization, wherein the event report message is sent by the UE to the CN node using CP optimization, wherein the event report message contains event information obtained by the UE after the UE detected a periodic or triggering event, wherein the event information comprises at least one of location measurements, a location estimate, a type of detected triggering event, or a combination thereof; determining location information for the UE based on the event information; and transmitting the location information for the UE to another entity.

There may be some implementations (2) of the above-described method (1) wherein the event report message comprises a message for a positioning protocol, a message for a supplementary services protocol, or both messages.

There may be some implementations (3) of the above-described method (1) wherein the first CN node is an Access and Mobility Management Function (AMF), wherein the location server is a Location Management Function (LMF).

There may be some implementations (4) of the above-described method (1) further comprising: sending an event report acknowledgment message to the first CN node in response to the event report message, wherein the event report acknowledgment message is forwarded to the UE by the first CN node.

There may be some implementations (5) of the above-described method (4) wherein the event report acknowledgment message comprises an acknowledgment of the event report message.

There may be some implementations (6) of the above-described method (1) further comprising including in the first request for the periodic or triggered location a first indication that the UE may use CP optimization for reporting the detected periodic or triggering events.

There may be some implementations (7) of the above-described method (6) further comprising including criteria in the first request for the periodic or triggered location, wherein the criteria comprise criteria for reporting the detected periodic or triggering events using CP optimization.

There may be some implementations (8) of the above-described method (7) wherein the criteria comprise at least one of the following: use of CP optimization for reporting is allowed or required when the UE is idle; use of CP optimization for reporting is not allowed following a threshold time period for which CP optimization is used to report periodic and trigger events; use of CP optimization for reporting is not allowed following a threshold number of consecutive event reports for which CP optimization is used to report periodic and trigger events; or a combination thereof.

There may be some implementations (9) of the above-described method (6) further comprising: receiving a second request for the periodic or triggered location from a second CN node, wherein the second request for the periodic or triggered location includes a second indication that the UE supports and is allowed to use CP optimization to report periodic and trigger events, wherein the first indication is based in part on the second indication.

One implementation (10) may be a location server for supporting periodic and triggered location of a user equipment (UE) comprising: an external interface configured to communicate with a wireless network; and at least one processor coupled to the external interface and configured to send via the external interface a first request for a periodic or triggered location to the UE, the first request including a first indication that the UE may report detected periodic or triggering events using Control Plane (CP) optimization; receive via the external interface a response from the UE, the response confirming the periodic or triggered location; receive via the external interface from a first core network (CN) node an event report message and an indication of CP optimization, wherein the event report message is sent by the UE to the CN node using CP optimization, wherein the event report message contains event information obtained by the UE after the UE detected a periodic or triggering event, wherein the event information comprises at least one of location measurements, a location estimate, a type of detected triggering event, or a combination thereof; determine location information for the UE based on the event information; and transmit via the external interface the location information for the UE to another entity.

There may be some implementations (11) of the above-described location server (10) wherein the event report message comprises a message for a positioning protocol, a message for a supplementary services protocol, or both messages.

There may be some implementations (12) of the above-described location server (10) wherein the first CN node is an Access and Mobility Management Function (AMF), wherein the location server is a Location Management Function (LMF).

There may be some implementations (13) of the above-described location server (10) wherein the at least one processor is further configured to: send via the external interface an event report acknowledgment message to the first CN node in response to the event report message, wherein the event report acknowledgment message is forwarded to the UE by the first CN node.

There may be some implementations (14) of the above-described location server (13) wherein the event report acknowledgment message comprises an acknowledgment of the event report message.

There may be some implementations (15) of the above-described location server (10) wherein the at least one processor is further configured to include in the first request for the periodic or triggered location a first indication that the UE may use CP optimization for reporting the detected periodic or triggering events.

There may be some implementations (16) of the above-described location server (15) wherein the at least one processor is further configured to include criteria in the first request for the periodic or triggered location, wherein the criteria comprise criteria for reporting the detected periodic or triggering events using CP optimization.

There may be some implementations (17) of the above-described location server (16) wherein the criteria comprise at least one of the following: use of CP optimization for reporting is allowed or required when the UE is idle; use of CP optimization for reporting is not allowed following a threshold time period for which CP optimization is used to report periodic and trigger events; use of CP optimization for reporting is not allowed following a threshold number of consecutive event reports for which CP optimization is used to report periodic and trigger events; or a combination thereof.

There may be some implementations (18) of the above-described location server (15) wherein the at least one processor is further configured to receive a second request for the periodic or triggered location from a second CN node, wherein the second request for the periodic or triggered location includes a second indication that the UE supports and is allowed to use CP optimization to report periodic and trigger events, wherein the first indication is based in part on the second indication.

One implementation (19) may be a method for supporting periodic and triggered location of a user equipment (UE) performed by a core network (CN) node, the method comprising: receiving a first request for a periodic or triggered location from a location server and sending the first request for the periodic or triggered location to the UE, the first request including an indication that the UE may report detected periodic or triggering events using Control Plane (CP) optimization; receiving a response from the UE and sending the response to the location server, the response confirming the periodic or triggered location; receiving from a Radio Access Network (RAN) node a first Non-Access Stratum (NAS) message, wherein the first NAS message comprises a routing identifier identifying the location server, an event report message containing event information obtained by the UE after the UE detected a periodic or triggering event, and a Release Assistance Indication (RAI), wherein the RAI comprises an indication that one response message is expected by the UE, wherein the event information comprises at least one of location measurements, a location estimate, a type of detected triggering event, or a combination thereof; and sending the event report message and an indication of CP optimization to the location server.

There may be some implementations (20) of the above-described method (19) wherein the event report message comprises a message for a positioning protocol, a message for a supplementary services protocol, or both.

There may be some implementations (21) of the above-described method (19) further comprising: receiving a second request for a periodic or triggered location from a gateway mobile location center; sending a third request for a periodic or triggered location to the location server, wherein the third request for a periodic or triggered location is based on the second request for a periodic or triggered location; and including in the third request a first indication of whether the UE supports reporting of detected periodic or triggering events using CP optimization, wherein the receiving the first request for the periodic or triggered location from the location server is in response to the sending the third request for the periodic or triggered location to the location server.

There may be some implementations (22) of the above-described method (21) further comprising: receiving positioning capabilities of the UE from the UE during a registration of the UE with the CN node, wherein the positioning capabilities comprise a second indication of whether the UE supports reporting of periodic and triggering events using CP optimization; and including the second indication in the first indication.

There may be some implementations (23) of the above-described method (19) wherein the RAN node is a New Radio (NR) Node B (gNB) or a next generation evolved Node B (ng-eNB), wherein the CN node is an Access and Mobility Management Function (AMF), wherein the location server is a Location Management Function (LMF).

There may be some implementations (24) of the above-described method (19) further comprising: receiving an event report acknowledgment message from the location server in response to the event report message; and sending a second NAS message containing the event report acknowledgment message to the UE.

There may be some implementations (25) of the above-described method (24) wherein the event report acknowledgment message comprises an acknowledgment of the event report message.

There may be some implementations (26) of the above-describe method (24) wherein the first NAS message is a NAS Control Plane Service Request message or an Uplink NAS Transport message, wherein the second NAS message is a NAS Service Accept message or a Downlink NAS Transport message. There may be some implementations (9) of the above-described method (1) wherein the first request for the periodic or triggered location includes criteria for reporting the detected periodic or triggering events using CP optimization.

There may be some implementations (27) of the above-described method (19) wherein the criteria comprises at least one of the following: use of CP optimization for reporting is allowed or required when the UE is idle; use of CP optimization for reporting is not allowed following a threshold time period for which CP optimization is used to report periodic and trigger events; use of CP optimization for reporting is not allowed following a threshold number of consecutive event reports for which CP optimization is used to report periodic and trigger events; or a combination thereof.

One implementation (28) may be a core network (CN) node for supporting periodic and triggered location of a user equipment (UE) performed comprising: an external interface configured to communicate with a wireless network; and at least one processor coupled to the external interface and configured to receive via the external interface a first request for a periodic or triggered location from a location server and sending the first request for the periodic or triggered location to the UE, the first request including an indication that the UE may report detected periodic or triggering events using Control Plane (CP) optimization; receive via the external interface a response from the UE and sending the response to the location server, the response confirming the periodic or triggered location; receive via the external interface from a Radio Access Network (RAN) node a first Non-Access Stratum (NAS) message, wherein the first NAS message comprises a routing identifier identifying the location server, an event report message containing event information obtained by the UE after the UE detected a periodic or triggering event, and a Release Assistance Indication (RAI), wherein the RAI comprises an indication that one response message is expected by the UE, wherein the event information comprises at least one of location measurements, a location estimate, a type of detected triggering event, or a combination thereof; and send via the external interface the event report message and an indication of CP optimization to the location server.

There may be some implementations (29) of the above-described CN node (28) wherein the event report message comprises a message for a positioning protocol, a message for a supplementary services protocol, or both.

There may be some implementations (30) of the above-described CN node (28) wherein the at least one processor is further configured to: receive via the external interface a second request for a periodic or triggered location from a gateway mobile location center; send via the external interface a third request for a periodic or triggered location to the location server, wherein the third request for a periodic or triggered location is based on the second request for a periodic or triggered location; and include in the third request a first indication of whether the UE supports reporting of detected periodic or triggering events using CP optimization, wherein the receiving the first request for the periodic or triggered location from the location server is in response to the sending the third request for the periodic or triggered location to the location server.

There may be some implementations (31) of the above-described CN node (30) wherein the at least one processor is further configured to: receive via the external interface positioning capabilities of the UE from the UE during a registration of the UE with the CN node, wherein the positioning capabilities comprise a second indication of whether the UE supports reporting of periodic and triggering events using CP optimization; and include the second indication in the first indication.

There may be some implementations (32) of the above-described CN node (28) wherein the RAN node is a New Radio (NR) Node B (gNB) or a next generation evolved Node B (ng-eNB, wherein the CN node is an Access and Mobility Management Function (AMF), wherein the location server is a Location Management Function (LMF).

There may be some implementations (33) of the above-described CN node (28) wherein the at least one processor is further configured to: receive via the external interface an event report acknowledgment message from the location server in response to the event report message; and send via the external interface a second NAS message containing the event report acknowledgment message to the UE.

There may be some implementations (34) of the above-described CN node (33) wherein the event report acknowledgment message comprises an acknowledgment of the event report message.

There may be some implementations (35) of the above-described CN node (33) wherein the first NAS message is a NAS Control Plane Service Request message or an Uplink NAS Transport message, wherein the second NAS message is a NAS Service Accept message or a Downlink NAS Transport message.

There may be some implementations (36) of the above-described CN Node (28) wherein the first request for the periodic or triggered location includes criteria for reporting the detected periodic or triggering events using CP optimization.

There may be some implementations (37) of the above-described CN Node (36) wherein the criteria comprises at least one of the following: use of CP optimization for reporting is allowed or required when the UE is idle; use of CP optimization for reporting is not allowed following a threshold time period for which CP optimization is used to report periodic and trigger events; use of CP optimization for reporting is not allowed following a threshold number of consecutive event reports for which CP optimization is used to report periodic and trigger events; or a combination thereof.

One implementation (38) may be a method for supporting periodic and triggered location of a user equipment (UE) performed by a Radio Access Network (RAN) node, the method comprising: receiving a request for a periodic or triggered location from a core network (CN) node and sending the request for the periodic or triggered location to the UE, the request including an indication that the UE may report detected periodic or triggering events using Control Plane (CP) optimization; receiving a response from the UE and sending the response to the CN node, the response confirming the periodic or triggered location; receiving a request for a signaling association from the UE, wherein the signaling association does not comprise a signaling connection to the CN node; providing the signaling association to the UE; receiving a first message from the UE, wherein the first message contains an initial Non-Access Stratum (NAS) message containing a routing identifier identifying a location server and an event report message containing event information obtained by the UE after detecting a periodic or triggering event, the event information comprising at least one of location measurements, a location estimate, a type of detected triggering event, or a combination thereof; sending the initial NAS message to the CN node, wherein the CN node forwards the event report message to the location server; and sending a second message to the UE, wherein the second message releases the signaling association to the UE.

There may be some implementations (39) of the above-described method (38) wherein the event report message comprises a message for a positioning protocol, a message for a supplementary services protocol or both.

There may be some implementations (40) of the above-described method (38) wherein the RAN node is a New Radio (NR) Node B (gNB) or a next generation evolved Node B (ng-eNB), wherein the CN node is an Access and Mobility Management Function (AMF), wherein the location server is a Location Management Function (LMF).

There may be some implementations (41) of the above-described method (40) wherein the first message is a Radio Resource Control (RRC) Early Data Request message, wherein the second message is an RRC Early Data Complete message.

There may be some implementations (42) of the above-described method (40) wherein the first message is a Radio Resource Control (RRC) Setup Complete message or an RRC Connection Setup Complete message, wherein the second message is an RRC Downlink Information Transfer message.

There may be some implementations (43) of the above-described method (41) wherein the first message includes a release assistance indication (RAI), wherein the RAI comprises a request for immediate connection release or a request for early connection release, wherein the request for early connection release comprises an indication that no response message from the location server is expected by the UE, or an indication that one response message from the location server is expected by the UE.

There may be some implementations (44) of the above-described method (41) further comprising including an Early Data Transmission Session indication along with the initial NAS message sent to the CN node.

There may be some implementations (45) of the above-described method (43) wherein the RAI comprises the request for immediate connection release, wherein the RAN node sends the second message to the UE in response to the request for immediate connection release.

There may be some implementations (46) of the above-described method (41) wherein the RAN node sends the second message to the UE in response to receiving a request for connection release from the CN node.

There may be some implementations (47) of the above-described method (38) further comprising: receiving a third message from the CN node, the third message containing a NAS response message containing an event report acknowledgment message, the event report acknowledgment message sent by the location server to the CN node in response to the event report message; and sending a fourth message to the UE, the fourth message containing the NAS response message.

There may be some implementations (48) of the above-described method (47) wherein the RAN node sends the second message after the fourth message or wherein the second message comprises the fourth message.

There may be some implementations (49) of the above-described method (47) wherein the event report acknowledgment message comprises an acknowledgment of the event report message.

One implementation (50) may be a Radio Access Network (RAN) node for supporting periodic and triggered location of a user equipment (UE) comprising: an external interface configured to communicate with a wireless network; and at least one processor coupled to the external interface and configured to receive via the external interface a request for a periodic or triggered location from a core network (CN) node and sending the request for the periodic or triggered location to the UE, the request including an indication that the UE may report detected periodic or triggering events using Control Plane (CP) optimization; receive a response from the UE and sending the response to the CN node, the response confirming the periodic or triggered location; receive a request for a signaling association from the UE, wherein the signaling association does not comprise a signaling connection to the CN node; provide via the external interface the signaling association to the UE; receive via the external interface a first message from the UE, wherein the first message contains an initial Non-Access Stratum (NAS) message containing a routing identifier identifying a location server and an event report message containing event information obtained by the UE after detecting a periodic or triggering event, the event information comprising at least one of location measurements, a location estimate, a type of detected triggering event, or a combination thereof; send via the external interface the initial NAS message to the CN node, wherein the CN node forwards the event report message to the location server; and send via the external interface a second message to the UE, wherein the second message releases the signaling association to the UE There may be some implementations (51) of the above-described RAN node (50) wherein the event report message comprises a message for a positioning protocol, a message for a supplementary services protocol or both.

There may be some implementations (52) of the above-described RAN node (50) wherein the RAN node is a New Radio (NR) Node B (gNB) or a next generation evolved Node B (ng-eNB), wherein the CN node is an Access and Mobility Management Function (AMF), wherein the location server is a Location Management Function (LMF).

There may be some implementations (53) of the above-described RAN node (52) wherein the first message is a Radio Resource Control (RRC) Early Data Request message, wherein the second message is an RRC Early Data Complete message.

There may be some implementations (54) of the above-described RAN node (52) wherein the first message is a Radio Resource Control (RRC) Setup Complete message or an RRC Connection Setup Complete message, wherein the second message is an RRC Downlink Information Transfer message.

There may be some implementations (55) of the above-described RAN node (43) wherein the first message includes a release assistance indication (RAI), wherein the RAI comprises a request for immediate connection release or a request for early connection release, wherein the request for early connection release comprises an indication that no response message from the location server is expected by the UE, or an indication that one response message from the location server is expected by the UE.

There may be some implementations (56) of the above-described RAN node (53) wherein the at least one processor is further configured to include an Early Data Transmission Session indication along with the initial NAS message sent to the CN node.

There may be some implementations (57) of the above-described RAN node (55) wherein the RAI comprises the request for immediate connection release, wherein the RAN node sends the second message to the UE in response to the request for immediate connection release.

There may be some implementations (58) of the above-described RAN Node (53), wherein the RAN node sends the second message to the UE in response to receiving a request for connection release from the CN node.

There may be some implementations (59) of the above-described RAN Node (50), wherein the at least one processor is further to: receive via the external interface a third message from the CN node, the third message containing a NAS response message containing an event report acknowledgment message, the event report acknowledgment message sent by the location server to the CN node in response to the event report message; and send via the external interface a fourth message to the UE, the fourth message containing the NAS response message.

There may be some implementations (60) of the above-described RAN Node (59) wherein the RAN node sends the second message after the fourth message or wherein the second message comprises the fourth message.

There may be some implementations (61) of the above-described RAN Node (59) wherein the event report acknowledgment message comprises an acknowledgment of the event report message.

Therefore, it is intended that claimed subject matter not be limited to the particular examples disclosed, but that such claimed subject matter may also include all aspects falling within the scope of appended claims, and equivalents thereof.

What is claimed is:

1. A method for supporting periodic and triggered location of a user equipment (UE) in a wireless network performed by the UE, the method comprising:
   receiving a request for a periodic or triggered location from a location server in the wireless network;
   sending a response to the location server, the response confirming the periodic or triggered location;
   detecting a periodic or triggering event;
   determining whether to report the periodic or triggering trigger event using Control Plane (CP) Optimization;
   obtaining event information, the event information comprising at least one of location measurements, a location estimate, a type of detected triggering event, or a combination thereof;
   obtaining a signaling association with a Radio Access Network (RAN) node in the wireless network, wherein the signaling association does not include a signaling connection to a core network (CN) node;
   transmitting a first message to the RAN node, wherein the first message is a Radio Resource Control (RRC) message and includes an initial Non-Access Stratum (NAS) message, wherein the initial NAS message contains a routing identifier identifying the location server and an event report message containing the event information, wherein the RAN node forwards the initial NAS message to the CN node, wherein the CN node forwards the event report message to the location server; and
   receiving a second message from the RAN node, wherein the second message includes a NAS response message, wherein the NAS response message contains an event report acknowledgment message.

2. The method of claim 1, further comprising including a NAS release assistance indication (RAI) in the initial NAS message, wherein the CN node forwards the event report message and an indication of CP optimization to the location server.

3. The method of claim 2, wherein the NAS RAI indicates a single response is expected.

4. The method of claim 1, wherein the event report message comprises a message for a positioning protocol, a message for a supplementary services protocol, or both messages.

5. The method of claim 1, wherein the wireless network is Fifth Generation System (5GS), wherein the RAN node is a New Radio (NR) Node B (gNB) or a next generation evolved Node B (ng-eNB), wherein the CN node is an Access and Mobility Management Function (AMF), wherein the location server is a Location Management Function (LMF).

6. The method of claim 5, wherein the initial NAS message is a NAS Control Plane Service Request message or an Uplink NAS Transport message, wherein the NAS response message is a NAS Service Accept message or a Downlink NAS Transport message.

7. The method of claim 5, wherein determining whether to report the periodic or triggering event using CP Optimization comprises determining to report the periodic or triggering event using CP Optimization without Early Data Transmission (EDT), wherein the signaling association with the RAN node comprises an RRC signaling connection to the RAN node.

8. The method of claim 7, wherein the first message is an RRC Setup Complete message or an RRC Connection Setup Complete message.

9. The method of claim 7, wherein the second message is an RRC Downlink Information Transfer message.

10. The method of claim 5, wherein determining whether to report the periodic or triggering event using CP Optimization comprises determining to report the periodic or triggering event using CP Optimization with Early Data Transmission (EDT), wherein the first message is an RRC Early Data Request message, wherein the second message is an RRC Early Data Complete message.

11. The method of claim 10, wherein the first message is transmitted using a Common Control Channel (CCCH), wherein the second message is received using a CCCH.

12. The method of claim 1, wherein the event report acknowledgment message comprises an acknowledgment of the event report message.

13. The method of claim 1, wherein the request for the periodic or triggered location includes a first indication as to whether the UE may report the detected periodic or triggering event using CP optimization.

14. The method of claim 13, further comprising:
sending a NAS Registration Request message to a CN node in the wireless network; and
including in the NAS Registration Request message a second indication as to whether CP Optimization is supported by the UE for location event reporting, wherein the first indication is based in part on the second indication.

15. The method of claim 13, wherein the request for the periodic or triggered location includes criteria for reporting the detected periodic or triggering event using CP optimization.

16. The method of claim 15, wherein the criteria comprise at least one of the following:
use of CP optimization for reporting is allowed or required when the UE is idle;
use of CP optimization for reporting is not allowed following a threshold time period for which CP optimization for reporting is used to report periodic and trigger events;
use of CP optimization for reporting is not allowed following a threshold number of consecutive event reports for which CP optimization is used to report periodic and trigger events; or
a combination thereof.

17. A user equipment (UE) in a wireless network capable of supporting periodic and triggered location, the UE comprising:
at least one wireless transceiver configured to wirelessly communicate with entities in the wireless network;
at least one memory; and
at least one processor coupled to the at least one wireless transceiver and the at least one memory and configured to:
receive via the at least one wireless transceiver a request for a periodic or triggered location from a location server in the wireless network;
send via the at least one wireless transceiver a response to the location server, the response confirming the periodic or triggered location;
detect a periodic or triggering event;
determine whether to report a trigger event using Control Plane (CP) Optimization;
obtain event information, the event information comprising at least one of location measurements, a location estimate, a type of detected triggering event, or a combination thereof;
obtain a signaling association with a Radio Access Network (RAN) node in the wireless network, wherein the signaling association does not include a signaling connection to a core network (CN) node;
transmit via the at least one wireless transceiver a first message to the RAN node, wherein the first message is a Radio Resource Control (RRC) message and includes an initial Non-Access Stratum (NAS) message, wherein the initial NAS message contains a routing identifier identifying the location server and an event report message containing the event information, wherein the RAN node forwards the initial NAS message to the CN node, wherein the CN node forwards the event report message to the location server; and
receive via the at least one wireless transceiver a second message from the RAN node, wherein the second message includes a NAS response message, wherein the NAS response message contains an event report acknowledgment message.

18. The UE of claim 17, wherein the at least one processor is further configured to include a NAS release assistance indication (RAI) in the initial NAS message, wherein the CN node forwards the event report message and an indication of CP optimization to the location server.

19. The UE of claim 18, wherein the NAS RAI indicates a single response is expected.

20. The UE of claim 17, wherein the event report message comprises a message for a positioning protocol, a message for a supplementary services protocol, or both messages.

21. The UE of claim 17, wherein the wireless network is Fifth Generation System (5GS), wherein the RAN node is a New Radio (NR) Node B (gNB) or a next generation evolved Node B (ng-eNB), wherein the CN node is an Access and Mobility Management Function (AMF), wherein the location server is a Location Management Function (LMF).

22. The UE of claim 21, wherein the initial NAS message is a NAS Control Plane Service Request message or an Uplink NAS Transport message, wherein the NAS response message is a NAS Service Accept message or a Downlink NAS Transport message.

23. The UE of claim 21, wherein the at least one processor is configured to determine whether to report the trigger event using CP Optimization by being configured to determine to report the trigger event using CP Optimization without Early Data Transmission (EDT), wherein the signaling association with the RAN node comprises an RRC signaling connection to the RAN node.

24. The UE of claim 23, wherein the first message is an RRC Setup Complete message or an RRC Connection Setup Complete message.

25. The UE of claim 23, wherein the second message is an RRC Downlink Information Transfer message.

26. The UE of claim 21, wherein the at least one processor is configured to determine whether to report the trigger event using CP Optimization by being configured to determine to report the trigger event using CP Optimization with Early Data Transmission (EDT), wherein the first message is an RRC Early Data Request message, wherein the second message is an RRC Early Data Complete message.

27. The UE of claim 26, wherein the first message is transmitted using a Common Control Channel (CCCH), wherein the second message is received using a CCCH.

28. The UE of claim 17, wherein the event report acknowledgment message comprises an acknowledgment of the event report message.

29. The UE of claim 17, wherein the request for the periodic or triggered location includes a first indication as to whether the UE may report the detected periodic or triggering event using CP optimization.

30. The UE of claim 29, wherein the at least one processor is further configured to:
send a NAS Registration Request message to a CN node in the wireless network; and
include in the NAS Registration Request message a second indication as to whether CP Optimization is supported by the UE for location event reporting, wherein the first indication is based in part on the second indication.

31. The UE of claim 29, wherein the request for the periodic or triggered location includes criteria for reporting the detected periodic or triggering event using CP optimization.

32. The UE of claim 31, wherein the criteria comprise at least one of the following:
use of CP optimization for reporting is allowed or required when the UE is idle;
use of CP optimization for reporting is not allowed following a threshold time period for which CP optimization for reporting is used to report periodic and trigger events;
use of CP optimization for reporting is not allowed following a threshold number of consecutive event reports for which CP optimization is used to report periodic and trigger events; or
a combination thereof.

33. A user equipment (UE) in a wireless network capable of supporting periodic and triggered location, the UE comprising:
means for receiving a request for a periodic or triggered location from a location server in the wireless network;
means for sending a response to the location server, the response confirming the periodic or triggered location;
means for detecting a periodic or triggering event;
means for determining whether to report a trigger event using Control Plane (CP) Optimization;
means for obtaining event information, the event information comprising at least one of location measurements, a location estimate, a type of detected triggering event, or a combination thereof;
means for obtaining a signaling association with a Radio Access Network (RAN) node in the wireless network, wherein the signaling association does not include a signaling connection to a core network (CN) node;
means for transmitting a first message to the RAN node, wherein the first message is a Radio Resource Control (RRC) message and includes an initial Non-Access Stratum (NAS) message, wherein the initial NAS message contains a routing identifier identifying the location server and an event report message containing the event information, wherein the RAN node forwards the initial NAS message to the CN node, wherein the CN node forwards the event report message to the location server; and
means for receiving a second message from the RAN node, wherein the second message includes a NAS response message, wherein the NAS response message contains an event report acknowledgment message.

34. A non-transitory storage medium including program code stored thereon, the program code is operable to configure at least one processor in a user equipment (UE) in a wireless network capable of supporting periodic and triggered location, comprising:
program code to receive a request for a periodic or triggered location from a location server in the wireless network;
program code to send a response to the location server, the response confirming the periodic or triggered location;
program code to detect a periodic or triggering event;
program code to determine whether to report a trigger event using Control Plane (CP) Optimization;
program code to obtain event information, the event information comprising at least one of location measurements, a location estimate, a type of detected triggering event, or a combination thereof;
program code to obtain a signaling association with a Radio Access Network (RAN) node in the wireless network, wherein the signaling association does not include a signaling connection to a core network (CN) node;
program code to transmit a first message to the RAN node, wherein the first message is a Radio Resource Control (RRC) message and includes an initial Non-Access Stratum (NAS) message, wherein the initial NAS message contains a routing identifier identifying the location server and an event report message containing the event information, wherein the RAN node forwards the initial NAS message to the CN node, wherein the CN node forwards the event report message to the location server; and
program code to receive a second message from the RAN node, wherein the second message includes a NAS response message, wherein the NAS response message contains an event report acknowledgment message.

* * * * *